US008643784B2

(12) United States Patent
Tanaka et al.

(10) Patent No.: US 8,643,784 B2
(45) Date of Patent: Feb. 4, 2014

(54) TELEVISION SYSTEM, TELEVISION SET AND REMOTE CONTROLLER

(75) Inventors: Masahide Tanaka, Osaka (JP); Tohru Matsui, Nara (JP)

(73) Assignee: NL Giken Incorporated, Osaka (JP)

( * ) Notice: Subject to any disclaimer, the term of this patent is extended or adjusted under 35 U.S.C. 154(b) by 67 days.

(21) Appl. No.: 13/345,746

(22) Filed: Jan. 8, 2012

(65) Prior Publication Data

US 2012/0105725 A1 May 3, 2012

Related U.S. Application Data

(63) Continuation of application No. 11/697,413, filed on Apr. 6, 2007, now Pat. No. 8,094,236.

(30) Foreign Application Priority Data

Apr. 7, 2006 (JP) .................................. 2006-106109

(51) Int. Cl.
*H04N 5/44* (2011.01)
*H04N 5/63* (2006.01)
*H04N 5/445* (2011.01)
*H04N 7/173* (2011.01)

(52) U.S. Cl.
USPC ............. 348/553; 348/730; 348/734; 725/41; 725/86; 725/105

(58) Field of Classification Search
None
See application file for complete search history.

(56) References Cited

U.S. PATENT DOCUMENTS

| 2001/0035917 | A1* | 11/2001 | Satake et al. ................... 348/730 |
| 2002/0144273 | A1* | 10/2002 | Reto ................................. 725/86 |
| 2002/0147982 | A1* | 10/2002 | Naidoo et al. ................. 725/105 |
| 2005/0015803 | A1* | 1/2005 | Macrae et al. ................... 725/41 |
| 2005/0091311 | A1* | 4/2005 | Lund et al. ...................... 709/203 |
| 2005/0130613 | A1* | 6/2005 | Kutsuna et al. ............. 455/179.1 |
| 2006/0092323 | A1* | 5/2006 | Feeler et al. ................... 348/553 |

FOREIGN PATENT DOCUMENTS

| JP | 2004265219 A | * | 9/2004 | ............. G06F 13/00 |
| JP | 2005228012 A | * | 8/2005 | ............. G08B 25/04 |

* cited by examiner

*Primary Examiner* — Jefferey Harold
*Assistant Examiner* — Sean Haiem

(57) ABSTRACT

In response to an operation such as power-on or power-off, channel change and sound volume change, a television set combined with a personal computer automatically makes e-mail with information in a predetermined format indicative of the operation attached. The e-mail is automatically sent to another television set to inform the other television set of operation of the own television set. On the other hand, the e-mail can be sent to a rating company for audience share survey. The television set automatically reads the received e-mail and attachment to change the indication of display. The television set has storage of the received information for analysis of an abnormality. Abnormality can be also sensed through abnormal act on the remote controller apt to be taken by a person in panic or off the truck. The television set refuses information from unknown address for blocking an attack of a stranger.

17 Claims, 23 Drawing Sheets

TELEVISION SYSTEM, TELEVISION SET AND REMOTE CONTROLLER

CROSS REFERENCE TO RELATED APPLICATION

This application is a Continuation Application of U.S. application Ser. No. 11/697,413 filed Apr. 6, 2007, herein incorporated by reference in its entirety.

BACKGROUND OF THE INVENTION

1. Field of the Invention

This invention relates to a television system, a television set with communication function and a remote controller for an appliance, such as television set.

2. Description of the Related Art

For example, a son having left his home town far away because of his job desires to keep a warm eye on his old mother living alone in the home town. Japanese Laid-open Patent Application No. 2005-228012 discloses a system including a digital television set in a single-person home, an audience information gathering center and an emergency service center, which are connected through communication network. The audience information gathering center receives the audience information from the digital television set to transmit the same to the emergency service center, which updates the operation date and time in response to the received audience information. Among the updated audience information, the emergency service center detects any audience information, which has not been updated for a period longer than a predetermined limit, to inform a caring terminal of a message for confirming the safety of the single-person home where the digital television set is located. In this field of art, however, the monitoring of a single-person home or the like generally requires large scale system.

On the other hand, Japanese Laid-open Patent Application No. 2004-265219 discloses a television set combined with a personal computer capable so exchange e-mails through the television set. However, e-mail sending requires some knowledge in addition to that in merely watching television.

SUMMARY OF THE INVENTION

An object of this invention is to provide a safety monitoring system which can be easily realized on the basis of existing system in home.

Another object of this invention is to provide a television set which can transmit information to the outside for various purposes.

Still another object of this invention is to provide a television set easily inform the outside of the safety in the home where the television set is located.

To achieve one of the above objects, this invention provides a television system including a television set and an outside counterpart which communicate each other.

For such a system, this invention provides a television set comprising a television function unit, a detector arranged to detect a cause of change in the television function, a communicator arranged to communicate with an outside counterpart by means of designating an address of the counter part, an input arranged to prepare a first information of a free contents, a first designator arranged to freely designate a desired address to which the first information is sent, a first trigger arranged to manually send the first information through the communicator, an automatic generator of a second information of a prepared contents in response to the detector which detects a cause of a predetermined change in the television function, a second designator arranged to automatically designate a predetermined address to which the second information is sent, and a second trigger arranged to automatically send the second information through the communicator in response to the completion of the function of the automatic generator and the second designator.

According to the above feature of this invention, information of prepared contents is automatically generated in response to a predetermined change in the television function with a predetermined address automatically added. Further, the information is automatically sent in response to the completion of the automatic generation of the information. The above function is carried out on an existing communicator in the television set and automatically without any knowledge in addition to that in merely watching television.

In the television set according to a detailed feature of this invention, the detector includes a receiver arranged to receive a signal from a remote controller. In other words, the conventional operation of the remote controller can be transmitted to the outside counterpart. For example, the change in the television function is the change in at least one of the power-on or power-off, the channel selection and sound volume.

In the television set according to another detailed feature of this invention, the automatic generator is arranged to generate the second information in accordance with a predetermined format. According to more detailed feature of this invention, the automatic generator is arranged to generate an e-mail to which the second information in the predetermined format is attached. These features each or in combination are advantageous the automatic treatment of the information.

According to another detailed feature of this invention, the second designator is arranged to designate an address of another television set located at a familiar home. Thus, one of the familiar homes can keep a warm eye on the other home mutually on each television set. Moreover, the familiar homes actually far away from each other can feel as if they are one family on the connection through the television sets.

According to another detailed feature of this invention, on the other hand, the second designator is arranged to designate an address of a rating company in charge of an audience share survey. Thus, this invention presents a novel and easy audience rating survey system of higher reliability and efficiency than a conventional system on a sampling by a special apparatus and statistics method.

According to still another detailed feature of this invention, the television set further comprises a second detector arranged to detect an abnormal use of the television set, wherein the automatic generator is further responsive to the second detector. In this case, the second designator may be arranged to designate an address of an emergency organization in place of or in addition to the familiar home.

To achieve the above discussed objects, this invention also provides a television set comprising a television function unit, a display arranged to display a broadcast program in accordance with the television function unit, a communicator arranged to communicate with an outside counterpart, a receiver arranged to receive information form the outside counterpart through the communicator, and a controller arranged to automatically change the display in response to the receipt of the information by the receiver from a predetermined outside counterpart.

According to the above feature of this invention, the television display is automatically changed in response to the receipt of the information from a predetermined outside counterpart. Thus, any change in the predetermined out side counterpart is know on the own television set. The above function is also carried out on an existing communicator in the television set and automatically without any knowledge in addition to that in merely watching television. Also in this case, it is meaningful to arrange the television set so that the predetermined counterpart is another television set located at a familiar home, and that the received information includes a change in at least one of the power-on or power-off, the channel selection and sound volume of the another television set.

In more detail, the television set is so designed that the controller displays the channel selection of the other television set with the local channel number. In other words, the channel number for the other television set may not be the channel number actually selected at the area of the other television set as it is, but a converted local channel number. This is because that the channel numbers for the same broadcast program may differs in areas, and a family may not familiar with the channel number actually selected in the area of the other television set located far away.

According to another detailed feature of this invention, the television set is so designed that the controller is arranged to change the display if the broadcast program identified by the channel selection of the other television set coincides with the broadcast program displayed in accordance with the television function unit. The change in display in this case is a change in color or blink of the channel number display for example. This makes it easier for both the families to note that they share the same experience as if they live together.

According to another detailed feature of this invention, the television set is so designed that the controller is arranged to make it possible to replace the broadcast program displayed in accordance with the television function unit by another broadcast program identified by the channel selection of the other television set. This makes it easier for one family to share the same experience or to check the broadcast program which the other family is watching.

According to another detailed feature of this invention, the television set further comprises a storage arranged to record the received information and an analyzer arranged to detect an abnormality in the predetermined outside counterpart on the basis of an analysis of the recorded information.

According to another detailed feature of this invention, on the other hand, the television set is so designed that the received information includes a sign of abnormality in the predetermined outside counterpart.

The above features are highly advantageous for one family to know possible abnormality of the other family.

According to another feature of this invention, the television set is so designed that the receiver is arranged to refuse receiving information other than the information from the predetermined outside counterpart for automatically change the display. This feature is advantageous for protecting the television set from virus otherwise suffered from the constant connection.

To achieve the above discussed objects, this invention also provides a remote controller for an appliance comprising an operating part including a plurality of keys each of which are assigned to predetermined functions, respectively, a signal transmitter arranged to transmit a control signal to the appliance in response to the operation in the operating part, first controller arranged to determine the signal indicative of one of the predetermined functions to be transmitted to the appliance in response to an operation of at least one of the keys in compliance with a predetermined manner, and a second controller arranged to have the signal transmitter to transmit a signal indicative of an abnormality to the appliance in response to an operation of the operating part which does not comply with the predetermined manner, but corresponds to a predetermined abnormal manner.

In the above remote controller, the appliance is for example a television set including a communicator arranged to communicate with an outside counterpart by means of designating an address of the counter part.

And, an example of the predetermined abnormal manner includes at least one of such manners that three keys or more are pushed at once and that the same key or a group of closely arranged keys is pushed more than a predetermined times in a limited period.

According to the above and its detailed features, a person even in panic or off his or her truck can report the emergency on the remote controller by means of a simple action not to be taken by a normal person, but is apt to be taken by a person in panic or off the truck. Further, a possibility of erroneous emergency report is relatively low because the assumed action in the features above would not be taken by a normal person. Further the feature above does not require any regular exercise and maintenance to keep the reliability of emergency report since the remote controller is in daily use.

Other features and advantages according to this invention will be readily understood from the detailed description of the preferred embodiments in conjunction with the accompanying drawings.

DETAILED DESCRIPTION OF THE PREFERRED EMBODIMENTS

Figure 1:
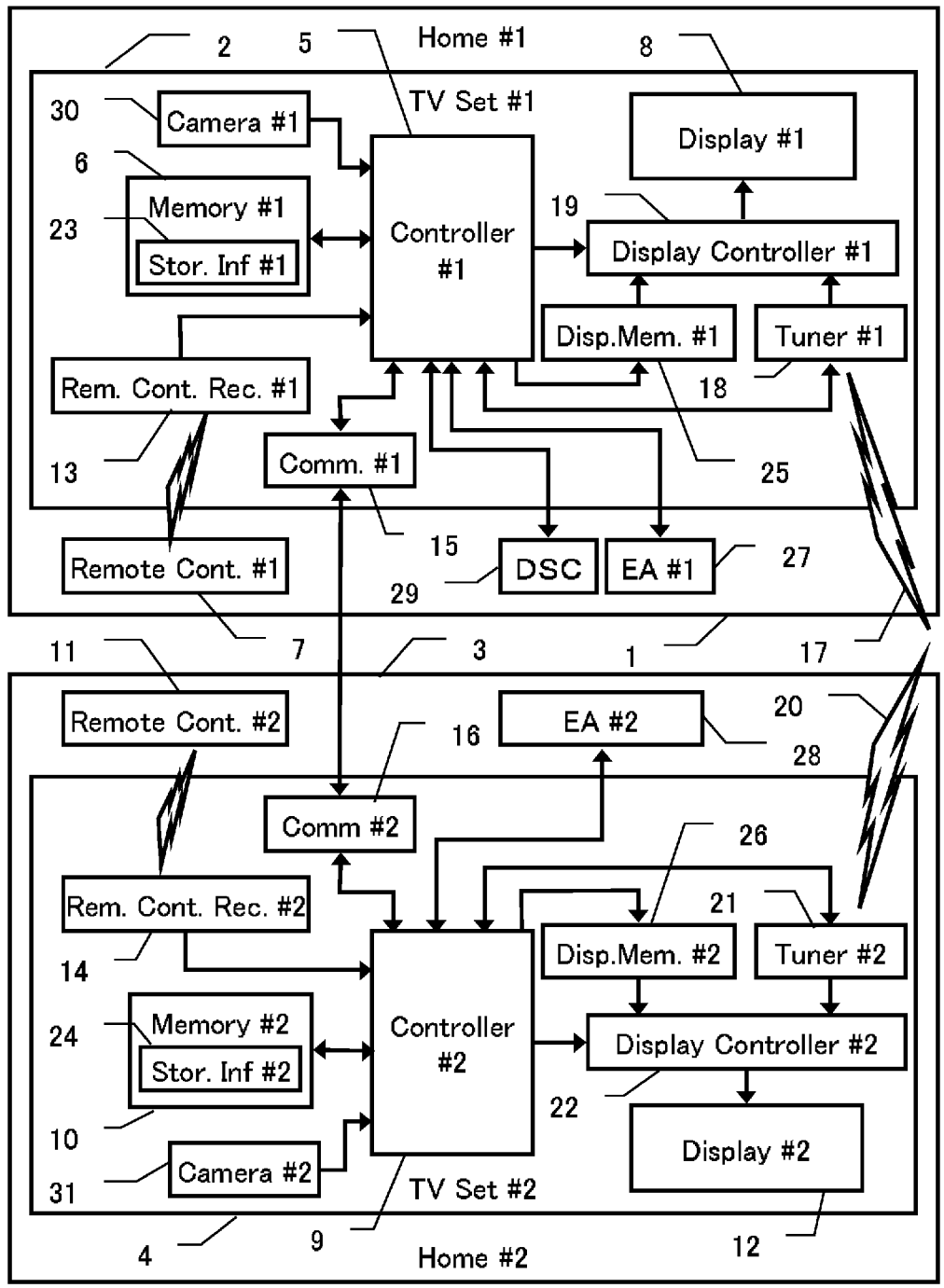
FIG. 1 is a block diagram of a television set system according to an embodiment of this invention.

FIG. 1 is a block diagram of a television set system according to an embodiment of this invention. The system includes the first home 1 with the first television set 2 and the second home 3 with the second television set 4, the second home 3 being located far from the first home 1. For example, the first home 1 is of a family of a son leaving his home town because of his job and the second home 3 is of his old mother living alone in the home town. This invention, however, is not limited to an application to a pair of homes, but also is applicable to more than two homes, such as a home of a family, a home of the wife's parents and a home of the husband's parents, the three homes being far away from another, respectively. The following explanation will be basically made on the basis of a simplified model including of two homes with some comments on the case of more than two homes added upon necessity.

Thus, this invention relates to a daily information exchange by way of television sets between homes far away from each other to keep a warm eye on the other family or to share the same experience as if they all live together in a happy circle.

The first television set 2 includes the first controller 5 which controls not only the ordinary television function, but also functions as a personal computer in combination with the first memory 6. The first remote controller 7 originally for ordinary television control and the first display 8 originally for ordinary television monitor also function as graphical interface of the first controller as the personal computer.

The first memory 6 includes a hard disc drive, ROM and RAM for storing the computer software and various data. The first memory 6 is of a large capacity which can store not only the software computer software and various data, but also television program.

The second television set 4 also includes the second controller 9, the second memory 10, the second remote controller 11 and the second display 12, which are similar to the first controller 5, the first memory 6, the first remote controller 7 and the first display 8, respectively, of the explanation thereof being omitted for avoiding the repetition.

In response to an operation of the first remote controller 7, infrared light signal is sent to the first remote control receiver 13, which is transmitted to the first controller to function in response to the operation of the first remote controller 7. The second remote control receiver 14 has the similar function.

The first television set 2 further includes the first communicator 15 which is in communication with the outside counterpart through always-connected Internet. The first communicator 15 is capable of the conventional internet or e-mail communication, in which e-mail exchange is possible by means of freely inputting information through the first remote controller 7 to prepare a conventional e-mail contents, freely designating a desired address to which the input information is sent, and manually triggering through the first remote controller 7 to send the information through the internet.

The first communicator 15 is not only capable of the conventional internet or e-mail communication under control of the first controller 5, but also is capable of functioning as a bare-bones personal computer to at least be informed by a server of a receipt of an e-mail addressed to the first television set 2 by means of being constantly powered even if the hardware and the software of the first controller 5 is in inoperative condition. This is for automatically turning the first television set 2 into on state by detecting a receipt of an urgent e-mail from the second television set 4 with the first television set is in off state. The second communicator 16 of the second television set 4 is of the similar function. The function of the first and second communicators 15 and 16 are explained later in more detail.

As has been understood from the above explanation, the first and second television sets 2 and 4 are in normal communication with each other for pleasure by means of broadband line through the first and communicators 15 and 16 for one side to inform the other side of television program which is watched on the one side and vice versa. Moreover, the one side is urgently informed of an abnormality of the other side and vice versa. In FIG. 1, the first and communicators 15 and 16 are shown as if they are directly connected. In reality, however, they are in connection through the broadband line.

In the case of enjoining conventional television program through the first television set 2, one of television channels is selected by the first remote controller 7. And, the desired program on the airwave 17 is turned by the first tuner 18 to appear on the first display 8 under the control of the first display controller 19. This is also true in the case of the second television set 4 in relation to airwave 20, the second tuner 21 and the second display controller 22.

The first memory 6 of the first television set 2 stores not only the television program transmitted on airwave 17 from a broadcast station in real time, but also the television program data downloaded from a server station on internet by way of the first communicator 15. This is also true in the case of the second television set 4 in relation to the second memory 10.

The first storage information 23 in the first memory 6 includes information attached to e-mail received from the second home 3 with the date and time of receipt incorporated. The first storage information 23 also includes information of the first home 1 itself attached to e-mail sent to the second home 3 with the date and time of transmittal incorporated. Similarly, the second storage information 24 in the second memory 10 includes information attached to e-mail received from the first home 1 with the date and time of receipt incorporated, as well as information of the second home 3 itself attached to e-mail sent to the first home 1 with the date and time of transmittal incorporated. The latest information is identifiable in the first storage information 23. The archival analysis of information in the first storage is also possible. These are true also in the second storage information 24.

The e-mail is automatically produced and sent upon every turning on or off of the television set as well as upon every change in the channel of the television set with the information of date and time as well as the selected channel automatically attached to the e-mail. The received e-mail with its attachment is automatically read and accumulated as the first and second storage information 23 and 24, respectively. So, the person in the first home 1 is informed of the television program which the person in the second home 3 is now watching, and vise versa, if the channel numbers attached to the latest e-mails mutually exchanged are indicated on first display 8 and the second display 12, respectively, provided that both the first and second television sets 2 and 4 are in on state. Thus, both the families can mutually confirm their doing well. Moreover, the families at remote locations from each other feel themselves as if they are a company in the same room if they mutually know that they are sharing the same television program substantially at the same time.

In the embodiment of this invention, it is needless to say that conventional e-mail, its receipt is reported by a server through internet, is manually read, any attachment to the e-mail being also manually read, by operating the first remote controller 7. Thus, the contents of conventional e-mail and its attachment manually read is displayed on the first display in response to the operation of the first remote controller 7 in contrast to the case of e-mail according to the feature of this invention automatically read.

The first display memory 25 is mainly for controlling the first display 8 for the display of still image necessary for the function of the first television set 2 as a personal computer or setting of various function of the first television set 2. The first display memory 25 also keeps the image of channel number related to the latest television program selected by the second television set 4 unless the second television set 4 is turned off or its channel selection is changed. The first display controller 19 overlaps the still image of channel number for the second television set 4 kept by the first display memory 25 on the television program moving image from the first tuner 18 for display on the first display 8. This is also true in the case of the second television set 4 in relation to the second display memory 26. In other words, the second display controller 22 overlaps the still image of latest channel number for the first television set 2 kept by the second display memory 26 on the television program moving image from the second tuner 21 for display on the second display 12.

The first display controller 19 does not only overlap the still image of channel number kept by the first display memory 25 on the television program moving image from the first tuner 18, but also completely substitutes the still image of channel number of the second television set 4 for an image according to the conventional function of the first television set 2 under the control of the first controller 5. For example, a still image according to a personal computer function or a moving image according to a stored television program from the first memory 6 may be completely replaced by still image of channel number for the second television set 4. This is because that the still image of a personal computer function or a moving image of a stored television program can be completely interrupted without any problem by the still image of channel number for the second television set 4. Such a possibility of complete substitution is also true in the case of the second television set 4.

The first television set 2 also serves as a total controller of all the home electric appliances in the first home 1 by means of monitoring the conditions thereof through home network to control them on necessity. For example, the first controller 5 is connected with the first home electric appliance 27 outside the first television set 2. In FIG. 1, there is only one home electric appliance is shown for simplification. However, various many home electric appliances are connected to the first controller in actuality as has been mentioned above. Further, the first controller 5 can be connected not only with the home electric appliances, but also with other equipments or tools in the first home 1, such as bed, for monitoring their conditions or controlling them. The lock system of the entrance door of the first home 1 is another example to be connected to the first controller 5, wherein the outing and coming home of the family in the first home 1 can be more surely monitored in combination with the turning on and off of the first television set 2.

Similarly, the second controller 9 of the second television set 4 also serves as a total controller of all the home electric appliances in the second home 3 by means of monitoring the conditions thereof through home network to control them on necessity. In FIG. 1, only the second home electric appliance 28 is shown for simplification. However, various many home electric appliances as well as other home equipments or tools are connected to the second controller 9 in actuality as in the case of the first controller 5.

With respect to the home electric appliances, the first and second controllers 5 and 9 automatically produce and send e-mails, respectively, upon every turning on or off operation of the electric appliance with the information of date and time of such operation attached. The received e-mail with its attachment is automatically read and accumulated as the first and second storage information 23 and 24, respectively. So, the person in the first home 1 is informed of the usage of each electric appliance by the person in the second home 3, and vise versa, if the information of the home electric appliance attached to the latest e-mails mutually exchanged are indicated on first display 8 and the second display 12, respectively. Thus, both the families can mutually confirm their doing well in using the home electric appliances as usual.

The first controller 5 of the first television set 2 is also in communication with digital camera 29 for exchanging digital photograph information (herein after referred to as "photograph"). There are various ways for the first controller 5 to receive photographs from digital camera 29, such as a cable or wireless or cradle connection between digital camera 29 and the first controller 5, or memory card taking out of digital camera 29 and putting into a slot connected to the first controller 5.

The photographs taken into the first controller 5 is stored in the first memory 6, which are possible to be viewed on the first television set 2 in any time. Further, the photographs stored in the first memory 6 are possible to be sent to the second home 3. Such a sending of the photographs from the first home 1 to the second home 3 can be automated. For example, if each photograph to be automatically sent is selected and marked within digital camera 29 in advance, the marked photographs are automatically attached to an e-mail to the second home 3 which is automatically produced and sent from the first communicator 15 every time when the photographs are taken into the first controller 5. The e-mail received at the second communicator 16 is automatically read to automatically store the attached photographs in the second memory 10 as well as to accumulate the fact of receipt of the photographs as the second storage information 24. Thus, the fact of photograph receipt can be indicated on the second display 12 in response to the latest second storage information 24.

Digital camera 29 is only shown at the first home 1 in FIG. 1. However, similar photograph transmission form the second home 3 to the first home 1 is possible if photographs are taken into the second controller 9 from a digital camera.

The first television set also includes the first camera 30 connected to the first controller 5 and faced toward a person watching the first television set 2. The first camera 30 is a television camera for use in videophone or monitoring of the other home upon emergency. The first remote controller 7 has a microphone and a speaker, as will be explained in more detail, for making it possible to use the first remote controller 7 as a phone receiver upon videophone conversation. Thus, the first camera takes a moving picture of a member of the first home 1 who speaking with the first remote controller 7 to send the moving picture to the second television set 4. The videophone line is over the Web through the first communicator 15. The second television set 4 also has the second camera 31, the explanation thereof being omitted for avoiding a duplication of the case of the first camera 30.

Upon emergency such as the case that some abnormality on the second home 3 reported by an automatic e-mail from the second television set 4 is indicated on the first television set 2, an emergency e-mail is sent from the first communicator 15 with an attachment information, which orders the second camera 31 to take a moving picture of the second home 3 with the most wide angle setting and to attach the taken picture to an automatic return e-mail. Thus, the second camera 31 is remote controlled from the first home 1 to monitor the second home 3 within the angle of the second camera 31.

Figure 2:
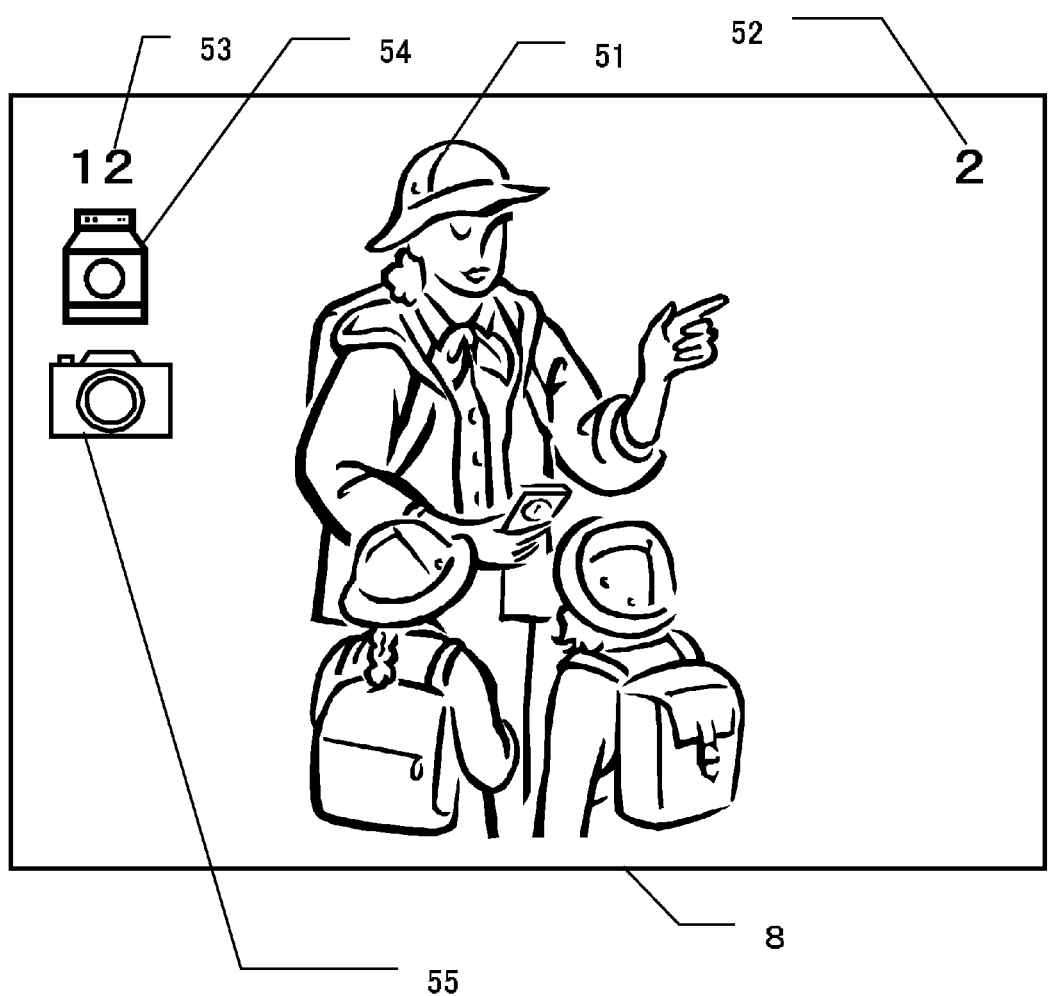
FIG. 2 is an example of the picture on the display of own television set, in which broadcast program is displayed.

FIG. 2 is an example of the picture on the first display 8, in which broadcast program 51 is displayed. The upper-right corner of the first display 8 is for indicating channel number 52 of the first home 1, e.g., own channel number. In other words, broadcast program 51 received by the first television set 2 is of channel "2".

On the other hand, the upper-left corner of the first display 8 is for indicating channel number 53 of the second home 3, e.g., the other channel number. This means that the second television set 4 of the second home 3 is now in the on state to enjoy a broadcast program of channel "12". On the contrary, there is no indication at the upper-left corner portion for channel number 53 of the first display 8 if the second television set 4 is in off state. In place of no indication, characters, "OFF" may be indicated at the upper-left corner portion 53.

It should be noted that the channel number 53 indicated at the upper-left corner portion may not be the channel number actually selected at the area of the second television set 4 as it is, but a converted channel number, i.e., the channel number of the corresponding broadcast program selectable in the area of the first television set 2. This is because that the channel numbers for the same broadcast program may differs in areas, and the family living in the area of the first television set 2 may not familiar with the channel number actually selected in the area of the second television set 4.

At the upper-left corner of the first display 8, electric appliance icon 54 of the second home, e.g., an icon of the washing machine is displayed to indicate that the washing machine of the second home 3 is working. On the contrary, if no electric appliance is working in the second home 3, no icon is displayed at the position of icon 54. If another electric appliance other than the washing machine, an icon indicating the working electric appliance is displayed at the position of icon 54. Thus, the daily life in the second home 3 relating to the electric appliances can be monitored from the first home 1. In other word, a person in the first home 1 can know a possible abnormality in the second home 3 if the expected icon does not appear at the position of icon 54 at an expected regular time. So the person can quickly contact the second home if necessary.

At the upper-left corner of the first display 8, camera icon 55 appears when photographs are sent via e-mail from the first home 1 to the second home 3. Camera icon 55 disappears when an e-mail from the second home 3 indicating that the photographs are viewed is received. On the other hand, the arrival of the photograph via e-mail is displayed on the second display 12 with a suitable icon for facilitating a person in the second home 3 to view the photographs. Thus, a person in the first home 1 can know a possible trouble in the second home 3 disabling the photographs viewing if icon 55 is not to disappear for a long time. So the person of the first home 1 can quickly contact the second home if necessary.

If a third home exists in addition to the second home 3, it is necessary to for the first display 8 to display icons of the channel number, the electric appliance, and the camera also for the third home. In such a case, the order of priority of home is preset to initially indicate the icons for home of the first priority of concern. And, the icons for home of the second priority will replace the icons of the first priority if the first remote controller 7 is operated upon necessity.

Or, all the icons of both the second and third homes can be displayed at once if two columns of icons are layout at the upper-left corner of the first display 8 with each column assigned to each home, respectively. In this case, it is preferable to locate an icon identifying the assigned home at the top of each column.

Even in a case that the second home 3 is the only concern of the first home 1, the above idea of priority is useful if the condition of a plurality of electric appliances are to be monitored. Namely, the order of priority of electric appliance is preset to initially indicate the icon for electric appliance of the first priority in working condition. And, the icon for anther electric appliance of the second priority in working condition if any will replace the icon of the first priority if the first remote controller 7 is operated upon necessity.

Alternatively, all the electric appliances in working condition are to be displayed. Or, all the electric appliances are to be displayed regardless of their condition in working or not with the indication color of the electric appliance in working condition different from the electric appliance in rest condition.

Figure 3:
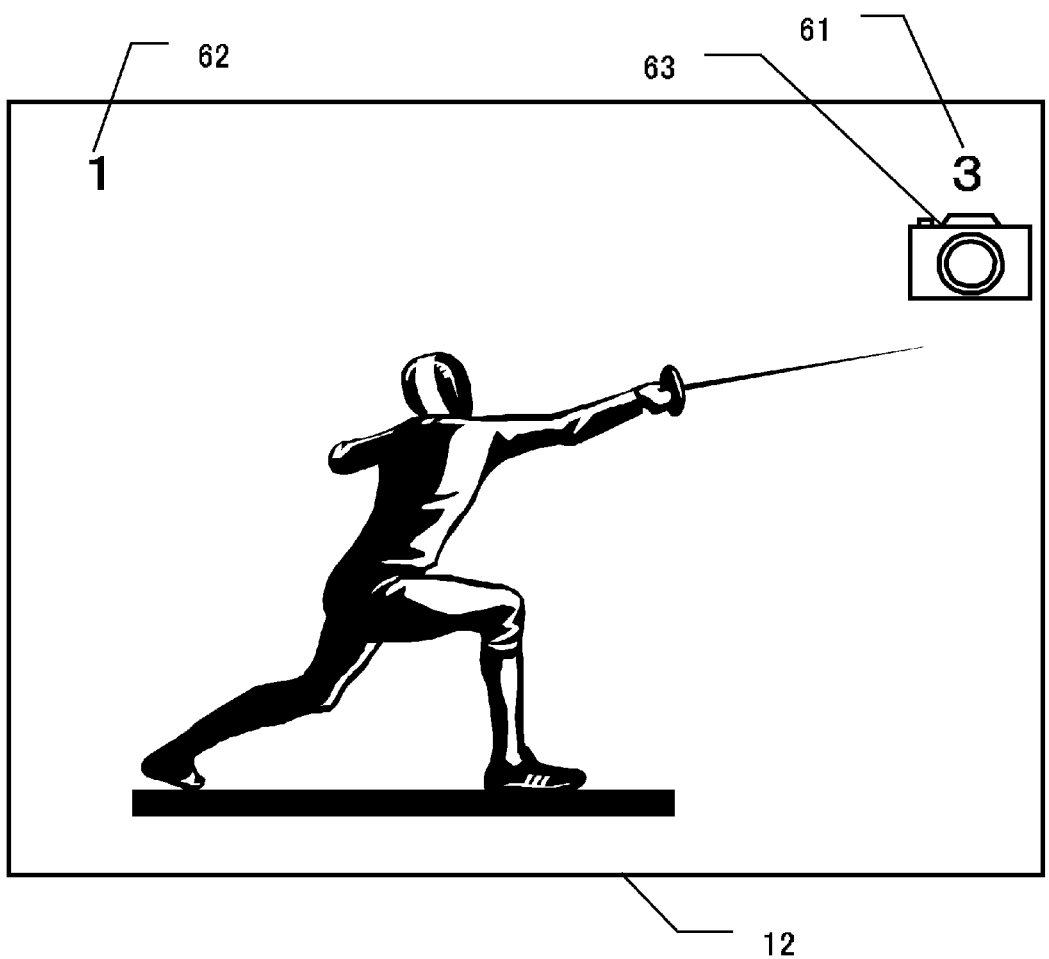
FIG. 3 is an example of the picture on the display of the other television set at the same time as that at FIG. 2.

FIG. 3 is an example of the picture on the second display 12 of the second television set 4 at the same time as that at FIG. 2. In contrast to that channel number 53 at the upper-left corner of the first display 8 in FIG. 2, which indicates the channel number of the second home 3, e.g., the other channel number of the first home 1, is "12", channel number 61 at the upper-right corner of the second display 12 in FIG. 3, which indicates the channel number of the second home 3, e.g., own channel number of the second home 3, is "3". This is because that the channel actually selected in the second home 3 in its broadcast area is "3", which is converted into "12" indicating the corresponding channel number under which the same broadcast program comes on the air in the broadcast area where the first home 1 lives.

At the upper-left corner of the second display 12 in FIG. 3, channel number 62 indicating "1" is displayed to show that the broadcast program under channel "1" is now enjoyed ins the first home 1. It should be noted again that the channel actually selected in the first home 1 in its broadcast area is "2", which is converted into "1" indicating the corresponding channel number under which the same broadcast program comes on the air in the broadcast area where the second home 3 lives.

At the upper-right corner of the second display 12, icon 63 of camera appears when photographs are received via e-mail from the first home 1 to the second home 3. Icon 63 disappears when the photographs are viewed in the second home 3, while icon 63 remains if the photographs are left unseen. When the photographs are viewed in the second home 3, an e-mail is automatically created and sent to inform the first home 1 of the fact that the photographs are viewed in the second home 3. As has been explained, the arrival of such an e-mail has icon 55 in the first display 8 disappear. In other word, icon 63 in the second display 12 and icon 55 in the first display 12 disappear almost at the same time with a delay of e-mail transmission.

Both in FIGS. 2 and 3, icons relating to information of own home are located at the right side of the first display 8 or the second display 12, while icons relating to information of the other home are located at the left side of the first display 8 or the second display 12. This layout of icon isolation avoids confusion of icon interpretation.

Icons 52 and 61 for own channel number and icons 53 and 62 for the other channel number as well as other various icons 54, 55 and 63 may be arranged to appear in the first display 8 and the second display 12 at any time as long as the functions relating to the icons are in working condition. Alternatively, the icon indication may be arranged to appear for a limited period, e.g., 10 seconds, initiating from an occurrence of any change in the first television set 2 or the second television set 4 so as to automatically disappear after the lapse of the limited period for avoiding complex indication in the first and second displays 8 and 12.

In FIG. 2, for example, icons 52 to 55 appearing upon powering the first television set 2 automatically disappear after the lapse of the limited time. However, they appear again if channel is changed, they disappearing again after the lapse of the limited time after the channel changing. Thus, every time when channel is changed in the first home 1, the latest channel for the second home 3 is confirmed by the first home 1.

In place of the change in the first television set 2, the change in the second home 4 such as in the second television set 4 of in the second home electric appliance 28 causes the appearance of icons 52 to 55 in the first display 8 upon the arrival of an automatic e-mail with attachment informing of such a change in the second home 4. Icons will disappear again after the lapse of the limited period following the e-mail arrival. Thus, the first home 1 can quickly note the change in the second home 3 on the first display 8.

However, such appearance of icons 52 to 55 may possibly be overlooked in the first home 1 concentrating on an exciting program since the appearance of icons 52 to 55 is not caused by any own action in the first home 1. To this, icons 52 to 55 are arranged to blink upon appearance caused by the second home 3. Alternatively, icons 52 to 55 may appear in enlarged size to occupy the entire area of the first display 8 for a moment to call for attention of the first home 1. In addition to or in place of such a visible means for calling for attention, an audible means such as beep or chime accompanying the appearance of icons 52 to 55 is useful.

Both in FIG. 2 and FIG. 3, at least one channel number is highlighted if both the first and second homes 1 and 3 share the same broadcast program. In FIG. 2, for example, if the channel is changed in the second home 3 causing the indication at channel number 53 of the first display 8 to change from "12" to "2" which is the same program now enjoyed in the first home 1, some change in one or both of channel numbers 52 and 53 is caused to inform the first home 1 of the fact that both the homes share the same experience as if a family living together. For example, one or both of channel numbers 52 and 53 are to blink, or change its color, or be enlarged if both the channel numbers are matched.

Further, both in FIG. 2 and FIG. 3, it is possible to arrange any of the first and second television sets 2 and 4 so as to easily and quickly change the channel number into one viewed in the other home. In FIG. 2, for example, if it is desired in the first home 1 to view the same broadcast program of channel "12" at the channel number 53, which is viewed in the second home 3, channel number 52 can be instantly changed from "2" to "12" by pushing a predetermined key of the first remote controller 7. This operation is universally possible by the same predetermined key regardless of the second channel number 53 indicated. This is because that the first storage information 23 of the first television set 2 has the information of the channel number for the other home gotten via e-mail, which is taken out in response to the operation of the same predetermined key.

In FIG. 2, such a setting is possible that the icons at the left side of the first display 8 relating to the information of the second home 3 are not indicated at all. In other words, one of a sophisticated first mode of indicating information of the other home and a simplified second mode of non-indication of the other home information is selectable. The selection is possible by operating the first remote controller 7.

The second television set 4 is also capable of the above selection of one of the sophisticated first mode and the simplified second mode by means of the second remote controller 11.

Figure 4:
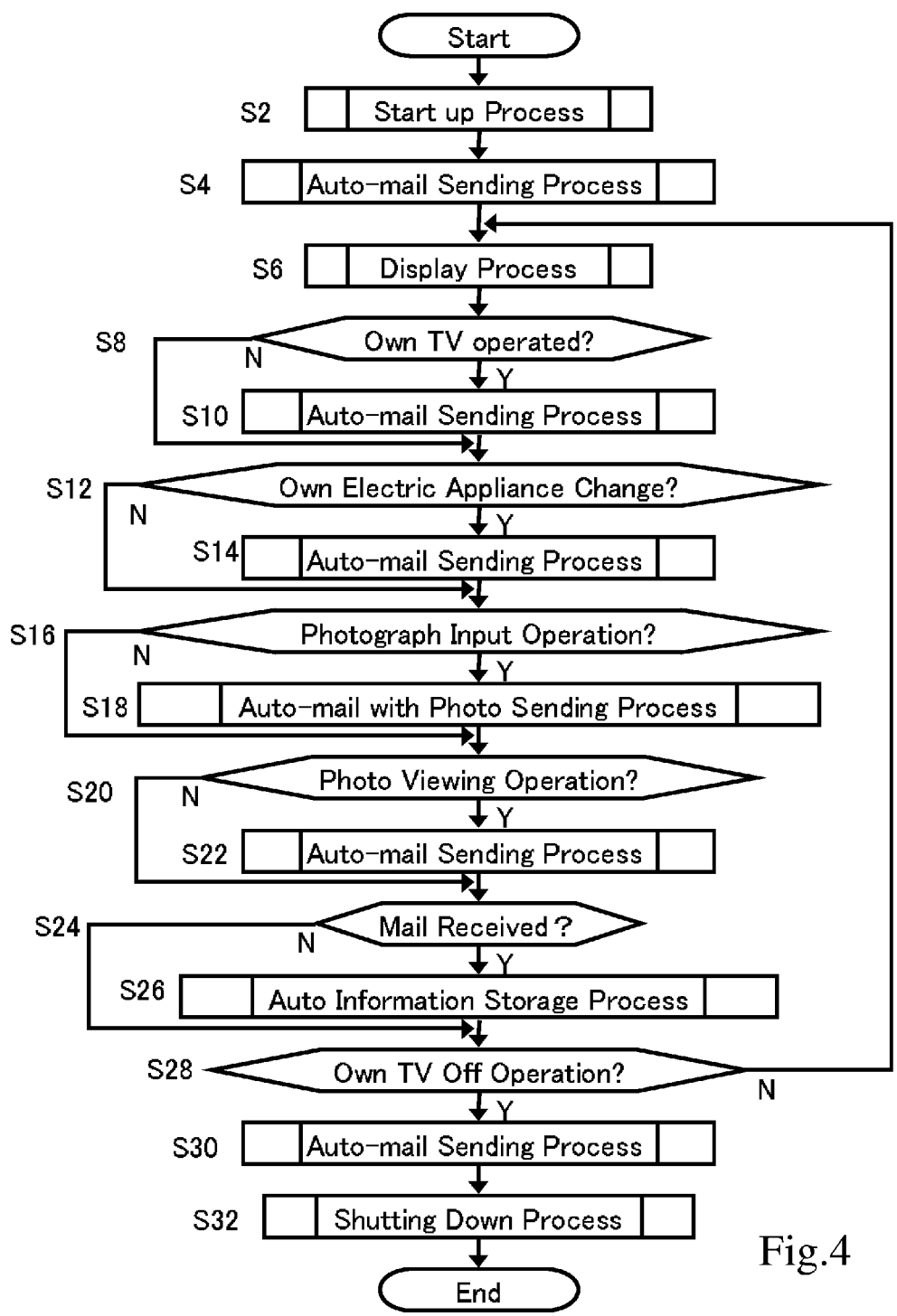
FIG. 4 is a flow chart of the basic function of the television set in FIG. 1.

FIG. 4 is a flow chart of the basic function of the first controller 5 or the second controller 9 in FIG. 1. In the following explanation, however, the flow chart is for the first controller 5 with the first television set 2 referred to as "the own television set" while the second television set 4 as "the other television set". Since the function of the second controller 9 is readily understood if the relationship between "the own television set" and "the other television set", the explanation will be omitted unless special comment is necessary.

The flow in FIG. 4 starts when the first television set 2 is powered by operating a power key of the first remote controller 7 to advance to step S2, in which the start-up process for the television function and the communication function is carried out. The details of the start-up process will be explained later.

Next, in step S4, the automatic e-mail sending process is carried out for informing the second television set 4 (herein after referred to as "the other television set") of the power-on of the first television set 2 (herein after referred to as "the own television set"). If there is any other information such as the channel number, or the state of the first home electric appliance 27, the information is also attached to the e-mail. The automatic e-mail sending process in step S4 is similar to those appears in other steps, the details of the process being explained later.

Next, in step S6, display process is carried out, in which the display explained with respect to FIGS. 2 and 3 relating to the change in conditions of the own television set or the other television set is treated, the details of which will be described later.

Following the above steps, the flow checks in step S8 whether or not any operation, such as the change in channel or volume, is done in the own television set. If some operation is detected in step S8, the flow advances to step S10 for automatic e-mail sending process to inform the other television set of the operation, the flow then going to step S12. If any operation is not detected in step S8, on the other hand, the flow directly goes to step S12.

In step S12, it is checked whether or not any change such as power-on or power-off, in the first home electric appliance (herein after referred to as "the own electric appliance") occurs. If some change in the own electric appliance is detected in step S12, the flow advances to step S14 for automatic e-mail sending process to inform the other television set of the change, the flow then going to step S16. If any change is not detected in step S12, on the other hand, the flow directly goes to step S16.

In step S16, it is checked whether or not any photograph taken the first digital camera 29 is input into the first controller 5 by some means already explained. If some photograph input is detected in step S16, the flow advances to step S18 for automatic e-mail sending process to send the photograph to the other television set, the flow then going to step S20. If any photograph input is not detected in step S16, on the other hand, the flow directly goes to step S20.

In step S20, it is checked whether or not a operation for viewing a received photograph is done by means of the first remote controller 7. If the operation is detected in step S20, the flow advances to step S22 for automatic e-mail sending process to inform the other television set of the photograph viewing operation, the flow then going to step S24. If any photograph viewing operation is not detected in step S20, on the other hand, the flow directly goes to step S24.

In step S24, it is checked whether or not any e-mail form the other television set is received. If the receipt of the e-mail is detected in step S24, the flow advances to step S26 for automatic information storage process to automatically read the e-mail and the attachment to store the contents of the attachment into the first memory 6 as the first storage information 23, the flow then going to step S28. If any receipt of e-mail is not detected in step S24, on the other hand, the flow directly goes to step S28.

The steps S8 to S22 of the first controller 5 are explained for the first television set 2 to inform the second television set 4 of the condition of the first home 1. The similar function is also carried out by the second controller 9 in the second television set 4. Thus, any change in condition of the second home 3 automatically causes an e-mail informing the first television set 2 of the condition of the second home 3.

The function in steps S24 and S26 for the first controller 5 is to automatically read the e-mail thus sent from the second television set 4 to store the information in the attachment thereof into the first memory 6 for looking after the second home 3

In step S28, it is checked whether or not a power-off operation is done. If the power-off operation is not detected in step S28, the flow returns to step S6. Therefore, if some change in the first storage information 23 is caused by the automatic information storage process in step SS28, the indication in the first display 8 is changed by display process in step 8. Thus, the condition in the second home 3 is monitored in the first display 8.

Unless the power-off operation is detected in step S28, the flow repeats the loop of steps S 6 to S28. During the repletion of the loop, an e-mail is sent to the second television set 4 if any change occurs on the side of the first home 1, and the indication on the first display 8 is changed if any change occurs on the side of the second home 3.

On the other hand, if the power-off operation is detected in step S28, the flow advances to step S30, in which an automatic e-mail sending process is carried out to inform the other television set of the power-off of the own television set, the flow then going to step S32. In step S32, the shutting down process is carried out to power-off the own television set, the flow then go to the end.

Even in the power-off state, the first television set 2 is provided with a standby power, which keeps the first remote control receiver 13 in the standby state to detect the infrared signal from the first remote controller 7 any time. Also, the first communicator 15 is provided with a standby power, which keeps the first communicator 15 in the standby state to detect the arrival of e-mail to an outside server in constant connection. The necessary elements in the second television set 4 are also provided with a standby power in its power-off state for the similar functions.

Figure 5:
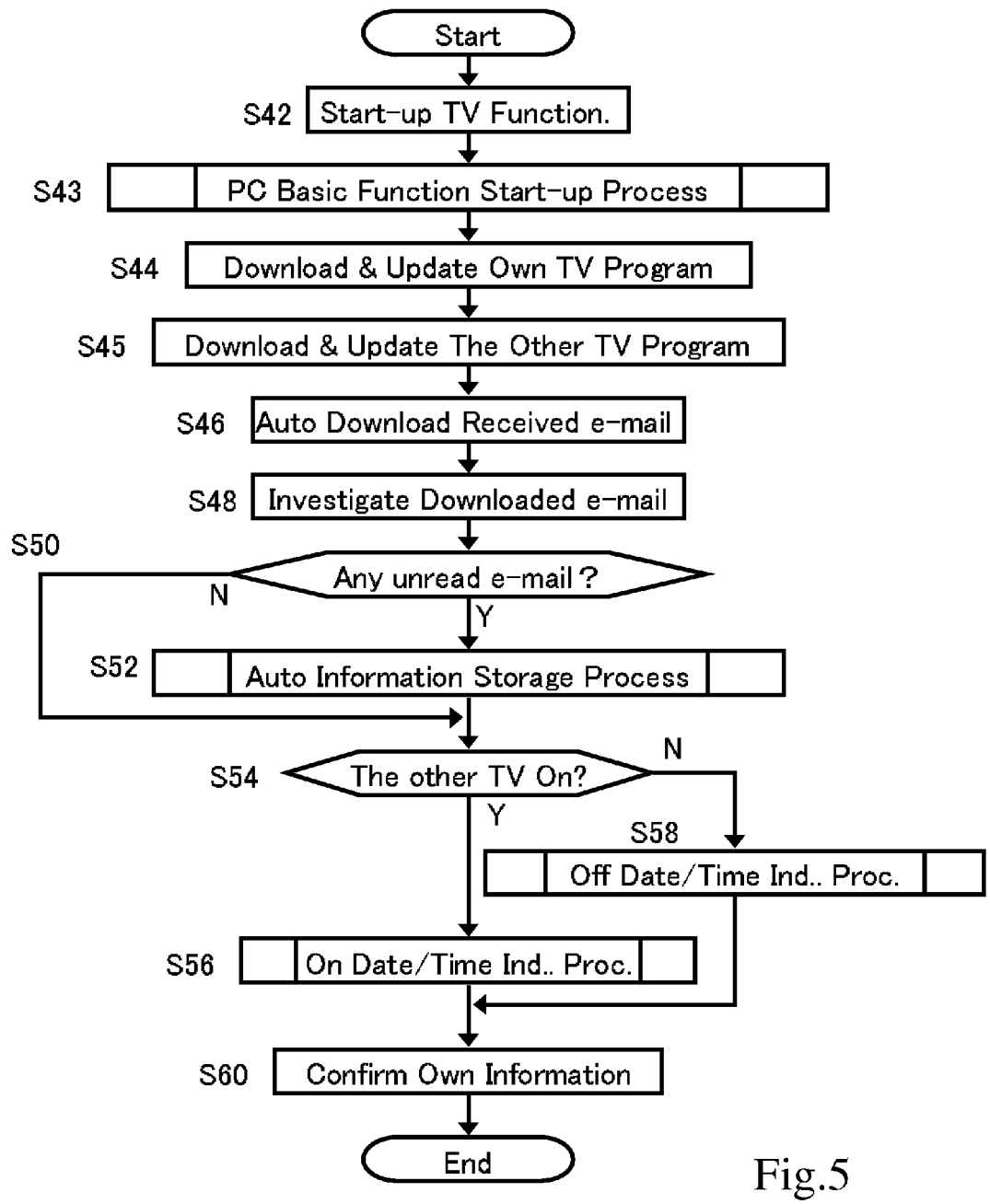
FIG. 5 is a flow chart showing the detail of step 2 in FIG. 4 that relates to the start-up process for the television function and the communication function.

FIG. 5 is a flow chart showing the detail of step 2 in FIG. 4 that relates to the start-up process for the television function and the communication function. When the start-up process is initiated, the flow advances to step S42 to start-up the television function. And the flow advances to step S43, in which the personal computer start-up process is carried out to start-up the basic function of the personal computer hardware and software. The personal computer start-up process, the detail of which will be described later, includes a process for setting the communication function of the personal computer to serve as the communicator for the television set according to this invention, which is additional to and different from the conventional communication function in the personal computer. The start-up process in step 43 is limited to start-up only the hardware and software which are necessary to carry out the television set functions according to this invention unless the conventional personal computer functions are requested. Such a start-up process with limited function is advantageous to minimize the time taken in the start-up of the television set.

Next, in step S44, the latest broadcast program schedule in the area of the own television set is downloaded through the internet, the program schedule stored in the first memory 6 being updated by the downloaded program schedule.

Further, in step S44, the latest broadcast program schedule in the area of the other television set is downloaded through the internet, the program schedule stored in the first memory 6 being updated by the downloaded program schedule.

The information of latest broadcast program schedule downloaded in steps 44 and 45 can also be gotten through the airwave if it includes such information in addition to the broadcast program.

The downloading and updating of the latest broadcast program schedule in steps 44 and 45 are followed by step S46 in which all the e-mails reaching the server are automatically downloaded. All the downloaded e-mails are automatically investigated in step S48. In this step, e-mails which have been downloaded in advance to step S46, i.e., already downloaded e-mails which have not been read yet are also investigated.

After investigating e-mails, the flow advances to step S50 to check where there is any unread e-mail. If any, the flow advances to step S52 to execute the automatic information storage process, the flow then going to step S54. The automatic information storage process in step S52 is similar to that in step S26 in FIG. 4, the details of which will be explained later.

As has been explained, the indications on the first display 8 in FIG. 2 are updated in response to the change in the information stored by the automatic information storage process. In addition to such updating during the own television set is in power-on state, the first display 8 is to perform a specific indication when the own television set is turned on. Steps 54 to 58 are necessary for such a specific indication.

Firstly, in step S54, it is checked in accordance with the first storage information whether or not the other television set is in power-on state when the own television set is turned on. If the other television set is in power-on state, the flow advances to step S56 to perform the other television set power-on time indication process. This process is to indicate on the first display 8 the power-on time and the channel change time to the current channel with respect to the other television set. The indication is made on the basis of the first storage information 23 in such a manner that the indication is made with enlarged character to draw attention of the person of the first home 1.

The reason why the time indication above is made is as follows. Namely, the fact that the other television set is in power-on state at the time when the own television set is turned on by means of channel number 53 appearing in the first display 8. However, it is unknown when the other television set was turned on. In other word, for example, it cannot be decided at all whether the other television set was turned on only 30 minutes ago or the other television set are left in power-on state for 5 hours. Therefore, the time when the other television set was turned on and the time when the channel was changed to the current channel are indicated in step S6. Thus, the history of the operation of the other television set is known when the own television set is turned on, which makes the person of the first home 1 feel at ease in remotely watching over the second home 3. In step S56, the time indication continues only for a predetermined period e.g. 10 seconds, after the power-on of the own television set to automatically discontinue not for otherwise needlessly intercepting the broadcast program indication.

On the other hand, if it is determined in step S4 that the other television set is in power-off state, the flow goes to step S58 to execute the other television set power-off time indication process. Thus, for example, it can be decided whether the other television set was turned off just 10 minutes ago or the other television set are left without turning on for entire one day. Thus, the person of the first home 1 feels at ease in remotely watching over the second home 3.

The other part of the other television set power-off time indication process in step S58 is similar to the other television set power-on time indication process in step S56. So, further explanation is omitted for avoiding a needless duplication.

As is apparent from the above, steps S54 to S58 are automatically executed only in the start-up process. As is understood by FIG. 4, once the other television set is turned on, the time or history of the operation of the other television set is not indicated on the first display 8 even if there is some change in the operation of the other television set, but only the current state, such as current channel number 53 is indicated. However, if the person in the first home 1 wants to know the information of the time or history of the operation of the other television set, steps 54 to S58 respond any time to an operation of the first remote controller 7.

After termination of step S56 or S58, the flow goes to step S60 in which the information of own television set to be indicated on the first display or sent to the other television via e-mail is confirmed, and then the flow terminating. The information to be confirmed in step S60 includes the channel number of the first television set 2 and the condition of the first home electric appliance 27.

Figure 6:
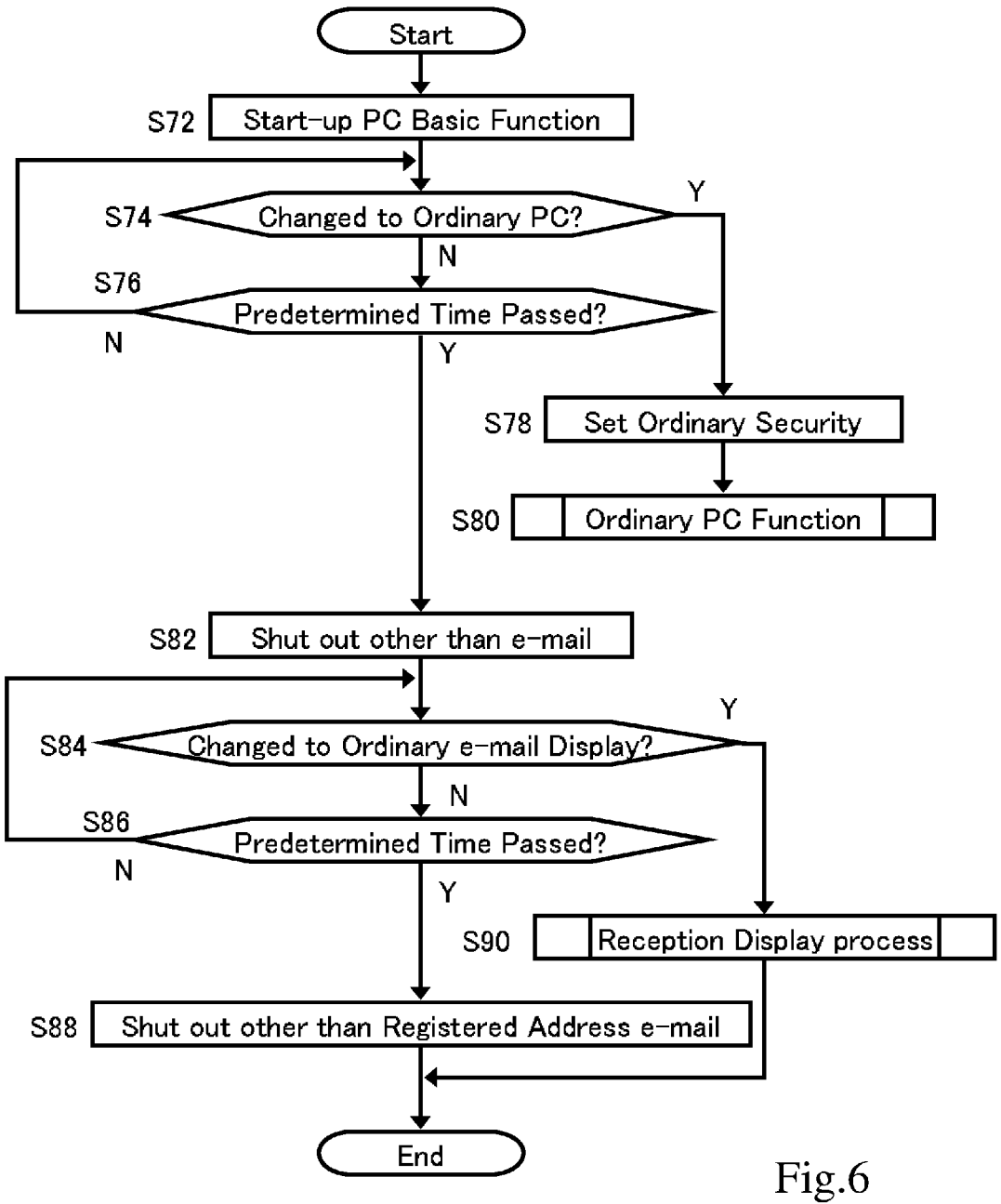
FIG. 6 is a flow chart showing the detail of the personal computer start-up process in step S43 of FIG. 5.

FIG. 6 is a flow chart showing the detail of the personal computer start-up process in step S43 of FIG. 5. When the personal computer start-up process is initiated, the flow advances to step S72 to start-up the basic function of the personal computer. As has been explained, the basic function is limited to start-up only the hardware and software which are necessary to carry out the television set functions according to this invention. In other words, the basic function is limited to the function relating to the first communicator 15.

And the flow advances to step S74 to check whether or not the switching of the personal computer to the ordinary computer function is directed by the first remote controller 7. If such a switching direction is not detected in step S74, the flow advances to step S76 to check whether or not a predetermined time has passed since the starting-up of the basic function of the personal computer in step S72. The flow returns to step S74 if the predetermined time has not passed in step S76. Thus, the flow waits for the switching direction for the predetermined time.

If the switching is directed in step S74, the flow advances to step S78, in which the communication security of the ordinary level is set, the flow then going into ordinary personal computer functions in step S80. In other words, in step S80, the flow starts-up the ordinary software and hardware functions of the personal computer other than the basic function relating to the first communicator 15 which has been started-up in step S72. In step 80, the ordinary personal computer functions are carried out in accordance with the operation by the user of the personal computer. Further, in step S80, it is possible to go to step S82 if the personal computer is switched buck to the television function in response to the first remote controller 7. In this case, the ordinary software and hardware are other than the basic function relating to the first communicator 15 is shut down in advance to go to step S82. The ordinary function of software and hardware of the personal computer are well known, any additional explanation being believed to be unnecessary.

If it is detected in step S76 that the predetermined time has passed, the flow advances to step S82. Thus, if a person who has no knowledge of handling the personal computer leaves the television set without any operation further to the power-on operation, the flow automatically reaches to step 82. In other words, there is no problem in operating the television set caused by adding the personal computer function to the television set.

The steps lead by step S82 are for a process of protecting the personal computer from virus otherwise suffered from the constant connection. The antivirus process lead by step S82 is stricter than in the communication security of the ordinary level in step 78. In other words, since the personal computer function utilized in the television set according to this invention is substantially limited to the e-mail function with a predetermined person or home, the other type of access to the personal computer, which would be allowed in the security level of step S78, is strictly shut out.

The antivirus process begins with step S82 to set the personal computer to shut out any access to the computer other than e-mails Thus, an attack to the computer other than e-mail is blocked.

Next in step S84, it is checked whether or not a setting is done to automatically give on the first display 8 a notice of arrival of ordinary e-mail other than the automatic e-mail for information exchange between the first television set 2 and the second television set 4. If there is no setting detected in step S84, the flow advances to step S86 to check whether or not a predetermined time has passed since the setting in step S82. The flow returns to step S84 if the predetermined time has not passed in step S86. Thus, the flow waits for the setting is detected in step S84 for the predetermined time. And, if it is detected in step S86 that the predetermined time has passed, the flow advances to step S88.

Thus, if a person who has no knowledge of handling the personal computer leaves the television set without any operation further to the power-on operation, the flow automatically reaches to step 88. In other words, there is no problem in operating the television set caused by adding the ordinary e-mail function to the television set.

In step S88, the personal computer is set to shut out e-mail from an address other than the registered ones. For example, the computer is set to only accept e-mail from the second television set 4. Thus, an attack to the computer through e-mail from a stranger is shut out. Further, step S88 may be modified to shut out e-mail unless a predetermined form of information is attached even if the e-mail is from the registered address.

On the other hand, if it is detected in step S84 that the ordinary e-mail notice setting is done, the flow advances to step S90, in which notice preparation process is carried out for preparing to automatically give on the first display 8 a notice every time when an ordinary e-mail arrives. Since step S90 skips step S88, a risk of an attack to the computer through an e-mail from a stranger is left.

If step S88 or step 90 has done, the personal computer start-up process is terminated.

Figure 7:
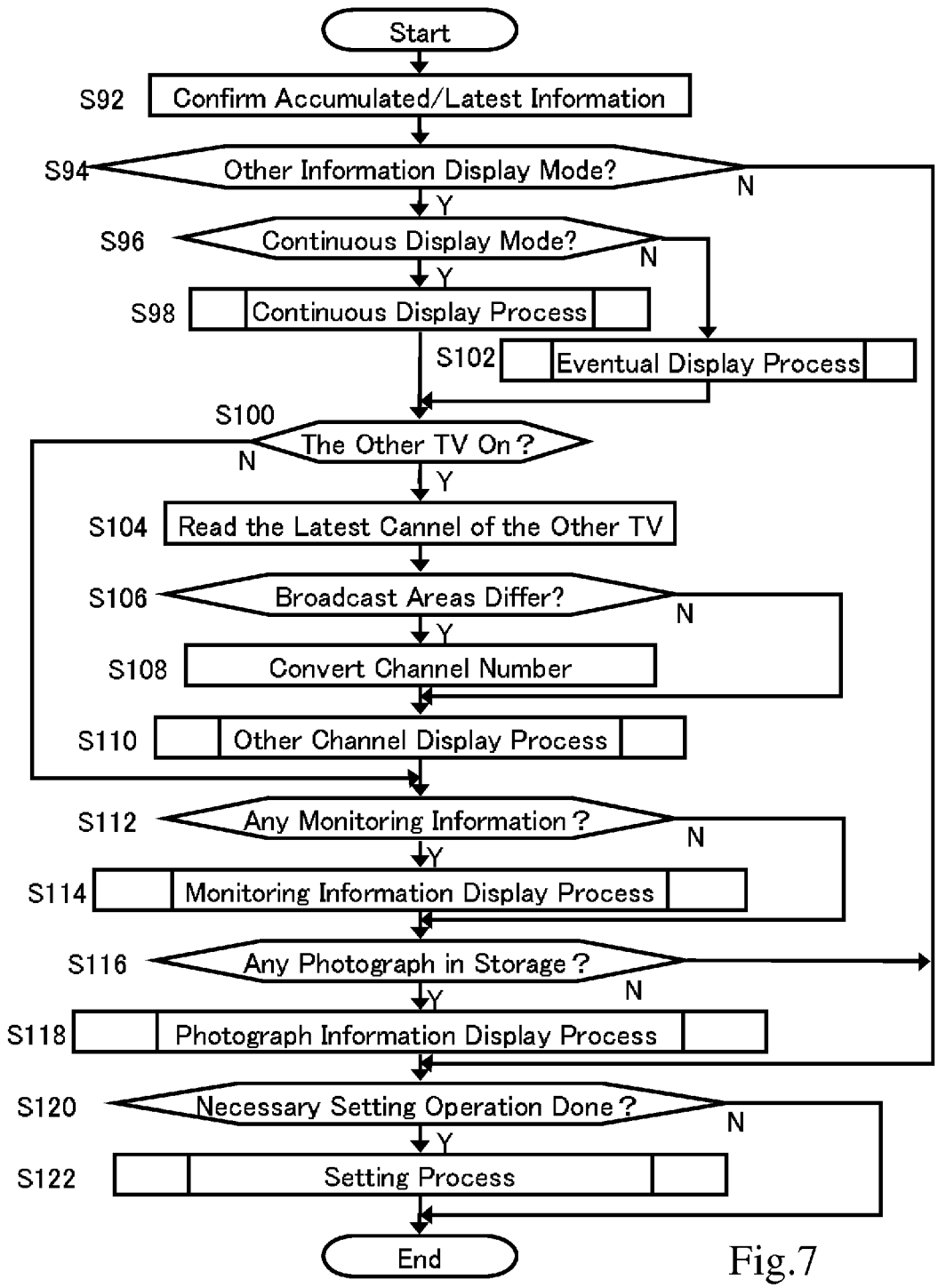
FIG. 7 is a flow chart showing the detail of display process in step 6 of FIG. 4.

FIG. 7 is a flow chart showing the detail of display process in step 6 of FIG. 4. If the display process starts, the accumulated and the latest information relating to the second home 3 is confirmed in step S92 on the basis of the first storage information. The information of the second home 3 confirmed in step S92 is utilized in carrying out the following steps.

Next in step S94, it is checked whether or not the other information display mode is set for the first television set 2 to monitor the second home 3. If it is detected in step S94 that the other information display mode is set, the flow advances to step S96 to check whether the continuous display mode is set. If it is detected in step S96 that the continuous display mode is set, the flow advances to step S98 to carry out the continuous display process, the flow then going to step S100. On the other hand, non-detection in step S96 of the continuous display mode setting means that the mode is the eventual display mode. So, the flow goes to step S102 to carry out the eventual display process, the flow then going to step S100.

In the eventual display process in step S102, a preparation to automatically start the display only when one of the first television set 2 or the second television set 4 is operated, and in turn, to automatically terminate the display when a predetermined time, e.g., 10 seconds, elapsed. The eventual display process in step S102 also includes the blink or enlargement of the character or generation of beep in response to the operation of the second television set 4, In step S100, it is checked whether or not the second television set 4 (the other television set) is in on-state on the basis of the first storage information 23. If it is confirmed in step S100 that the other television set is in on-state, the flow goes to step S104 to read out the latest information of channel of the second television set 4 on the basis of the first storage information 23. And then, in step 106 it is checked whether or not the own television set and the other television set are in the different broadcast program areas from each other. If the areas differ, the flow goes to step S108 to convert the channel number, the flow the going to step S110. The channel number conversion carried out in step S108 corresponds to the conversion of channel "3" on the second display 12 at channel number 61 in FIG. 3 (own channel number) into channel "12" on the first display 8 at channel number 53 in FIG. 2 (the other channel number), for example. On the other hand, if it is not determined in step S106 that the areas differ, the flow directly goes to step S110.

In step S110, the other channel display process is carried out for displaying on the first display 8 the information of channel selected by the second home 3. And then, the flow goes to step S112. The other channel display process will be discussed in more detail with some additional functions.

In step S100, on the other hand, if the other television set is in off-state, the flow goes directly to step S112 since there is no need of the display relating to the other television set. Alternatively, step S100 with the other television set in off-state may be followed by a step of displaying a notice that the other television set is in off-state in place of directly going to step S112.

In step S112, it is checked whether or not any monitoring information for the second home 3 is in the first storage information 23. And, if any, the flow advances to step 114 to carry out the monitoring information display process, the flow then going to step S116. On the other hand, if there is no monitoring information in the first storage information 23, the flow directly goes to step S116. The monitoring information display process in step S114 is to make a warning in response to a predetermined condition, the detail of which will be explained later.

In step S116, it is checked whether or not any photograph to be displayed is in the first storage information 23. And, if any, the flow advances to step 118 to carry out the photograph information display process, the flow then going to step S120. On the other hand, if there is no photograph information in the first storage information 23, the flow directly goes to step S120. The detail of the photograph information display process in step S118 will be explained later.

If it is detected in step S94 that the other information display mode is not set, the flow directly goes to step S120 since no display nor process for display is needed.

In addition to the above steps for the display process, it is checked in step S120 whether or not necessary operation is done for making it possible for the first television set 2 and the second television set 4 to communicate with each other. If such operation is detected in step S120, the flow advances to step S122 for the setting process, and then the flow terminates. On the other hand, if such operation is not detected in step S120, the flow instantly terminates.

Figure 8:
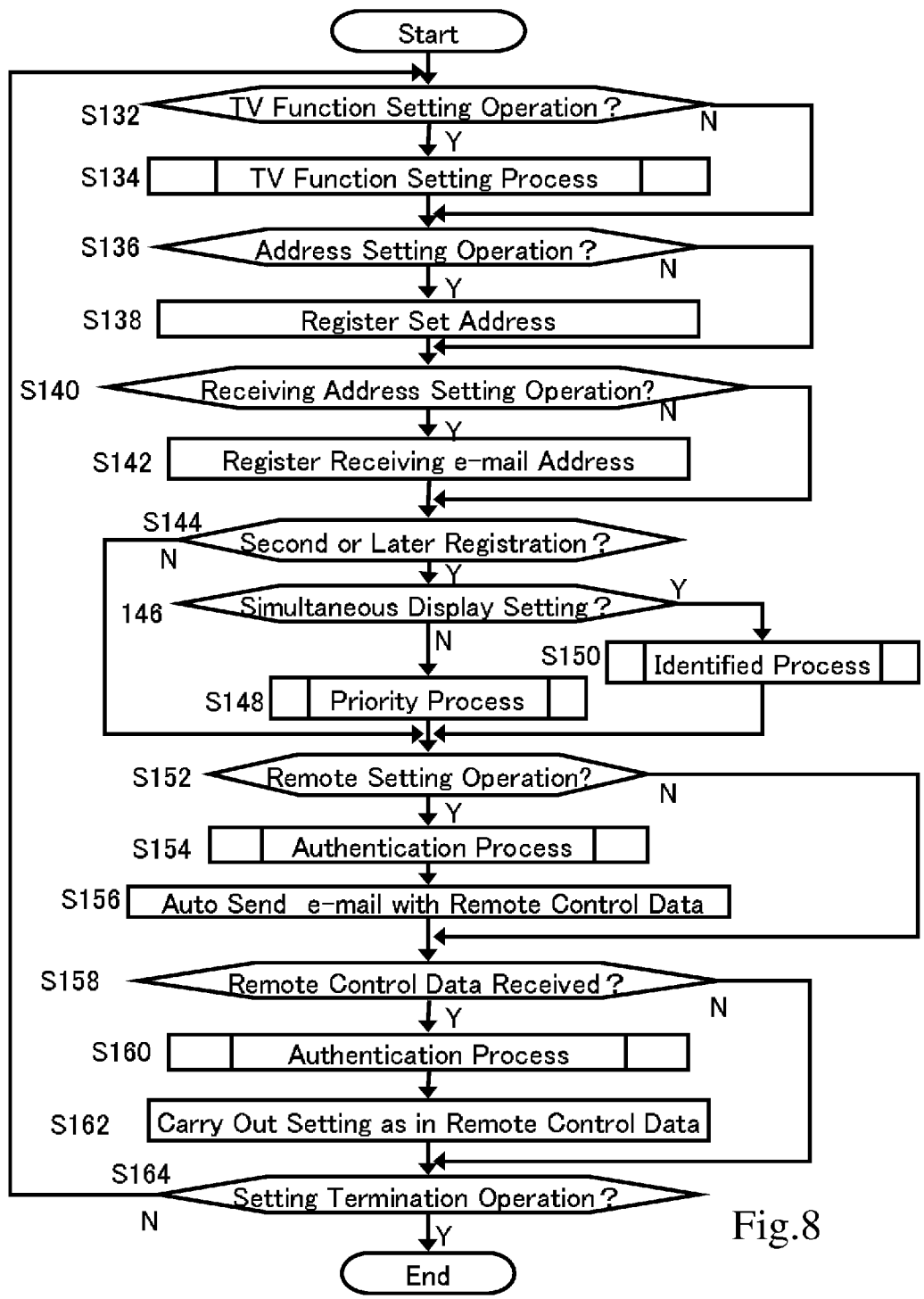
FIG. 8 is a flow chart showing the detail of the setting process in step S122 of FIG. 7.

FIG. 8 is a flow chart showing the detail of the setting process in step S122 of FIG. 7. Various date set in this process are stored in the first memory 6.

If the setting process starts, it is checked in step S132 whether or not the operation has been done for setting television set function. And, if it is detected in step S132 that the operation is for setting television set function, the flow advances to step S134 to carry out the television function setting process, in which desired various settings are done by the operation of the first remote controller 7 in accordance with a series of the input instructions on the first display 8. If the television function setting process is completed, the flow advances to step S136. On the other hand, if it is not detected in step S132 that the operation is for setting television set function, the flow directly goes to step S136.

The steps lead by step S136 are for a process of setting the function relating to the automatic e-mail exchange between the owe television set and the other television set. Initially in step S136, it is checked whether or not the operation has been done for setting address for sending e-mail. If it is detected that the operation is done for setting address for sending e-mail, the flow advances to step S138 to register one address for sending e-mail. Such an operation for registering the address is done by the operation of the first remote controller 7 in accordance with a series of the registering instructions on the first display 8. If the registering of one address is completed in step S138, the flow goes to step S140. On the other hand, if the operation is not for setting address of the other television set in step S136, the flow directly goes to step S140.

In step S140, it is checked whether or not the operation has been done for setting address for receiving e-mail. If it is detected that the operation is done for setting address for receiving e-mail, the flow advances to step S142 to register one address for receiving e-mail. The operation for registering the address for receiving e-mail is also done by the operation of the first remote controller 7 in accordance with a series of the registering instructions on the first display 8. If the registering of one address is completed in step S142, the flow goes to step S144. On the other hand, if the operation is not for setting address for receiving e-mail, the flow directly goes to step S144.

In step S144, it is checked whether or not the registered address is the second one or later. If it is detected that the registered address in not the first one, i.e., the second one or later, the flow advances to step S146 to check whether or not the simultaneous display setting has been done to display all the received e-mail regardless of the address. If it is detected that the simultaneous display setting has not been done, the flow goes to step S148, in which the selective priority display process is to be carried out.

The selective priority display process in step S148 is to be explained in reference to FIG. 2. According to the selective priority display process, even if more than two addresses for receiving e-mail are registered, information from only the predetermined first priority address is displayed at the other channel number 53, electric appliance icon 54 and camera icon 55 in the first display 8 of FIG. 2 with no display of information from those of any of the other addresses. For example, provided that there are two registered addresses consisting of an address of the parents of the husband of the first home 1 and that of the wife of the first home 1 with the latter predetermined as an address of the first priority, only the information of the parents of the wife of the first home 1 is displayed at the other channel number 53, electric appliance icon 54 and camera icon 55 in the first display 8 of FIG. 2

If it is desired to display information of the parents of the husband, the first remote controller 7 is operated. And, the display at the other channel number 53, electric appliance icon 54 and camera icon 55 in the first display 8 of FIG. 2 is replaced by the information of the parents of the husband. Thus, according to the selective priority display process, only the information of the first priority is displayed at the upper-left corner of the first display 8 upon starting-up of the first television set 2 with the display replaced by the information of the next priority one by one upon every operation of the first remote controller 7 in a cyclic manner.

The above is the contents of display carried out in accordance with the selective priority display process in step S148.

On the other hand, if it is detected in step S146 that the simultaneous display setting has been done, the flow advances to step S150, in which the identified display process is carried out. The identified display process in step S150 is to be explained also n reference to FIG. 2. According to the identified display process, information through e-mails from all the registered addresses is simultaneously displayed at the upper-left corner of the first display 8 in FIG. 2 with some measure for identifying each of addresses form the others implemented. For example, provided that the address of the parents of the husband of the first home 1 and that of the wife of the first home 1 are registered, the display is made in two columns with information form the husband parents address at the left column and that form the wife parents address at the right column. Thus, by means of predetermining the layout to be assigned to information from the plurality of addresses, the identification of the information is possible.

In the layout above, it is possible for the purpose of saving the area of the first display 8 to shift the column of display for the information from parents of wife to the left if there is no information from the parents of husband. To identify thus shifted column from the column for parents of husband, an icon representing the parents of wife is put at the top of the shifted column, an icon representing the parents of husband being of course put at the top of the column if there is information thereof. Alternatively, the identification is possible by means of making the color of display for each column different from that for the others.

The above is the contents of display carried out in accordance with the identified display process in step S150.

The selection whether or not to set the simultaneous display is possible in advance by the first remote controller 7 according to the guide on the first display 8. Step 146 decides whether to go to step 148 or to step 150 in accordance with the result of such selection in advance.

After the process in step S148 or step 150, the flow advances to step S152. It should be noted that the flow directly goes from step S144 to step S152 if it is detected in step S144 that the registered address is the first one.

It may not easy for a person, especially an old person living alone, who is not familiar with a television setting in detail to set the address for automatically sending e-mail. In other words, there may be a cease in which the necessary television setting by a person to be monitored is impossible by itself. For example, unless the operation is made at the second television set 4 to set the address of first television set 2 to which the automatic e-mail is sent, it is impossible for the first home 1 to monitor the second home 3 by means of the first television set 2. The steps lead by step S152 are for a process to solve this problem by means of, for example, making it possible for the first television set 2 to remotely control the second television set 4 to set the address for automatically sending e-mail.

In step S152, it is checked whether or not the operation for remotely controlling the other television set to register the address for automatically sending e-mail is done. And, if such an operation is made, the flow advances to step S154 to carry out the authentication process. If the authentication by the second television set 4 that the first television set 2 is true is successful, the flow is allowed to advance to step S156 for sending e-mail to the second television set 4 with the remote control data attached, the flow then going to step S158.

If it is not detected in step S152 that the operation for remotely controlling the other television set is done, the flow directly goes to step S158. The above is the process for making it possible for the first television set 2 to remote control the second television set 4 to set the address for automatically sending e-mail.

The flown is not only for the first controller 5, but also for the second controller 9 in common. So, the flow includes a process necessary for the own television set to function in response to a remote control by the other television set. The steps lead by step S158 are for such a process.

Thus the following explanation of FIG. 8 will be made that the flow is of the second controller 9 of the second television set 4 in response to the remote control by the first television set 2. In step S158, it is checked whether or not an e-mail with the remote control data attached is received form the other television set. If such an e-mail is received, the flow advances to step S160 in which an authentication is made with the first television set 4 to confirm that the sender of the e-mail is truly the first television set 2. If the authentication in step S160 is successful, the flow advances to step S162 to carry out the function as directed by the remote control data attached to the e-mail, the flow then going to step S164. Thus, the setting of address of sending e-mail from the second television set 4, which has been prepared and sent by the first television set 2, is registering in the second memory 10.

On the other hand, if it is not detected in step S158 that any e-mail with the remote control data attached is received form the other television set, the flow directly goes to step S164.

Thus, in the operation for remote control to register the address for automatically sending e-mail, steps S152 to S156 function on the side of remotely controlling the other side while steps S158 to S162 function on the side of being controlled by the other side. And, since the address setting is an important issue affecting the privacy, authentication steps S154 and S160 are absolutely necessary to prevent a fraud remote control by impersonation.

Though not shown in FIG. 8, if the authentication fails in step S154, the flow goes to a step of displaying thereof and then to step 158. Similarly, if the authentication fails in step S160, the flow goes to a step of displaying thereof and then to step 164. Thus, no remote control data is sent, nor any address setting is carried out on the basis of received remote control data.

In step S164, it is checked whether or not a setting termination operation is made to terminate the flow upon detection of such an operation. On the other hand, if no such an operation is detected in step S164, the flow returns to step S132 and the loop of steps S132 to S164 is repeated unless the setting termination operation is detected in step S164. Thus, the flow can respond to any operation done during the repletion of the loop.

Figure 9:
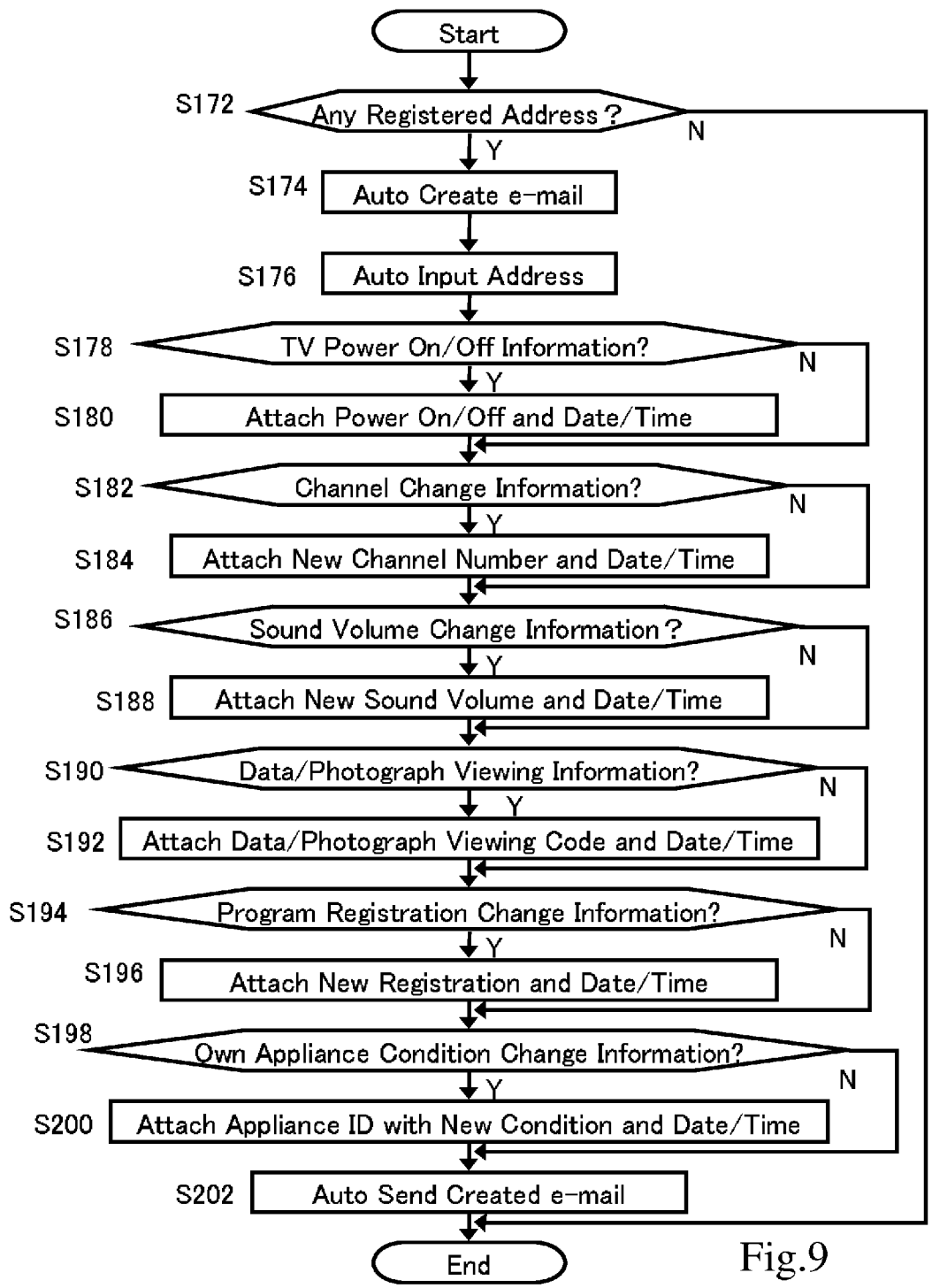
FIG. 9 is a flow chart showing the detail of the automatic e-mail sending process carried out in any of steps S4, S10, S14, S22 and S30 of FIG. 4.

FIG. 9 is a flow chart showing the detail of the automatic e-mail sending process carried out in any of steps S4, S10, S14, S22 and S30 in FIG. 4. If the automatic e-mail sending process setting process starts, it is checked in step S172 whether or not an address for automatically sending an e-mail is registered.

If it is detected that an address to which an e-mail is sent is registered, the flow advances to step S174 to automatically create an e-mail, an address being then automatically input in step S176 in accordance with the registration thereof. If there are addresses more than two are registered, all of the addresses are input. And, the flow advances to steps lead by step S178 in which various attachments are confirmed and automatically attached to the created and addressed e-mail.

In step S178, it is checked whether or not the information to be attached relates to the power-on or power-off of the television set. And the flow goes to step S180 if the information is of the power-on or power-off. In step S180, the code representing the power-on or power-off with the date and time at which such an operation was made are attached to the e-mail. Further, in the case of the power-on, the channel number at the time of power-on is further attached to the e-mail. The flow goes to step 182 after completion of the attachment of the information in step S180. On the other hand, the flow directly goes to step S182 if the information does not relates to the power-on or power-off.

In step S182, it is checked whether or not the information to be attached relates to the change in the channel of the television set. And the flow goes to step S184 if the information is of the change in the channel. In step S184, the new channel number with the date and time at which such change was made are automatically attached to the e-mail. The flow goes to step 186 after completion of the attachment of the information in step S184. On the other hand, the flow directly goes to step S186 if the information does not relates to the change in channel.

In step S186, it is checked whether or not the information to be attached relates to the change in the sound volume of the television set. And the flow goes to step S188 if the information is of the change in the sound volume. In step S188, the numerical information for the new sound volume with the date and time at which such change was made are attached to the e-mail. The flow goes to step 190 after completion of the attachment of the information in step S188. On the other hand, the flow directly goes to step S190 if the information does not relates to the change in sound volume.

In step S190, it is checked whether or not the information to be attached relates to the viewing of the recorded or downloaded broadcast program or the received photograph. The recorded or downloaded broadcast programs are stored in the first memory 6 of large capacity inside the television set. Alternatively, the recorded or downloaded broadcast programs are stored in an outside storage such as video tape recorder or digital disc recorder.

And the flow goes to step S192 if the information relates to the viewing of the recorded or downloaded broadcast program or the received photograph. In step S192, the code representing the fact of viewing and the date and time at which the viewing of the broadcast program was started and ended are automatically attached to the e-mail. If an ID code identifying the broadcast program is included in the viewed data as in the case of digital broadcast program data or downloaded broadcast program data, such an ID is also attached to the e-mail in step S192.

If the viewed data is the received photograph, an ID of each photograph viewed or ID of a group of photographs in the case of being sent in a lump with the date and time at which each photograph is viewed are automatically attached to the e-mail in step S192. The flow goes to step 194 after completion of the attachment of the information in step S192. How to use the information attached in step S192 will be explained later. On the other hand, the flow directly goes to step S194 if the information does not relates to the viewing of the recorded or downloaded broadcast program or the received photograph.

In step S194, it is checked whether or not the information to be attached relates to the change in registration of the regularly viewed broadcast program. And the flow goes to step S196 if the information is of the change in such a registration. In step S196, the information of change in registration with the date and time at which such registration change was made are automatically attached to the e-mail. The information of change in registration includes the code representing the fact of the addition or deletion and the ID of the added or deleted broadcast program to or from the registration. The flow goes to step 198 after completion of the attachment of the information in step S196. On the other hand, the flow directly goes to step S198 if the information does not relates to the change in registration of the regularly viewed broadcast program.

In step S198, it is checked whether or not the information to be attached relates to the change in the condition of the home electric appliance. And the flow goes to step S200 if the information is of the change in the condition of the home electric appliance. In step S200, the ID of the home electric appliance and its condition with the date and time at which such change occurred are attached to the e-mail. The flow goes to step 202 after completion of the attachment of the information in step S200. On the other hand, the flow directly goes to step S202 if the information does not relates to the change in the condition of the home electric appliance.

In step S202, the e-mail created and addressed in the above steps with the information attached in the above steps is automatic sent to the other television set. And then the flow terminates. On the other hand, the flow instantly terminates without any action if it is not detected in step S172 that any address for automatically sending an e-mail is registered.

Figure 10:
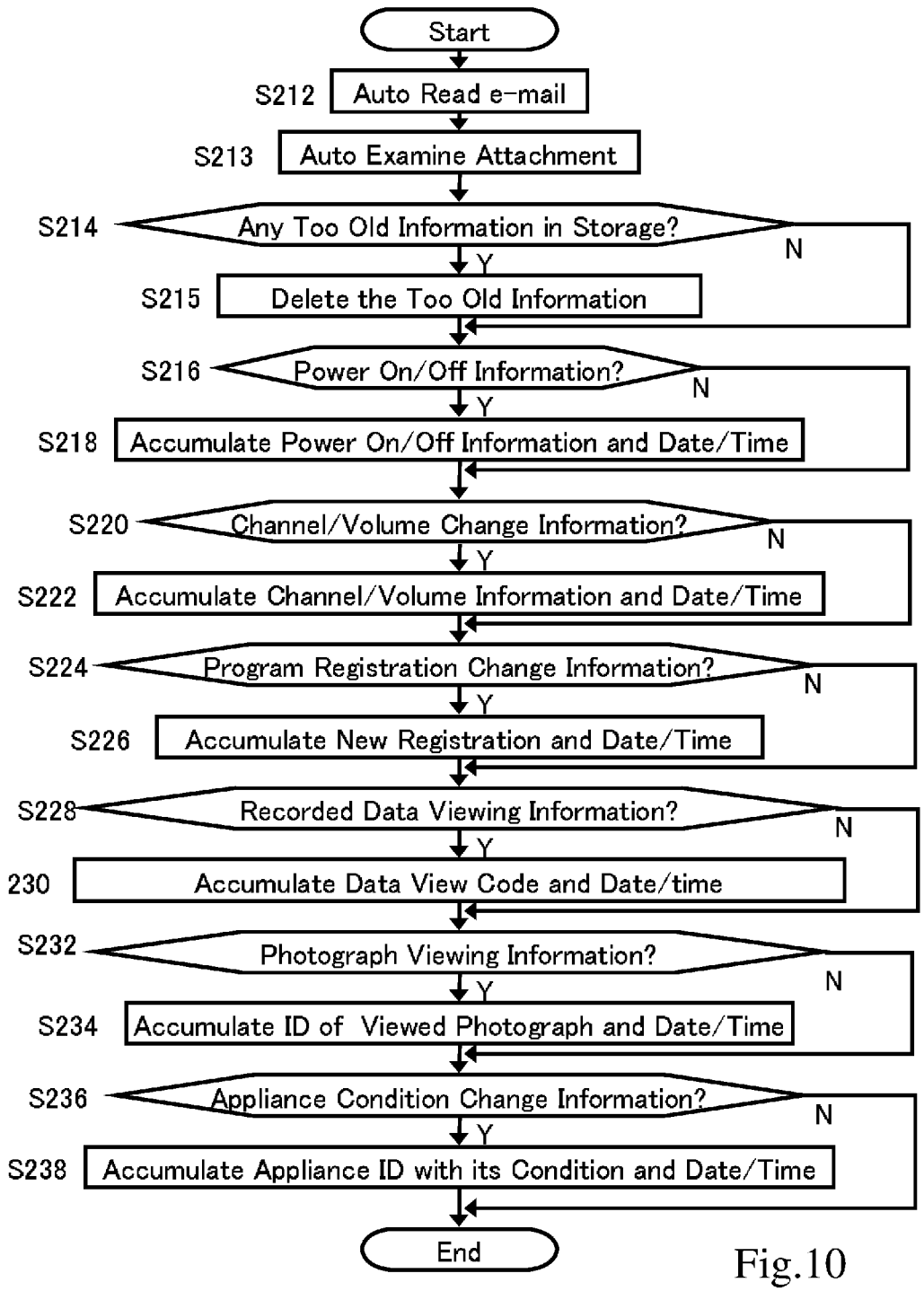
FIG. 10 is a flow chart showing the detail of the automatic information storage process in step S26 of FIG. 4 and step S52 of FIG. 5.

FIG. 10 is a flow chart showing the detail of the automatic information storage process in step S26 of FIG. 4 and step S52 of FIG. 5. If the automatic information storage process starts, the received e-mail is automatically read in step S212, and the attachment to the read e-mail is automatically examined in step S213.

Next, it is checked in step S214 whether or not the first storage information 23 includes too old information to take into consideration in statistics or analysis. If such old information is in the first storage information 23, the old information is completely deleted from the first storage information 23 in step S215, the flow the going to step S216. On the other hand, there is no such old information in the first storage information 23, the flow directly goes from step 214 to step S216. The limit for judging whether the information is too old or not in step S214 can be individually set depending on the nature of the information. For example, the power-on or power-off and the channel changing which are daily repeated are accumulated for a relatively long term for analyzing the regular pattern of life. On the other hand, the viewing of photograph which temporarily occurs is not meaningful to accumulate for a long term, but the sent photograph is to be monitored every time not to leave unviewed.

The deletion of old data in step S215 is mainly for ordering the necessary data and for saving the capacity of the memory 6. Further, the deletion of old data is advantageous in case that a time bomb type virus attached to an e-mail is invading into the first storage information 23 since such a virus may hopefully be deleted before its expression.

In the steps lead by step 216, the S140, the attachment information examined in step S213 is stored in memory 6 as the first storage information 23.

In step S216, it is checked whether or not the attached information relates to the power-on or power-off of the other television set. And the flow goes to step S218 if the information is of the power-on or power-off. In step S218, the code representing the power-on or power-off with the date and time at which such an operation was made are added to and accumulated in the first storage information 23. Further, in the case of the power-on, the channel number at the time of power-on is further added to the first storage information 23. The flow goes to step 220 after completion of the addition and accumulation of the information in step S218. On the other hand, the flow directly goes to step S220 if the information does not relate to the power-on or power-off of the other television set.

In step S220, it is checked whether or not the attached information relates to the change in channel or sound volume at the other television set. And the flow goes to step S222 if the information is of the channel change or sound volume. In step S222, the new channel number or numerical information for the new sound volume with the date and time at which such a change operation was made are added to and accumulated in the first storage information 23. The flow goes to step 224 after completion of the addition and accumulation of the information in step S222. On the other hand, the flow directly goes from step S220 to step S224 if the information does not relate to the change in channel or the sound volume at the other television set.

In step S224, it is checked whether or not the attached information relates to the change in registration of the regularly viewed broadcast program. And the flow goes to step S226 if the information is of the change in such a registration. In step S226, the information of change in registration with the date and time at which such registration change was made are automatically added to and accumulated in the first storage information 23. The flow goes to step S228 after completion of the addition and accumulation of the information in step S226. On the other hand, the flow directly goes from step S224 to step S228 if the information does not relate to the change in registration of the regularly viewed broadcast program.

In step S228, it is checked whether or not the attached information relates to the viewing of the recorded or downloaded broadcast program by the other television set. And the flow goes to step S230 if the information relates to the viewing of the recorded or downloaded broadcast program. In step S230, the code representing the fact of viewing and the date and time at which the viewing of the broadcast program was started and ended are automatically added to and accumulated in the first storage information 23. The flow goes to step 232 after completion of addition and accumulation of the information in step S230. On the other hand, the flow directly goes from step S228 to step S232 if the information does not relate to the viewing of the recorded or downloaded broadcast program.

In step S232, it is checked whether or not the attached information relates to the viewing of the photograph at the other television set, the photograph having been sent by the own television set. And the flow goes to step S234 if the information relates to the viewing of the photograph. In step S234, an ID of each photograph viewed or ID of a group of photographs in the case of being sent in a lump with the date and time at which each photograph is viewed are automatically added to and accumulated in the first storage information 23. The flow goes to step 236 after completion of the addition and accumulation of the information in step S234. On the other hand, the flow directly goes to from step S232 step S236 if the information does not relate to the viewing of the photograph at the other television set.

In step S236, it is checked whether or not the attached information relates to the change in the condition of the home electric appliance in the other home. And the flow goes to step S238 if the information is of the change in the condition of the home electric appliance. In step S238, the ID of the home electric appliance with the date and time at which such change occurred at the other home are automatically added to and accumulated in the first storage information 23. The flow terminates the automatic information storage process after completion of the addition and accumulation of the information in step S238. On the other hand, instantly terminates the automatic information storage process if the information does not relate to the change in the condition of the home electric appliance at the other home.

Figure 11:
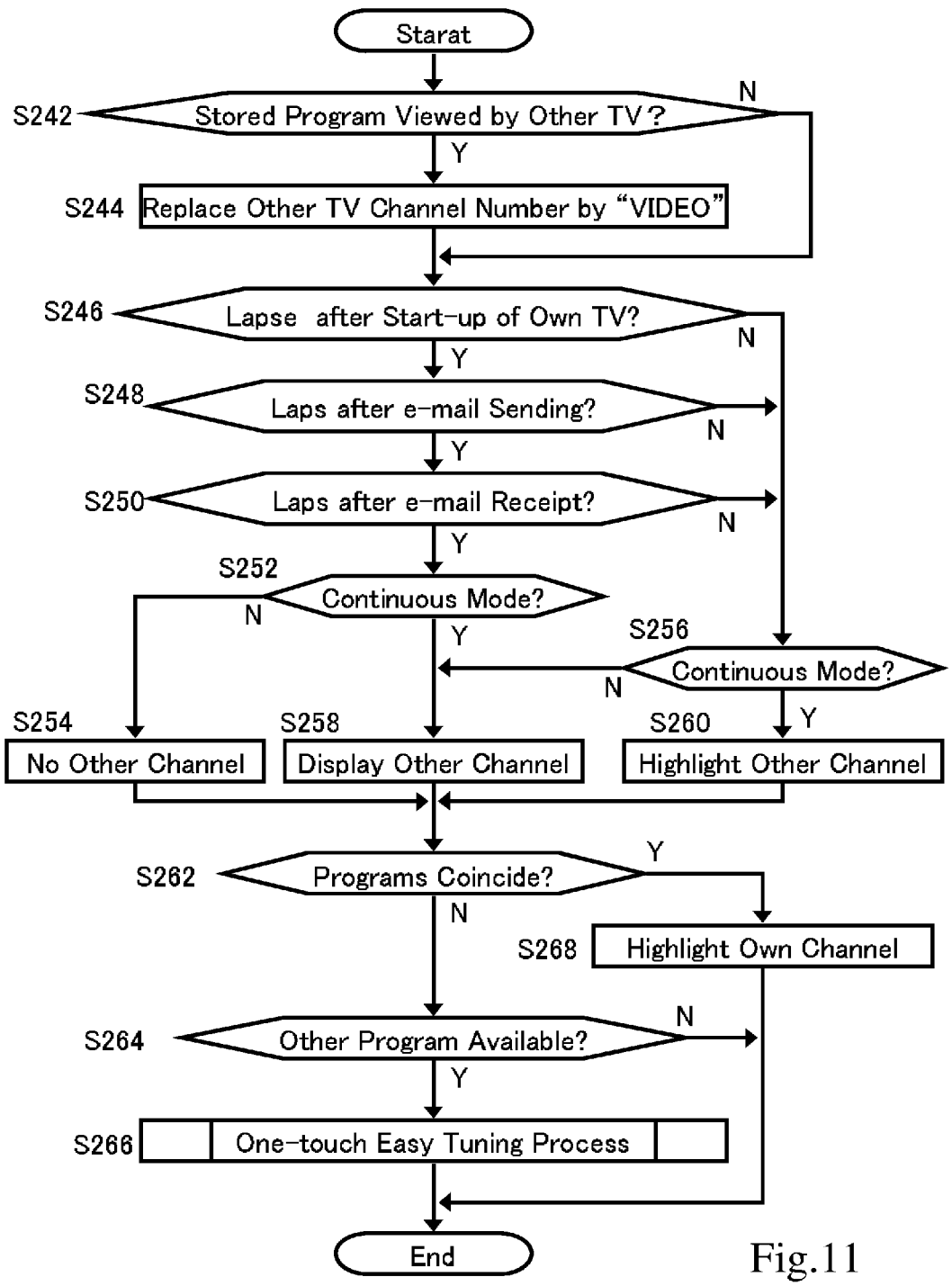
FIG. 11 is a flow chart showing the detail of the other channel display process in step S110 of FIG. 7.

FIG. 11 is a flow chart showing the detail of the other channel display process in step S110 of FIG. 7. If the other channel display process starts, it is checked in step S242 on the basis of the first storage information 23 whether or not the broadcast program data stored in the second memory 10 is viewed on the second television set 4.

The typical stored broadcast program data is the video recorded program stored in the second memory 10. In other words, the typical viewing of the recorded broadcast program is a playback of the video recorded program. The first storage information 23 includes not only such a viewing of the data stored in the second memory 10, but also a playback of the broadcast program recorded by a video recorder outside the second television set 4. Therefore, such a playback of the program recorded by the outside video recorder is also considered in step S242 as the case of the recorded broadcast program data is viewed Further, the second television set 4 can download a broadcast program from a server through the internet. Thus, the viewing of a broadcast program downloaded and stored in the second memory 10 is also considered in step S242 as the case of the recorded broadcast program data is viewed.

If it is determined in step S242 that the other television set is viewing the recorded broadcast program data, the flow advances to step S244 to replace the other channel display on the first display 8 by the recorded data viewing display. For example, the other channel number 53 in FIG. 2 is replaced by a character display such as "VIDEO" if video recorded broadcast program is viewed. Alternatively, the other channel number 53 in FIG. 2 is replaced by a character display showing the title of the program if digital recorded or downloaded program data including digital ID information capable of identifying the program is viewed.

The flow advances to step S246 after the display replacement in step 244 is done. On the other hand, the flow directly goes to step S246 if it is not determined in step 242 that the other television set is viewing the recorded broadcast program data, Step S246 to step S260 carry out the switching between the continuous display mode setting and the eventual display mode setting. It should be noted here that, even in the continuous display mode, the channel display for example is highlighted for a predetermined time, e.g., 10 seconds, when the channel is changed for drawing attention to occurrence of the change as in the eventual display mode.

The explanation begins with the case that the eventual display mode is set. In step S246, it is checked whether or not a predetermined time has passed after the start-up of the own television set. And, if the predetermined time has passed, the flow advances to step S248 to check whether or not a predetermined time has passed after a sending of e-mail. If it is determined in step S248 that the predetermined time has passed, the flow advances to step S250. The fact that the flow reaches step 250 means that the predetermined time has passed after any operation of the own television set.

In step S140, it is checked whether or not a predetermined time has passed after a receipt of e-mail. And, if the predetermined time has passed, the flow advances to step S252. The fact that the flow reaches step 252 means that the predetermined time has passed from any operation of the other television set. Thus, step S252 is reached only when the predetermined time has passed after any of operation of both the own television set and the other television set. In step S252, it is checked whether or not the continuous display mode is set. The flow goes to step S254 to make no display for the other television set since the eventual display mode is set in this case as has been provided.

On the other hand, if the predetermined time has not passed yet in one of steps S246, S248 and S250 n step S140, the flow advances to step S256 to check whether or not it is checked whether or not the continuous display mode is set. The flow goes to step S258 to make normal display for the other television set since the eventual display mode is set in this case as has been provided.

The above is the function in the other channel display process with the eventual display mode is set. In other words, the display for the other channel is made only for a predetermine time after the operation of one of the own television set and the other television set, the display discontinuing when the predetermined time has passed after the last operation.

In the case that the continuous display mode is set, the following function results. If the predetermined time has passed in all of steps S246, S248 and S250, the flow reaches step S252. And the flow goes to step S258 to make normal display for the other television set since the continuous display mode is set in this case.

On the other hand, if the predetermined time has not passed yet in one of steps S246, S248 and S250, the flow goes to step S256. And the flow goes to step S260 to make highlight display for the other television set since the continuous display mode is set in this case.

The above is the function in the other channel display process with the continuous display mode is set. In other words, the highlight display for the other channel is made for a predetermine time after the operation of one of the own television set and the other television set, the display itself continuing with switched into normal display when the predetermined time has passed after the last operation.

After the completion of function in one of steps S246, S248 and S250, the flow goes to step S262. In step S262, it is checked whether or not the broadcast program viewed on the own television set is identical with that on the other television set. If not, the flow goes to step S264 to check whether or not an identical broadcast program with that viewed on the other television set is on-air in the area of the own television set. If such a broadcast program is on-air and available, the flow advances to step S266 to carry out the easy tuning process, in which the channel of the own television set can be switched to the channel for the same broadcast program as that viewed on the other television set with a single touch of a predetermined key of the first remote controller 7 without any channel selecting operation. This is possible on the channel information from the other television set in the first storage information 23. The meaning of the easy tuning process has been discussed in relation to FIGS. 2 and 3, which will not be repeated here. If the process in step S266 is completed, the flow of the other channel display process terminates. On the other hand, if it is not detected in step S264 that an identical broadcast program with that viewed on the other television set is on-air in the area of the own television set, the flow instantly terminates since the easy tuning process in step 264 is meaningless.

According to the easy tuning process in step S266, if the predetermined key of the first remote controller 7, which has been once touched to change the channel into the broadcast program viewed on the other television set, is touched again, the channel returns to the broadcast program which was formerly viewed on the own televisions set. This is possible on the channel information of the own television set in the first storage information 23 which includes information sent to the other television set such as channel number of the own television set. By means of this function in the easy tuning process, it is easily possible to temporally confirm the contents of the broadcast program viewed on the other television set and then to return to the broadcast program which was originally viewed on the own television set.

In the case that the channel display on the first display 8 is replaced by the recorded data viewing display in step 244, it is checked in step S262 whether or not the recorded broadcast program viewed on the own television set is identical with that on the other television set. In place of channel comparison, the recorded broadcast program comparison is done on the program ID. In other words, the program ID received from the second television set 4 and stored in the first storage information 23 is compared with the program ID of the program viewed on the first television set 2.

If the broadcast program viewed on the other television set does not coincide with that viewed on the own television set, it is checked in step 264 whether or not it is possible to download the same broadcast program through the internet by way of the first communicator 15. The broadcast program can be identified by the ID in the first storage information 23. If the download is possible, the flow advances to step S266 to carry out the easy tuning process, in which the download starts on the basis of the ID in the first storage information 23 if the predetermined key of the first remote controller 7 is operated. Thus, the download is easily done without any search for the broadcast program or any further operation for the download. On the other hand, if it is not detected in step S264 that an identical broadcast program with that viewed on the other television set can be downloaded, the flow instantly terminates since the easy tuning process in step 264 is meaningless.

On the other hand, if it is decided that the broadcast program viewed on the own television set is identical with that on the other television set, the flow advances to step S268, in which the own channel is highlighted to notice that the own home and the other home share the same experience. The meaning of the easy tuning process in this case has been discussed in relation to FIGS. 2 and 3, which will not be repeated here.

In the case that the channel display is replaced by the recorded data viewing display in step 244, it is checked in step S262 whether or not the recorded broadcast program viewed on the own television set is identical with that on the other television set. In place of channel comparison, the recorded broadcast program comparison is done on the program ID. If it is decided that the broadcast program viewed on the own television set is identical with that on the other television set, the flow advances to step S268, in which the own title of the program or the like is highlighted to notice that the own home and the other home share the same experience. The other channel display process in FIG. 11 terminates when the highlight function in step S268 is completed.

Figure 12:
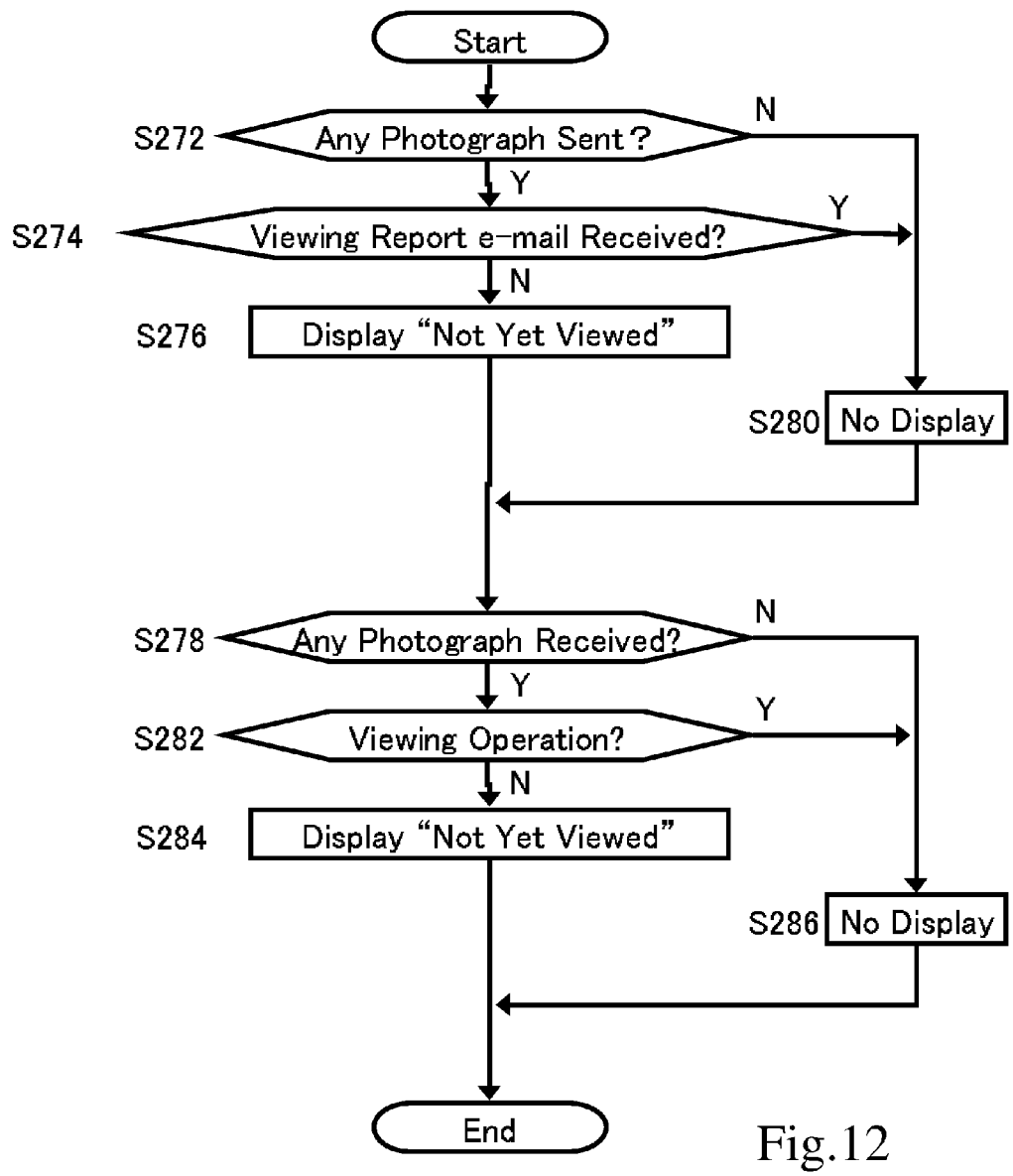
FIG. 12 is a flow chart showing the detail of the photograph information display process in step 118 of FIG. 7.

FIG. 12 is a flow chart showing the detail of the photograph information display process in step 118 of FIG. 7, in which steps S272 to S276 and S280 relate to the function of sending photographs, while steps S278 and S282 to S286 to the function of receiving photographs If the photograph information display process starts, it is checked in step S272 whether or not any photograph has been sent. And if any, the flow advances to step S274 to check whether or not any e-mail reporting that the sent photograph has been viewed is received. The functions in steps S272 and S274 are done on the basis of the first storage information 23.

If it is not determined in step S274 that such an e-mail is received, the flow goes to step S276 to make display that the sent photograph has not been viewed yet. This corresponds, for example, to the case that a photograph is sent from the first home 1 to the second home 3, in which camera icon 55 in FIG. 2 remains to be displayed until the photograph is viewed on the second television set 4. And then, the flow goes to step S278.

On the other hand, if it is not determined that any photograph has been sent, or the flow goes to step S280 to make no display at the place where camera icon 55 is otherwise to be displayed in FIG. 2, for example. And, if it is determined in step S274 that the e-mail reporting that the sent photograph has been viewed is received, the flow goes to step 280 to cause no display. This means, for example, that camera icon 55 in FIG. 2 disappears.

In step 278 it is checked whether or not any photograph is received. If any, the flow goes to step 282 to check whether or not an operation to view the received photograph had been done.

If it is not determined that such an operation has been done, the flow goes to step S284 to make display that the received photograph has not been viewed yet, the flow then terminating the photograph information display process. On the other hand, if it is not determined in step S278 that any photograph is received, the flow goes to step S286 to make no display. And, if it is determined in step S282 that the operation to view the received photograph has been done, the flow goes to step S286 to cause no display. The flow then terminates the photograph information display process.

The above steps S278 to S282 can be better understood as the function of the second controller 9 of the second home 3 in conjugation with FIG. 3, for example. Namely, camera icon 63 indicating the receipt of photograph is displayed on the second display 12 in Fig. which is the result of the function of step 278 to S284 by way of S282.

If it is detected in step S282 that the operation to view the received photograph has been done in the second home 3, the flow goes to step S286, which causes camera icon 63 in FIG. 3 to disappear. If it is not detected in step S278 that any photograph has been received at the second home 3, the flow goes to step S286, in which any icon is not displayed from the beginning at the place for camera icon 63.

Figure 13:
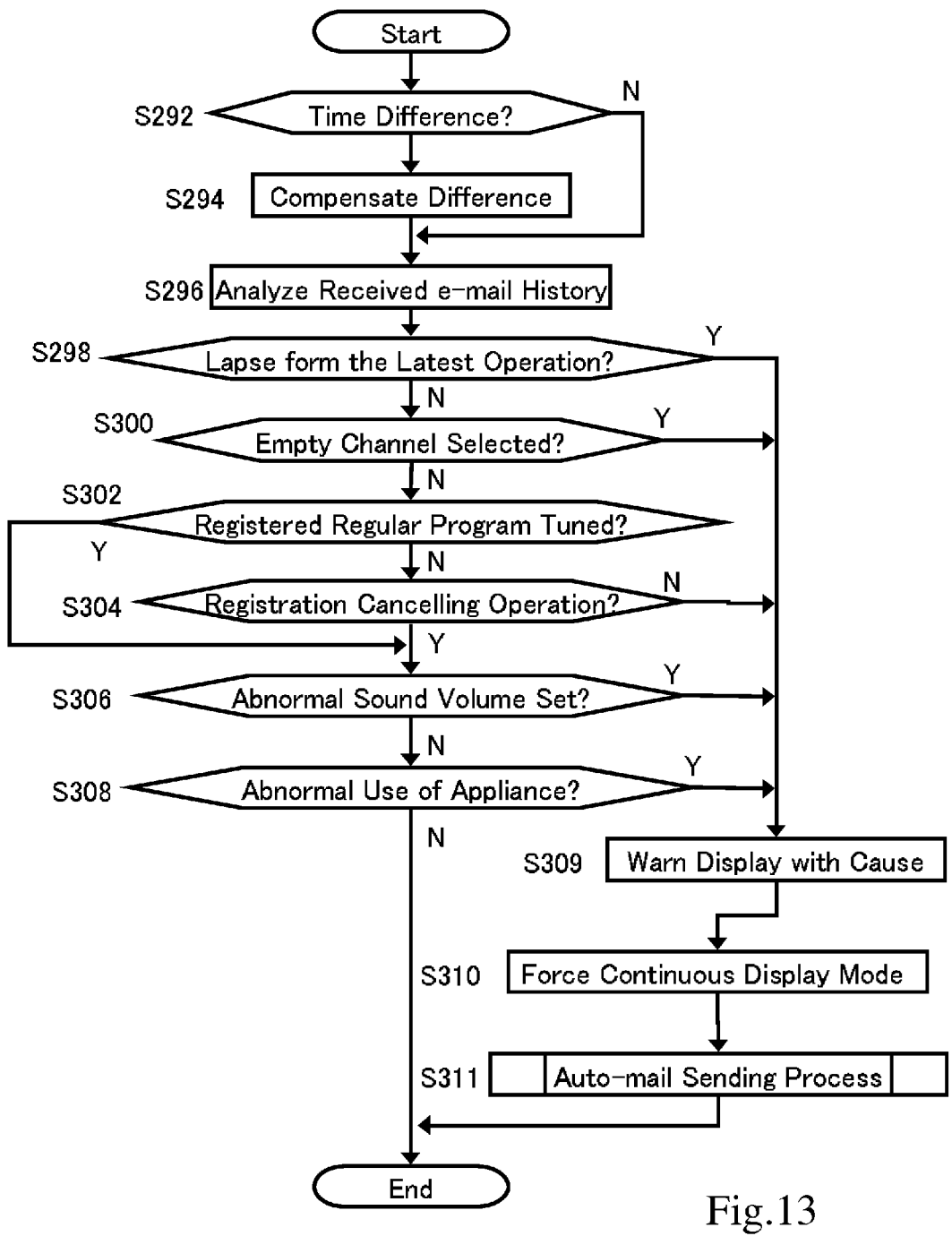
FIG. 13 is a flow chart showing the detail of the monitoring information display process in step S114 of FIG. 7.

FIG. 13 is a flow chart showing the detail of the monitoring information display process in step S114 of FIG. 7, in which the information form the second home 3 stored in the first storage information 23 is analyzed to make a warning of some abnormality in the second home 3 on the first television set 2 if the information form the second home 3 deviates form a predetermined condition. The abnormality here is of such a low level that is reported on the first display 8 on which the family of the first home 1 enjoys some broadcast program so that the family notices the abnormality of the second home 3 by way of caution.

If the monitoring information display process in FIG. 13 starts, it is checked in step S292 whether or not any time difference exists between the first home 1 and the second home 3. This is for homes internationally far from each other or homes far from each other in a wide country which desire to monitor or be monitored each other. For example, the consideration of the time difference is effective to avoid such a case that a nonsense warning for "long time power-off of the television set" as an abnormal condition although it is caused by a mere sleeping night time.

If any time difference is detected in step S292 that any, the flow advances to step S294 to compensate for the time difference, the flow then going to step S296. On the other hand, the flow directly goes to step S296 if there is no time difference detected in step S292.

In step S296, the history of the information attached to the received e-mails is analyzed on the basis of the first storage information 23 to make various judges in the steps lead by step S298. In step 298, it is checked whether or not a predetermined time period, e.g., 6 hours excluding the sleeping time zone, has passed with the other television set not operated at all since the last operation. For example, such a case falls under the category that the other television set is left in power-off state for the predetermined time period or left in power-on state without any change in channel or sound volume for the predetermined time period.

If it is not determined that the predetermined time period has not passed yet, the flow goes to step S300 to check whether or not the other television set is left in power-on state with a channel selected under which no broadcast program is on-air anymore because of too deep night. If it is not the case, the flow advances from step S300 to step S302.

In step 302, it is checked whether or not the registered regular broadcast program is viewed on time on the other television set. If not, the flow goes form step S302 to step S304 to check whether or not the registration of the broadcast program ha been cancelled by an operation. If the cancellation has been done, the flow goes from step S304 to step S306. On the other hand, if it is determined in step S302 that the registered regular broadcast program is viewed on time, the flow directly goes to step S306.

In step S306, it is checked whether or not the sound volume is abnormal. Either of a too loud sound volume or a too small sound volume is regarded as the abnormal sound volume. The range of normal sound volume is not only predetermined, but also may be determined and modified in accordance with an automatic learning function on the basis of the first storage information 23. If it is not determined in step S306 that the sound volume is abnormal, the flow goes to step S308. The monitoring information display process relating to the television set operation is not limited to the judges above, but other suitable judges may be further added thereto.

In step S308, it is checked whether or not the second home electric appliance 28 in the second home 3 is in an abnormal use. A use deviating form daily regular pattern of use is regarded as the abnormal use. For example, the time of power-on or power-off of the second home electric appliance 28 is judged in the light of analysis of the first storage information 23. Alternatively, the temperature setting or usage history in the second home electric appliance 28 in the second home 3 may be judged. The standard of abnormality is not only predetermined, but also may be determined and modified in accordance with an automatic learning function on the basis of the first storage information 23. If there is no abnormality detected in step S308, the monitoring information display process is terminated.

On the other hand, if it is judged in one of steps S298, S300, S304, S306 and S308 that any abnormality occurs, the flow goes to step S309 to make a warning on the first display 8 with corresponding voice depending on the cause of abnormality.

Further in step S310, the continuous display mode is forced with the warning displayed in distinguishable color from that in the normal display regardless of whether the continuous display mode or the eventual display mode is set. Thus, in combination with the function in step 309, step 310 effectively notices the abnormality.

Next, in step S310, the automatic e-mail sending process basically similar to that in FIG. 9 with only the attachment differs. In other words, in the automatic e-mail sending process in step S311, a new e-mail addressed to the second television set 4 is automatically created with the contents of the displayed information of abnormality in steps S309 and S310 attached, the e-mail with the attachment being then automatically sent to the second television set 4.

The reason why the contents of the monitoring information displayed on the first television set 2 is also sent to the second television set 4 is as follows. Namely, the same monitoring information is displayed on the second television set 4 by means of step S311, which makes it possible for the family in the second home 2 to share the information displayed at the first home 1. In such a case that the second home 3 is in so abnormal condition that the second television set 4 can hardly viewed, the above display on the second television set 4 is of course meaningless. However, if the second home 3 is not in an abnormal condition as a matter of fact, the family in the second home 3 can inform the first home 1 of no problem in the second home 3 in response to the display on the second television set 4 in advance to a contact from the first home 1.

It depends on the circumstances whether the first home 1 or the second home 3 firstly makes contact with the other in response to the same display on both sides. In any way, one home that notices the display first may contact the other home first. Thus, the monitoring information display process in FIG. 13 is not a one-way monitoring system, but is an equal two-way system for both homes to share the same information. In other words, the second home 3 can monitor in real time the manner in which the own condition is monitored by the first home 1. After completion of step S311, the monitoring information display process terminates.

The flow of FIG. 13 goes to step S309 at the instant of detection of abnormality by anyone of steps S298 to S308. This means that the flow skips the check by downstream steps if an upstream step detects an abnormality. Therefore, the order of the steps for checking abnormality is so designed that a higher priority step is located at the upstream of the flow with a lower priority step located at the downstream.

Alternatively, such a modification is possible that the flow goes through all the abnormality checking steps with each checking result saved to determine a final decision on the saved results or to display all the saved results after all the checks have been completed.

Figure 14:
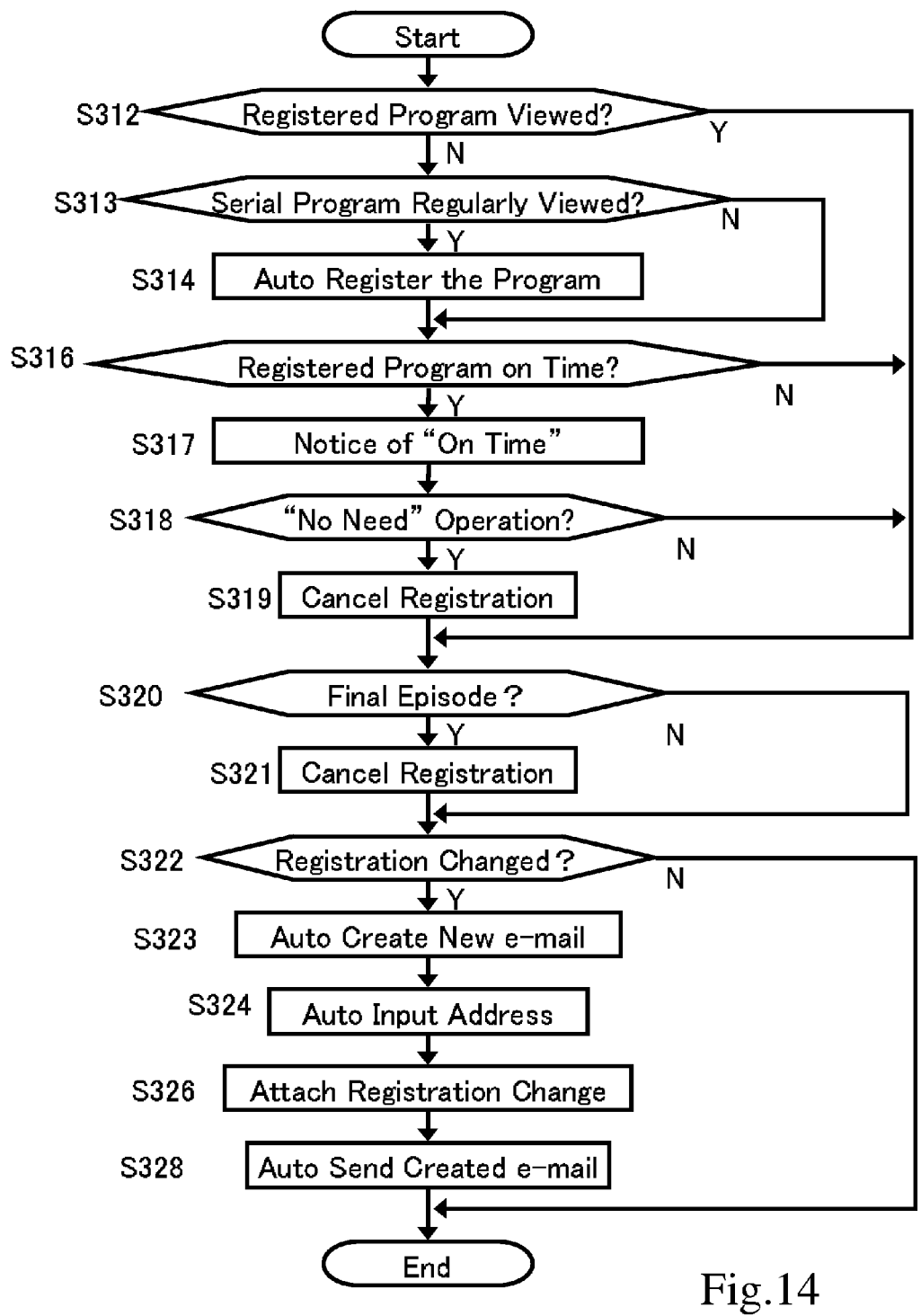
FIG. 14 is a flow chart for the process of automatically changing the registration of the regularly viewed broadcast program and automatically sending an e-mail with the information of such a change attached.

FIG. 14 is a flow chart for the process of automatically changing the registration of the regularly viewed broadcast program and automatically sending an e-mail with the information of such a change attached. The information attached to the e-mail sent in accordance with this flow is substantially identical with the information of registration of the regularly viewed broadcast program attached to the e-mail in step S196 in FIG. 9. It should be noted, however, that the information attached to the e-mail in the flow in FIG. 9 relates to the registration of the regularly viewed broadcast program manually changed in step S8 in FIG. 4, while the information attached to the e-mail in the flow in FIG. 14 relates to the registration of the regularly viewed broadcast program automatically changed.

The flow of FIG. 14 starts in response to one of the power-on, the change in channel and the beginning of a broadcast program following the end of a preceding broadcast program.

If the flow of FIG. 14 starts, it is checked in step S312 whether or not a registered broadcast program is being viewed. If not, the flow advances to step S313 to check the whether or not the currently viewed broad cast program is serial and has been viewed more than predetermined times, e.g., two times. And, if it is determined in step S313 that the serial program has been viewed more than predetermined times, the broadcast program is automatically registered as the regularly viewed broadcast program in step S314, the flow then going to step S316. On the other hand, if it is not determined in step S313 that the currently program is serial and has been viewed more than predetermined times, the flow directly goes to step S316 without any registration.

In step S316, if it is checked whether or not the registered regular broadcast program is on time. If it is determined that the registered regular broadcast program is on time, the flow advances to step S317 to notice on the first display 8 that the registered regular serial broadcast program is on time since the broadcast program is not viewed at that time.

Next, in step S318, it is checked whether or not a response input to the notice above is made through the first remote controller 7 to express that the notice is no more necessary. If it is determined in step S318 that the response is input, the flow advances to step 319 to automatically delete the broadcast program form the registration of the regularly viewed broadcast program since the response input means that there is no intention to view the noticed serial broadcast program no more. The flow then goes to step S320. On the other hand, if it is not determined in step S318 that the response is input, the flow directly goes to step 320.

On the other hand, if it is determined in step 312 that the registered broadcast program is being viewed, or it is not determined in step S316 that the registered regular broadcast program is on time, the flow directly goes to step 320.

In step S320, it is checked whether or not the viewed broadcast program is the final episode of a serial and no next episode. If it is determined in step S320 that the viewed broadcast program is the final episode of a serial, the flow advances to step 320 to automatically delete the broadcast program form the registration of the regularly viewed broadcast program. The flow then goes to step S322. On the other hand, if it is not determined in step S320 that the viewed broadcast program is not the final episode of a serial, the flow directly goes to step S322.

In step S322, it is checked whether or not any change in registration of the regularly viewed broadcast program is caused by any of steps S314, S319 and 321. If any, the flow advances to step S323 to automatically create an e-mail, the registered address being automatically added to the e-mail in step 324. If a plurality of addresses are registered, all the addresses are added in step S324.

Further, the information change in the registration, which includes ID of the broadcast program, the code indicating what change is made such as addition or deletion, and the date and time, is attached to the e-mail in step S326. Thus prepared e-mail is automatically sent in step S328 to terminate the process of automatically changing the registration of the regularly viewed broadcast program and automatically sending an e-mail with the information of such a change attached. On the other hand, if it is not determined that any change in registration of the regularly viewed broadcast program is caused by any of steps S314, S319 and 321, the process is instantly terminated.

Figure 15:
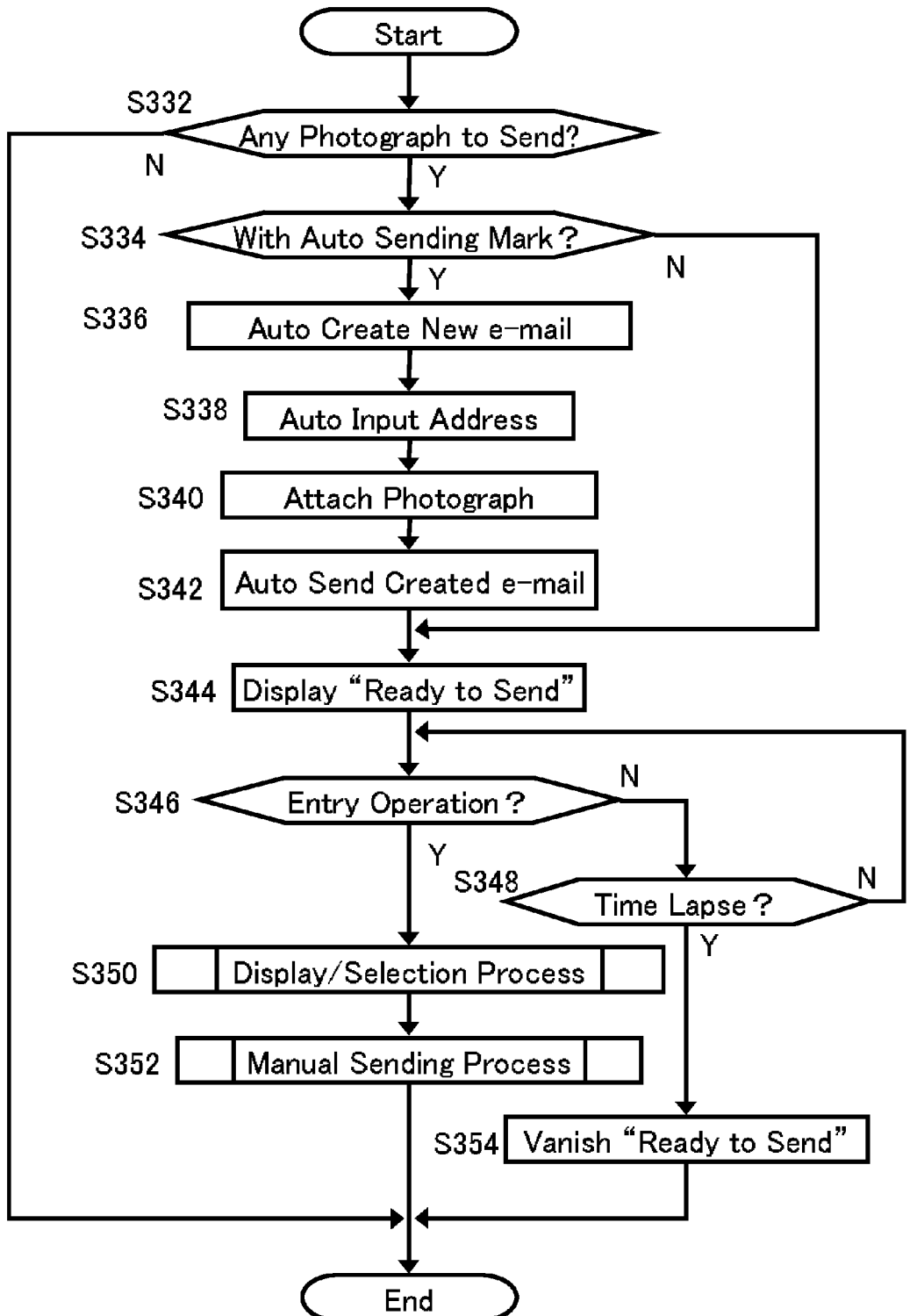
FIG. 15 is a flow chart showing the detail of the automatic photograph e-mail sending process in step S18 of FIG. 4.

FIG. 15 is a flow chart showing the detail of the automatic photograph e-mail sending process in step S18 of FIG. 4. If the flow starts, it is checked in step S332 whether or not a photograph with sending mark is included in the photographs taken into the first controller 5. If any, the flow advances to step S334 to check whether or not a photograph with automatic sending mark is included.

If it is determined in step S334 that at least one photograph with automatic sending mark is included in the photographs taken into the first controller 5, the flow advances to step S336 to automatically create an e-mail, the registered address being automatically added to the e-mail in step S338. If a plurality of addresses are registered, all the addresses are added in step S338.

Further, all the photographs with the automatic sending mark are attached to the e-mail in step S340. Thus prepared e-mail is automatically sent in step S342 to advance to step S344. On the other hand, if it is not determined in step S334 that any photograph with automatic sending mark is included in the photographs taken into the first controller 5, the flow directly goes to step S344. The above steps thus relate to the automatic photograph sending.

On the other hand, the steps lead by steps lead by step 344 relate to the manual photograph sending. In step S344, such a display is initiated on the first display 8 that the manual photograph sending operation is ready to accept, the flow then goes to step S346 to check whether or not an operation for entry for the manual photograph sending is done through the first remote controller 7 in response to the display. If not, the flow goes to step S348 to check whether or not a predetermined time has passed after the display in step S344. And, if the predetermined time has not passed yet, the flow returns to step S346. The steps S346 and S348 are to be repeated until the photograph sending operation is detected in step S346 or the predetermined time has passed in step S348. If the photograph sending entry operation is detected in step S346, the flow advances to step S350, in which the photograph display and manual selection process is carried out, the details being to be explained later. If the process in step S350 in completed, the flow advances to step S352, in which the manual photograph sending process. The automatic photograph e-mail sending process terminates if the process in step S352 is completed.

In step S348, if it is determined that the predetermined time has passed without the photograph sending operation, the flow goes to step S354 to vanish the display initiated in step S344. The automatic photograph e-mail sending process terminates following step S354. This means that the automatic photograph e-mail sending process automatically terminates if nothing is done after the automatic e-mail sending has been carried out in step S342. On the other hand, if it is not determined in step S332 that any photograph with sending mark is included in the photographs taken into the first controller 5, the automatic photograph e-mail sending process instantly terminates.

Figure 16:
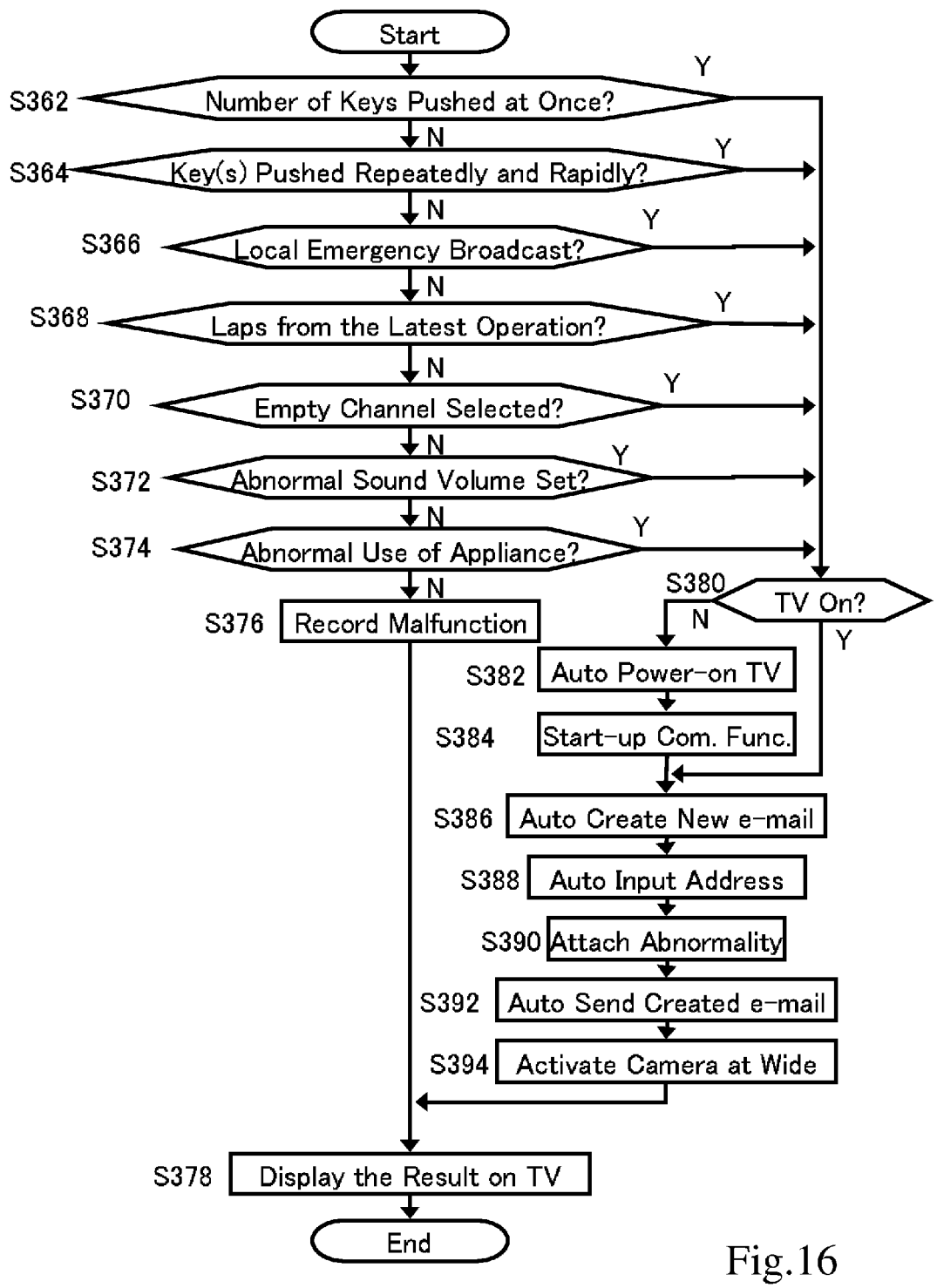
FIG. 16 is a flow chart of the function of the controller of the television set of own home to urgently inform the other home of the detected serious abnormality by means of e-mail.

The following description in conjugation with FIG. 16 relates to countermeasures against relatively serious abnormality in the home to be monitored. For reference, the monitoring information display explained in steps S112 and S114 in FIG. 7 and the flow chart in FIG. 13 relates to the abnormality of a relatively low level on the premise that the television set can be powered-on at each home by itself. On the contrary, the following description is directed to functions which enable one home to quickly inform the other home mutually of the relatively serious abnormality even if the television sets on both homes are in power-off state.

FIG. 16 is a flow chart of the function of the first controller 5 or the second controller 9 in FIG. 1 for one of the first home 1 and the second home 3 to urgently inform the other home of the detected serious abnormality by means of e-mail. A part of the functions overlaps the functions in FIG. 13 for double checking important abnormality. Further, among such overlapping functions, some if FIG. 16 differ from those in FIG. 13 in the standard of detecting abnormality.

The following explanation is made as the function of the second controller 9, in which an abnormality in the second home 3 is reported to the first home 1, for example.

For the purpose of detecting the serious abnormality, not only the second remote control receiver 14, but also the second memory 10 and the second tuner 21 are continuously provided with the standby power even if the power-off state of the second television set 4. Further, the second controller 9 is continuously provided with the standby power for at least a portion for making a decision on a sensed abnormality even if the second television set in power-off state. The provision of such standby power is also true in the first television set 2.

The flow in FIG. 16 starts if an occurrence of one of predetermined abnormalities is detected.

Steps S362 and S364 relate to abnormality sensed by the second remote controller 11 on the basis of an action of a person in the second home 3. Conventionally, a person in the second home 3 may make a call by mobile phone to the first home 1 or to an emergency organization such as nine-one-one upon emergency. Alternatively, it may be possible for the person to push an exclusive emergency hotline button located at a predetermined position in the second home 3 or on a portable device that the person carries.

However, in the case of the call by mobile phone, it is not easy for a person in panic or off his or her track to properly operate the mobile phone for all the speed dial call function or the phonebook call function. Further, the person may be too knocked out to speak on the phone of the abnormality even if the connection is successfully made.

In the case of the an exclusive emergency hotline, on the other hand, it may be easy for a person even in panic or off the track to properly push the button since the operation is very simple and the contents and addressee of information is predetermined. However, this simplicity in operation means not only the advantage, but also the disadvantage since the button is experienced to be simply and frequently pushed in error in the case that the button is located at a convenient place such as on the portable device, the high frequency of the erroneous push of the button lowering the reliability of the hotline like "wolf child". On the contrary, if the button is fixedly located at a place where an erroneous push hardly occurs, a person in panic or off the track may not successfully get to the button to push it. Further, the hotline is of a nature that has not been daily used for a long time if the family is so happy that no serious abnormality occurs. This means that the family is apt to forget about the hotline button or forget the hotline system itself with passing time, or that the batteries of the hotline device left as it is for a long time are running so low that the hotline system does not work upon emergency. Thus, the home with such a hot line system bears a considerable burden in daily life such as regular exercises and maintenances of the hotline device to keep its reliability.

Steps S362 and S364 are for solving the above mentioned problems in the conventional emergency responding systems. In step S362, it is checked whether a number of predetermined keys on the second remote controller 11, such as three keys or more, are pushed at once. In other words, step S362 assumes a case that a person in the second home 3 is so in panic or off the truck that he or she can no more properly operate the second remote controller 11 to inform someone of the emergency occurring in the second home 3. But, it is assumed that he or she can grasp the entire of the second remote controller 11 or push the entire surface of the remote controller 11 with the palm to cause the situation to be detected in step S362, in which the number of predetermined keys are pushed at once. Since such a situation would not be caused in a normal operation of the second remote controller 11, step S362 upon detecting the situation judges that an emergency occurs.

If it is not detected in step S362 that a number of predetermined keys on the second remote controller 11 are pushed at once, the flow advances to step S364 to check whether or not a predetermined same key is repeatedly pushed more than a predetermined times in a short period. In other words, step S364 assumes a case that a person in panic may be repeatedly trying and failing in the same operation on the second remote controller 11 or so in panic or off the truck that he or she can only operate the second remote controller 11 randomly. Since such a meaningless repetition of pushing the same key in a short period would not be caused in a normal operation of the second remote controller 11, step S364 upon detecting the repetition judges that an emergency occurs. In step 364, not only one key, but also a group of closely arranged keys are checked to detect whether or not any one or ones in the group is repeatedly pushed more than a predetermined times in a limited short period. In other words, step S364 assumes a case that a person in panic may push a key next to the correct key in error and try again to push the correct key, such erroneous push and retry being repeated in panic.

As has been readily understood, steps S362 and S364 can detect emergency by means of abnormal operation on the second remote controller 11 which is daily used. Thus, a person even in panic or off his or her truck can cause a report of the emergency on the basis of a simple action not to be taken by a normal person, but is apt to be taken by a person in panic or off the truck. Further, a possibility of erroneous emergency report is relatively low because the assumed action under detection would not be taken by a normal person. Of course, steps S362 and S364 do not require any regular exercise and maintenance to keep the reliability of emergency report since the second remote controller 11 is in daily use. As will be explained later, steps S362 and S364 are followed by a predetermined process with the report creation method as well as the contents and address of the report all predetermined. Thus, if the abnormal operation of the second remote controller 11 is successfully detected in step S362 or S364, the necessary report is automatically carried out.

In steps S362 and S364 of the flow chart in FIG. 16 constitute an OR logic, in which the abnormality is concluded if the situation assumed in step S362 or that in step S364 is detected. However, such a modification is possible that the steps S362 and S364 constitute an AND logic, in which the abnormality is concluded if the situation assumed in step S362 and that in step S364 are both detected. According to the modified flow chart, steps S362 and S364 in combination judge that an emergency occurs when a number of predetermined keys are pushed at once and a predetermined one key or one or ones in a predetermined group of closely arranged keys is repeatedly pushed more than a predetermined times in a short period.

This above modification in AND logic is advantageous to avoid such an erroneous emergency report only by step S362 detecting that a number of predetermined keys are pushed at once which may be accidentally caused by a mere dropping of the second remote controller 11 with the keys facing the floor or a mere stepping on the second remote controller dropped on the floor. The above modification in AND logic is also advantageous to avoid such an erroneous emergency report only by step S364 detecting that a predetermined one key is repeatedly pushed more than a predetermined times in a short period, which may be caused by inputting an address including a series of the same figure or by operating the space key or the line feeding key which is apt to be normally pushed in repetition.

On the other hand, however, is should be noted that the above modification in AND logic may lead to such a disadvantage that necessary abnormality may not be detected because of the too strict judgment standard. So, it is recommended not to give uniform treatment to all the keys in adopting the OR logic or the AND logic of steps S362 and S364, but to different treatment to individual keys in dependence on the total layout of the keyboard and the relative arrangement of keys on the second remote controller 11.

Or, such an alternative modification is possible that the OR logic is adopted as to steps S362 and S364 as they are in FIG. 16 and the AND logics are added to each of steps S362 and S364 with other conditional steps for avoiding erroneous report, respectively.

According to the flow chart in FIG. 16, steps S362 and S364 are carried out by the second controller 9. However, this invention is not limited to such an embodiment. For example, steps S362 and S364 can be modified to be carried out by a control unit in the second remote controller 11 to detect and judge the abnormality in operation within the second remote controller 11 by itself. In this case, the second remote controller 11 informs the second television set 4 of the final judgment. Such function in the second remote controller 11 is so carried out that the final judgment is done by control unit 72 to create the abnormal remote controller operation signal, which is in turn transmitted from infrared communicator 73 of the second remote controller 11 to the second remote control receiver 14 of the second television set 4. The details of the second remote controller 11 including control unit 72 and infrared communicator 73 is to be explained later with reference to FIG. 18.

If steps S362 and S364 are modified to be carried out by control unit 72 in the second remote controller 11, original steps S362 and S364 in FIG. 16 are replaced by a step to check whether or not the abnormal remote controller operation signal is received from the second remote controller 11.

Returning to the explanation of the flow chart in FIG. 16, if the abnormality assumed in step S364 is not detected, the flow advances to step S366 to check whether or not a local emergency broadcast is received by the second television set 4 through airwave or cable broadcast system. Such a local broadcast is not sent over in the area to which the first home 1 belongs, the contents as well as the occurrence itself of such a broadcast being unknown in the first home 1 which is far from the second home 3.

If the abnormality assumed in step S366 is not detected, the flow advances to step S368 to check whether or not the second television set 4 is left for a long time, e.g., 24 hours, without any operation after the latest operation. If the abnormality assumed in step S366 is not detected, the flow advances to step S368 to check whether or not the second television set 4 is left for a long time, e.g., 24 hours, without any operation after the latest operation. If the abnormality assumed in step S368 is not detected, the flow goes to step S370 to check whether or not the other television set is left in power-on state for a long time, e.g., 30 minutes, with a channel selected under which no broadcast program is on-air. If it is not the case, the flow advances from step S370 to step S372.

In step S372, it is checked whether or not the sound volume is abnormal. Though this step overlaps step 306 in FIG. 13, the similar function is arranged in FIG. 16 step 372 for double checking. If the abnormality assumed in step S372 is not detected, the flow advances to step S374 to check whether or not the second home electric appliance 28 in the second home 3 is in an abnormal use. Though this step may completely overlap step 308 in FIG. 13 for the purpose of double checking, the condition of judging the abnormal use for the same electric appliance may differ from that in step 308 in FIG. 13 depending on the nature of the electric appliance. Or, another electric appliance different from that in step 308 in FIG. 13 may be checked in step S374 in FIG. 16.

If the abnormality assumed in step S374 is not detected, the flow advances to step S376 to record that the process of urgently informing the serious abnormality is started by a malfunction since the flow chart in FIG. 16 is designed to start only in response to the occurrence of one of the abnormalities assumed in steps S362 to S374. In other words, no urgent e-mail is created nor sent in this case, but the flow directly advances to step S378 to display the result of the function of the flow, the flow then terminating. In this case the recorded malfunction is displayed in step S378, the display remaining even after the termination of the flow until manually cancelled by means of operating the second remote controller 11. Thus, a person in the second home 3 can confirm the fact of malfunction with cancelling the display to order a professional investigation into the reason of the malfunction.

On the other hand, if one of the abnormalities assumed in steps S362 to S374 is detected, the flow advances to step S380 to check whether or not the second television set 4 is in power-on state. If not, the flow goes to step S382 to automatically make the second television set 4 into power-on state. Further, in step S384 to urgently activate the communication function, the flow then going to step S386. Such function in steps S382 and S384 correspond to the function in steps S42 and S43 in FIG. 5. In the case of FIG. 16, however, most part of functions such as in FIG. 6, which shows the details of step S43, are omitted for the purpose of quickly starting-up the personal computer function necessary for e-mail communication with the security process in steps S82 and S88 at least carried out. On the other hand, if the television set 4 is in power-on state at step S380 the flow directly goes to step S386.

In step S386, an urgent e-mail is automatically created, the registered address of the first television set 2 being automatically added to the e-mail in step 388. Further, in step S388, the address corresponding to nine-one-one is added as the address if the flow comes to step S380 form step S362 or step S364

Next, in step S390, the contents of abnormality detected in one of steps S362 to S374 is attached to the e-mail. Thus prepared e-mail is automatically sent in step S392. According to the process above the urgent e-mail is sent form the second communicator 16 to the first communicator 15 by way of the internet.

As in the case of FIG. 13, the flow of FIG. 16 goes to step S380 at the instant of detection of abnormality by anyone of steps S362 to S374. This means that the flow skips the check by downstream steps if an upstream step detects an abnormality to cause the sending of the urgent e-mail. Therefore, the order of the steps for checking abnormality is so designed that a higher priority step is located at the upstream of the flow with a lower priority step located at the downstream. Alternatively, such a modification is possible that the flow goes through all the abnormality checking steps with each checking result saved, all the saved abnormalities being attached to the e-mail in step S390 after all the checks in steps S362 to S374 have been completed.

Upon completion of the e-mail sending, the flow goes to step S394 to automatically make the second camera 31 into power-on state with the field angle of is zoom lens system automatically set at the widest angle. This make is easy for the first television set 2 to monitor the second home 3 with the second camera 31 under the remote control by the first television set 2.

Next, the flow advances to step S378 to display the result of the function of the flow, the flow then terminating. In this case the same information as attached to the e-mail sent in step S392 is displayed on the second display 12 of the second television set 4. By means of this display, a person in the second home 4 can know about the information of abnormality transmitted to the first home 2. If the abnormality in the second home 3 is so serious that anyone in the second home 3 cannot view the display, such a display may unfortunately be meaningless. However, if the second home 3 is OK, a person in the second home 3 who views the display on the second television set 4 can instantly contact the first home 1 to relieve the family in the first home 1 of their anxiety.

Thus, the first home 1 and the second home 3 share information in real time as in step S311 in FIG. 13. That is all for the function to urgent information exchange by means of e-mail in FIG. 16.

Figure 17:
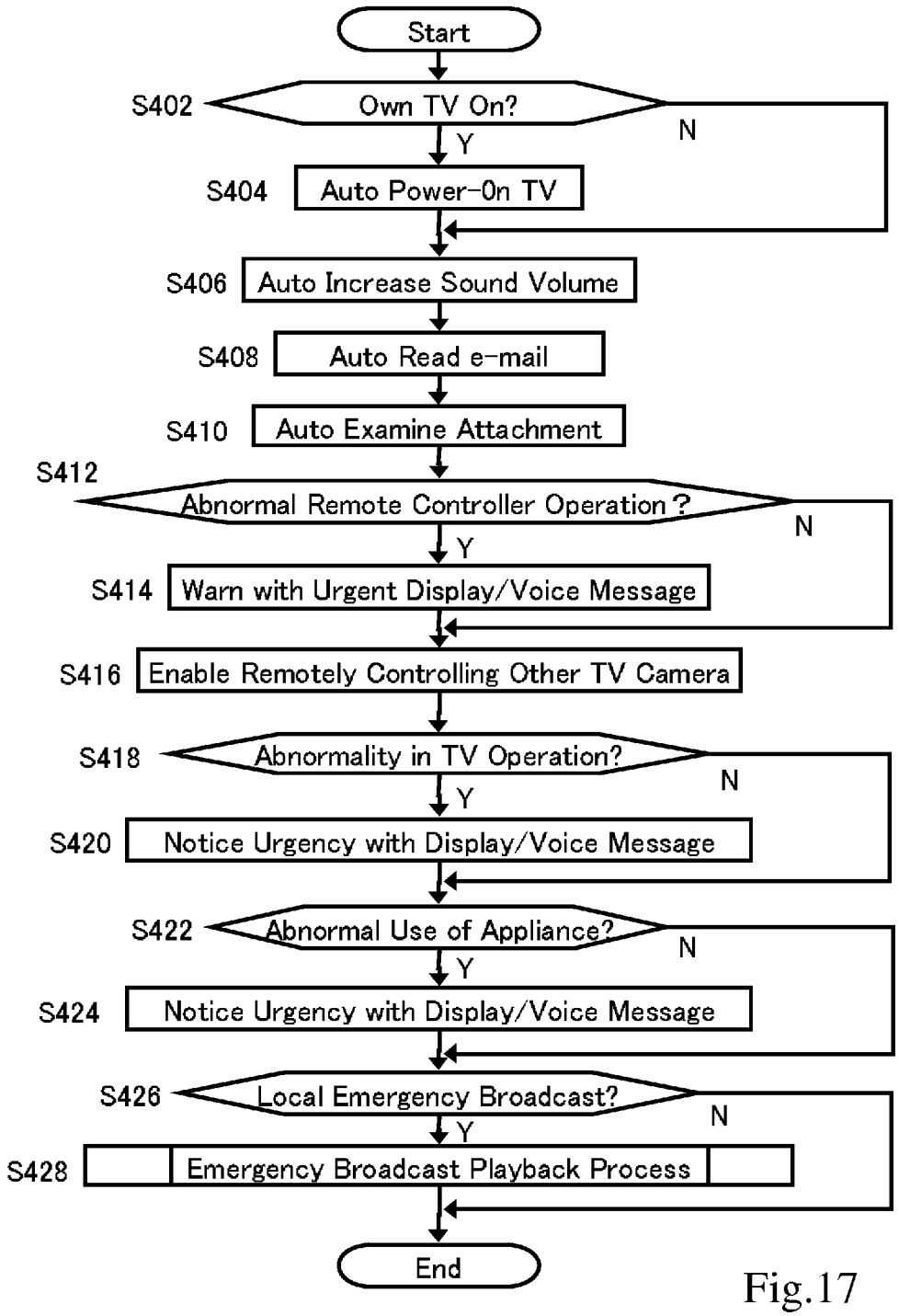
FIG. 17 is a flow chart of the function of the controller of the television set when it receives the urgent e-mail.

FIG. 17 is a flow chart of the function of the first controller 5 or the second controller 9 in FIG. 1 when it receives the urgent e-mail. For the consistency in the explanation with that in FIG. 16, the following explanation is made as the function of the first controller 5, in which an urgent e-mail from the second television set 4 is received by the first television set 2, for example.

The flow of FIG. 17 starts when an urgent e-mail sent from the second communicator 16 in step S392 is received by the first communicator 15. As has been explained, the first communicator 15 is supplied with the standby power, which keeps the first communicator 15 in the standby state to detect the arrival of an e-mail any time.

If the flow starts, it is checked in step S402 whether or not the first television set is in power-on state. If not, the flow goes to step S404 to automatically make the first television set 2 into power-on state, the flow then going to step S406. On the other hand, if the first television set 2 is in power-on state at step S402, the flow directly goes to step S406.

In step S406, the sound volume of the first television set 2 is automatically increased to its maximum for example for effectively informing the family of the first home 1 of the receipt of the urgent information. Next, in step S408, the received e-mail is automatically read, the attached information being automatically examined in step S410. Steps lead by step S312 relate to process in response to the automatically confirmed information attached to the e-mail.

In step S412, it is checked whether or not the attached information is of the abnormal operation of the second remote controller 11 detected in steps S362 and S364. If t it is determined in step S412 that the attached information is of the abnormal remote controller operation, the flow advances to step S414 to make display of the urgency on the first display 8 with voice message of the same contents accompanying. If an ordinary broadcast program is viewed at that time, the broadcast program is interrupted to be replaced by the display and voice message of urgency. Similar interruption of broadcast program is forced also in the following steps when the urgency is displayed with the voice message.

Since the abnormal remote controller operation has been possibly caused by a highly serious reason, the display with voice message initiated in step S414 is continued and repeated until they are cancelled by operating the first remote controller 7. The flow itself advances to step S418 after the display with voice message is initiated. On the other hand, if it is not determined in step S412 that the attached information is of the abnormal remote controller operation, the flow directly goes to step S416, Step S416 is for enabling for the first television set 2 to remotely control the second camera 31 for visually monitoring the abnormality in the second home 3. In the case of the abnormal operation of the second remote controller 11, such a possibility is high that the person causing the abnormal operation is within the field angle of the second camera 31 with the second remote controller 11 held since the second camera 31 is directed to the watchers of the second television set 4. Thus, step S416 following steps S414 is meaningful. After step S416, a remote control signal attached to e-mail is sent from the first communicator 15 in response to an operation at the first remote controller 7.

Next, in step S418, it is checked whether or not the attached information is of the abnormality in the television operation detected in steps S368 to S372. If t it is determined in step S418 that the attached information is of the abnormality in the television operation, the flow advances to step S420 to make display of the urgency on the first display 8 with voice message of the same contents accompanying. The display with voice message initiated in step S420 is continued and repeated until they are cancelled by operating the first remote controller 7. The flow itself advances to step S422 after the completion of the first voice message. On the other hand, if it is not determined in step S418 that the attached information is of the abnormality in the television operation, the flow directly goes to step S422, In step S422, it is checked whether or not the attached information is of the abnormality in the second electric appliance 28 detected in step S374. If t it is determined in step S422 that the attached information is of abnormality in the second electric appliance 28, the flow advances to step S424 to make display of the urgency on the first display 8 with voice message of the same contents accompanying. The display with voice message initiated in step S424 is continued and repeated until they are cancelled by operating the first remote controller 7. The flow itself advances to step S426 after the completion of the first voice message. On the other hand, if it is not determined in step S418 that the attached information is of abnormality in the second electric appliance 28, the flow directly goes to step S426, In step S426, it is checked whether or not the attached information is of the local emergency broadcast detected in step S366. If t it is determined in step S426 that the attached information is of the local emergency broadcast, the flow advances to step S428 to playback the local emergency broadcast on the first display 8. The play back of the local emergency broadcast initiated in step S428 is continued and repeated until they are cancelled by operating the first remote controller 7. The flow itself terminates after the completion of the first playback of the local emergency broadcast. On the other hand, if it is not determined in step S418 that the attached information is of the local emergency broadcast, the flow instantly terminates.

Figure 18:
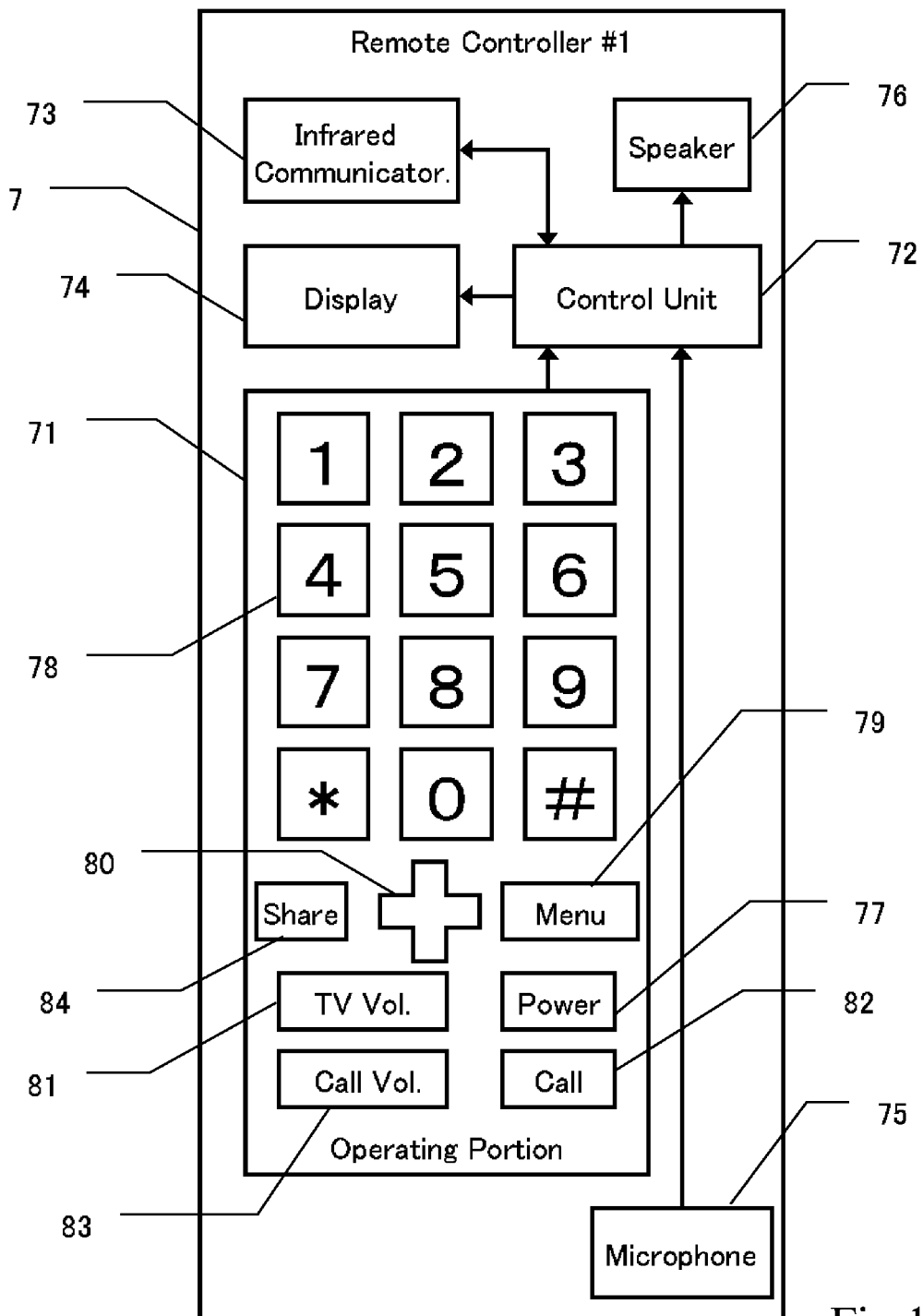
FIG. 18 is a block diagram of a remote controller for the television set according to the embodiment of this invention.

FIG. 18 is a block diagram of a remote controller for the television set according to the embodiment of this invention. The remote controller is embodied as the first remote controller 7 or the second remote controller 11 in FIG. 1. FIG. 18 is hereinafter explained as the details of the first remote controller 7 for example. The second remote controller 11, however, has the same structure and functions.

In response to an operation at operating portion 71 of the first remote controller 7, control unit 72 has infrared communicator 73 send infrared light signal to the first remote control receiver 13

Control unit 72 also has display 74 indicate information necessary for operation including the current status of the first remote controller 7 such as power-on or power-off state, menu of operations, selection items for operation and the result of operation. As has been explained, the first remote controller 7 includes microphone 75 and speaker 76 connected to control unit 72 to serve as a phone receiver. Microphone 75 is also useful in picking up a voice message with a photograph to be sent being displayed of the first display 8 as will be explained later in more detail.

Operating portion 71 includes power key 77, ten-key 78 for channel selection or the like. In response to operating menu key 79, the menu of operations is indicated on display 74 for selection by one of ten-key 78 or up-down or right-left shifting and push-down operation by arrow key 80.

The sound volume of the first television set 2 is up-down adjustment by television sound volume key 81 of the tilting board type. Regardless of the adjustment by sound volume key 81, the voice from the first television set is muted during phone call key 82 is pressed for phone call or voice message input, which is effective to avoid the acoustic feedback. In place of the muted voice from the first television set 2, speaker 76 generates sound, the volume of which is up-down adjustment by phone call sound volume key 83 of the tilting board type. The sound input volume of microphone 75 is automatically adjusted.

Share key 84 is in use for the easy tuning process in step S266 in FIG. 11. In more detail, the own television set can be switched to the channel for the same broadcast program as that viewed on the other television set with a single touch of share key 84 without any channel selecting operation. Also in the case of the television program data downloaded from a server station on internet, the operation of share key 84 makes it possible to download the same television program data as that viewed on the other television set without any code setting to identify the television program to be downloaded.

Share key 84 for making it easy to get to the same television program as that is viewed on the other television set helps to share the same experience at the substantially same time as if a family living together.

As has been explained, if share key 84 which has been once touched to change the channel into the broadcast program viewed on the other television set, is touched again, the channel returns to the broadcast program which was formerly viewed on the own televisions set. By means of this function of share key 84, it is easily possible to temporally confirm the contents of the broadcast program viewed on the other television set and then to return to the broadcast program which was originally viewed on the own television set.

Figure 19:
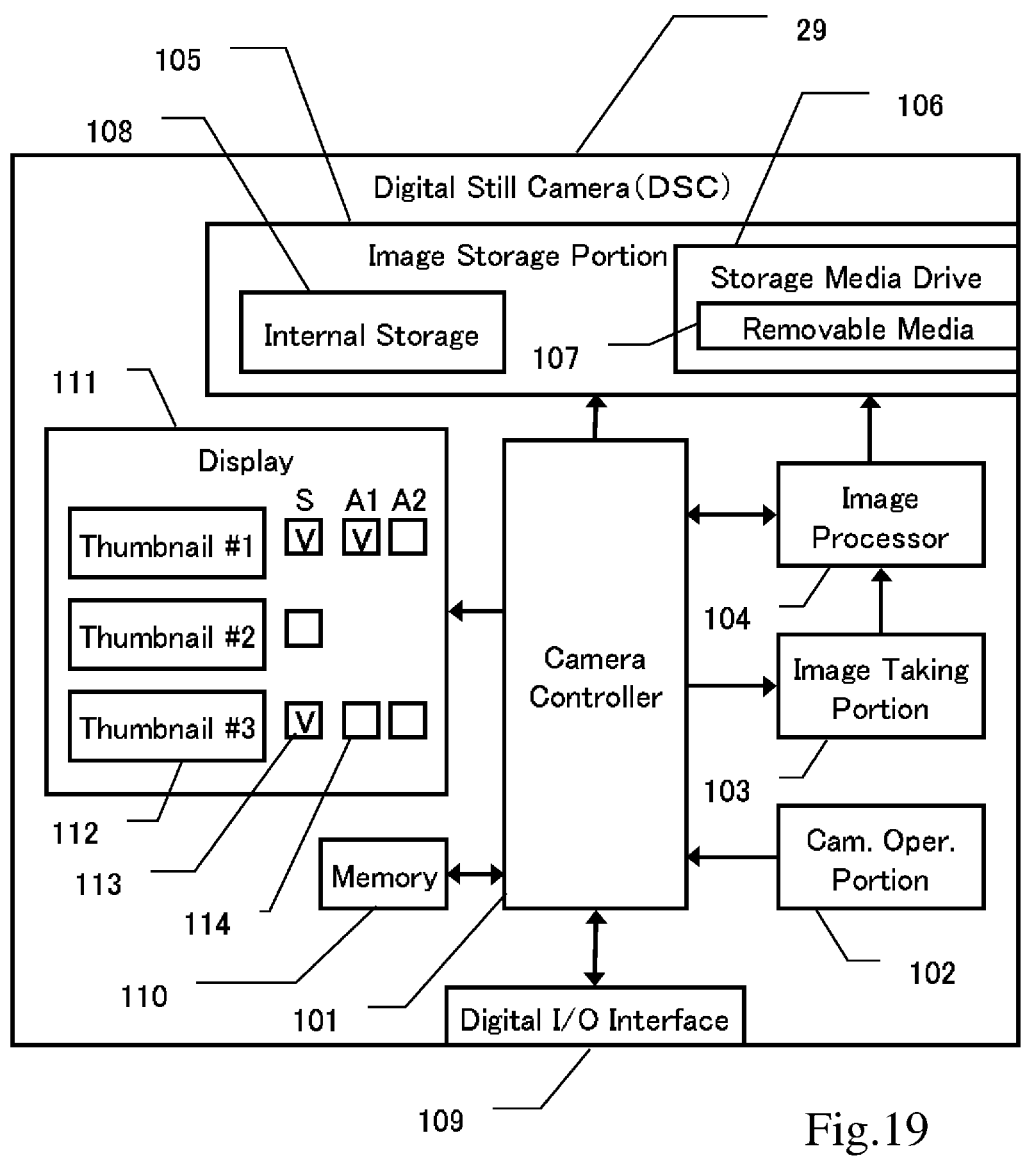
FIG. 19 is a block diagram of the digital camera in FIG. 1.

FIG. 19 is a block diagram of digital camera 29 in FIG. 1. As has been mentioned, it is also possible in the second home 3 to input photograph from a digital camera similar to digital camera 29 into the second controller 9 although only digital camera 29 for the first home 1 is shown in FIG. 1. So the following explanation with respect to FIG. 19 is also applicable to the digital camera and the second television set 4 in the second home 3.

Digital camera 29 controlled by camera controller 101 takes a photograph in response to an operation of a release button included in camera operating portion 102 in such a manner that an image sensed by image taking portion 103 is processed by image processor 104 to be stored in image storage portion 105. Image storage portion 105 includes storage media drive 106 for receiving removable storage media 107, to which the processed image is stored. Image storage portion 105 also includes internal storage 108 for storing the processed image in case that removable storage media 107 is full. Internal storage 108 also stores the processed image if so set. A photograph may be stored in duplicate in both removable storage media 107 and internal storage 108. Further, a photograph may be transferred from removable storage media 107 to internal storage 108, or vice versa.

For inputting a photograph into the first controller, removable storage media 107 is taken out from storage media drive to insert into a storage media slot of the first controller 5. Or, camera controller 101 retrieves a photograph from image storage portion 105 to send the same from digital 10 interface 109 to the first controller 5 through connection cable. Further, digital camera 29 includes a wireless local communicator (not shown) which sends to the first controller 5 over the radio the photograph retrieved by camera controller 101 form image storage portion 106. In either case, the first controller 5 detects the receipt of the photograph to advance from step S16 to step S18 in FIG. 4, Memory 110 stores a registration of address for automatic sending, which is shared with the first television set 2. With respect to the registered address, photographs to be automatically sent from the first television set 2 are selected by means of display 111 and camera operating portion 102.

In selection of photographs, thumbnails 112 for all the photographs which have not been transmitted to the first television set 2 are indicated on display 111. If there are too many photographs, thumbnails 112 are to be scrolled in display 111. In FIG. 19, the first thumbnail, the second thumbnail and the third thumbnail are indicated on display 111, for example.

With such indication of thumbnails on display 111, camera operating portion 102 is operated to select photographs to be sent to the second home 3, in which a sending box 113 under mark "S" is put a tick for a thumbnail of the photograph to be sent. For example in FIG. 19, "S" sending boxes 113 for the first thumbnail and the third thumbnail are put a tick, respectively.

As to the thumbnail with its "S" box put a tick, address box 114 indicating the registered automatic sending address is shown. For example, FIG. 19 is a case that two automatic sending addresses are registered to show "A1" box and "A2" box as address box 114 at the first thumbnail and the third thumbnail with their sending box 113 put a tick. On the centrally, there is no address pox 114 shown for the second thumbnail with its sending box 113 not put a tick. This is for avoiding such a confused selection that an address box 114 is put a tick in error for a thumbnail with its sending box 113 not put a tick. It should be noted that only "A1" box is shown as address box 114 if only one automatic sending address is registered. Further, no address box 114 is shown if no automatic sending address is registered. This is also for avoiding a confused selection.

In FIG. 18, "A1" box for the first thumbnail is put a tick for example. Thus, the photograph corresponding to the first thumbnail is not sent to the second automatic sending address, while the photograph corresponding to the third thumbnail is not sent to any of the registered automatic sending addresses. The photograph with its sending box 113 put a tick while its automatic sending box 114 not put a tick will be sent by means of a manual operation after the photograph is input into the first television set 2. This will be further explained later.

Figure 20:
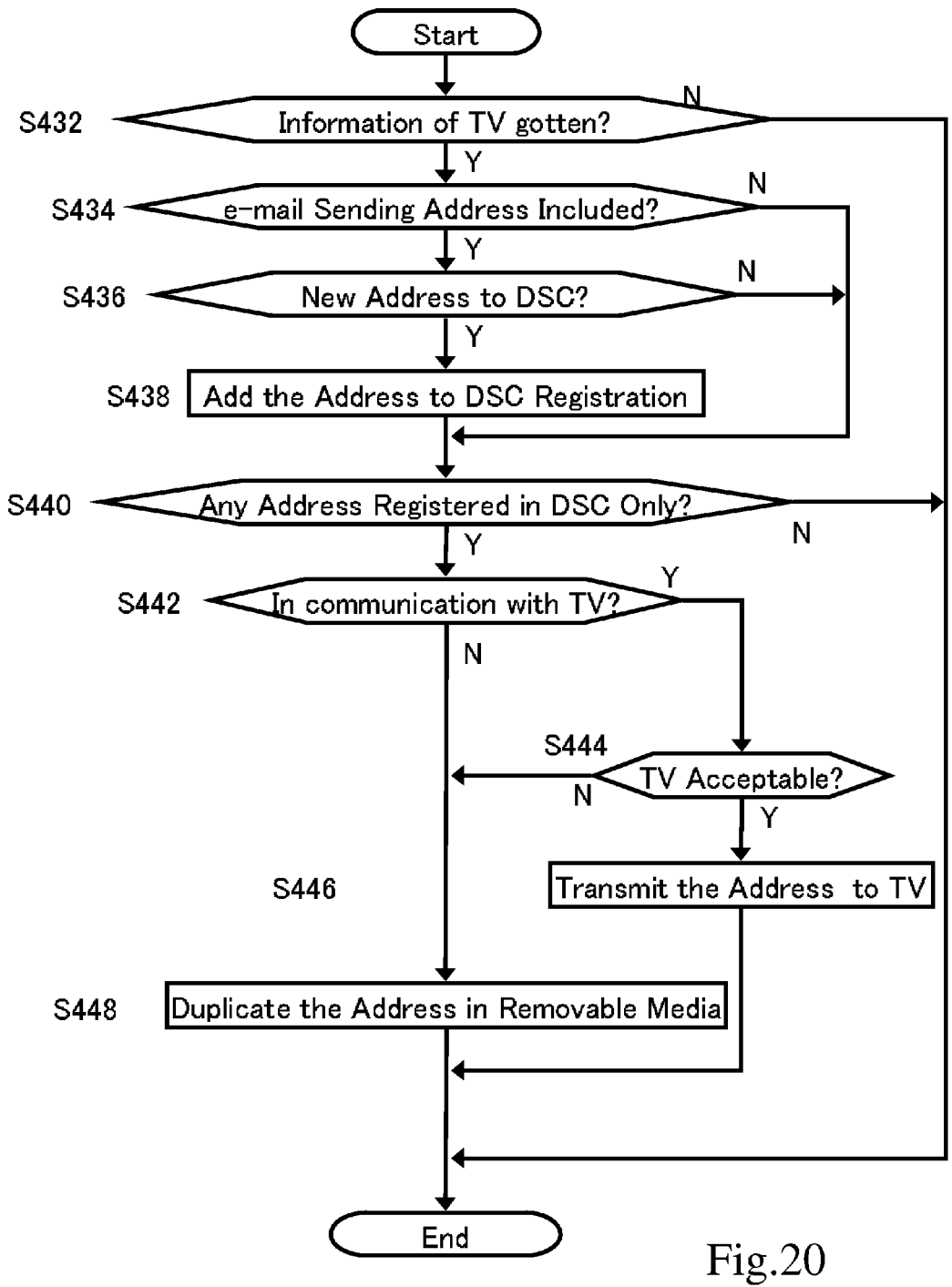
FIG. 20 is a flow chart showing the function in part carried out by the controller of digital camera in FIG. 19 relating to sharing a registration of address for automatic sending between digital camera and the television set.

FIG. 20 is a flow chart showing the function in part carried out by camera controller 101 of digital camera 29 in FIG. 19 relating to sharing a registration of address for automatic sending between digital camera 29 and the first television set 2.

The flow in FIG. 20 starts when digital camera 29 accesses to the information of the first television set 2 in some manner. In other words, for example, the flow starts when digital camera 29 is connected to the first controller 5 with a cable or wireless access or when removable storage media 107 is inserted into storage media drive 106 of digital camera 29.

The following is a supplemental comment on the latter case of access of digital camera 29 to the information of the first television set 2. Namely, removable storage media 107 originally for keeping photograph information also keeps the registration of automatic sending address. And, removable storage media 107 exchanges information with the first television set 2 or digital camera 29 to share the registration of automatic sending address according to a predetermined process when it is inserted into the storage media slot of the first television set 2 or into storage media drive 106 of digital camera 29, respectively. Thus, removable storage media 107 newly inserted into storage media drive 106 of digital camera 29 had been possibly inserted into the storage media slot of the first television set 2 to receive and keep the registration of automatic sending address originated by the first television set 2. In this reason, the insertion of removable storage media 107 into storage media drive 106 of digital camera 29 is regarded as an access to the information of the first television set 2 to start the flow in FIG. 20.

If the flow starts, it is checked in step S432 whether or not any information is gotten form the first television set 2 by means of accessing thereto. If any, the flow advances to step S434 to check whether or not the gotten information includes the address for automatically sending e-mail registered in the first television set.

If it is detected in step S434 that the gotten information includes the address for automatically sending e-mail, the flow advances to step S436 to check whether or not the information of address for automatically sending e-mail registered in the first television set 2 and gotten therefrom is new to digital camera 29. This check is made by comparing all the addresses gotten from the first television set 2 with all the addresses registered in digital camera 29. If the information of address is new to digital camera 29, the flow advances to step S438 to add the new address to the registration of addresses for automatic sending e-mail in digital camera 29, the flow then going to step S440. On the other hand, if it is determined in step S434 that the gotten information does not include the address for automatically sending e-mail registered in the first television set 2, or it is determined in step S436 that the information of address is not new, but has been already registered in digital camera 29, the flow directly goes to step S440.

Thus, if a new address for automatically sending e-mail is registered in the first television set 2, the new address is automatically registered also in digital camera 29 to share it. Thus, an address to which the second television set 2 is to send e-mail is indicated on display 111 of digital camera in FIG. 19 address box 114. Accordingly, if such an address box 114 for a desired thumbnail 112 is put a tick in digital camera 29, the photograph corresponding to the thumbnail with its address box 114 put a tick is automatically sent to the registered address when the photograph is input to the first television set 2.

In step S440, all the addresses gotten from the first television set 2 are compared with all the addresses registered in digital camera 29 to check whether or not such an address exists that has not been registered in the first television set 2 yet, but is registered in digital camera 29 only. If any, the flow advances to step S442 to check whether or not digital camera 29 is in communication with the first television set 2.

If it is not detected in step S442 that digital camera 29 is in communication with the first television set 2, the flow goes to step S448 to duplicated the address, which has not been registered in the first television set 2, to store it into removable storage media 107, the flow then terminating. This is because that the flow starts in response to the insertion of removable storage media 107 into storage media drive 106 if it is not detected in step S442 that digital camera 29 is in communication with the first television set 2. Thus, the duplicated and stored address is to be automatically input into the first television set 2 if removable storage media 107 is inserted into the media slot of the television set 2 for the purpose of inputting the photographs stored in removable storage media 107 into the first television set 2.

On the other hand, if it is detected in step S442 that digital camera 29 is in communication with the first television set 2, which means that digital camera 29 is connected to the first television set 2 with cable or wireless connection, the flow goes to step S444 to check whether or not the first controller 5 is capable of receiving the information form digital camera 29. If the first controller 5 of capable of receiving the information, the flow advances to step S446 to transmit the automatic e-mail sending addresses registered in digital camera 29 to the first controller 5, the flow then terminating. On the other hand, if it determined tin step S444 that the first controller 5 is incapable of receiving the information form digital camera 29, the flow goes to step 448.

In step s432, if it is not determined that any information is gotten form the first television set 2, the flow instantly terminates. Also the flow instantly terminates if it is determined in step S440 that such an address does not exist that has not been registered in the first television set 2 yet, but is registered in digital camera 29.

Figure 21:
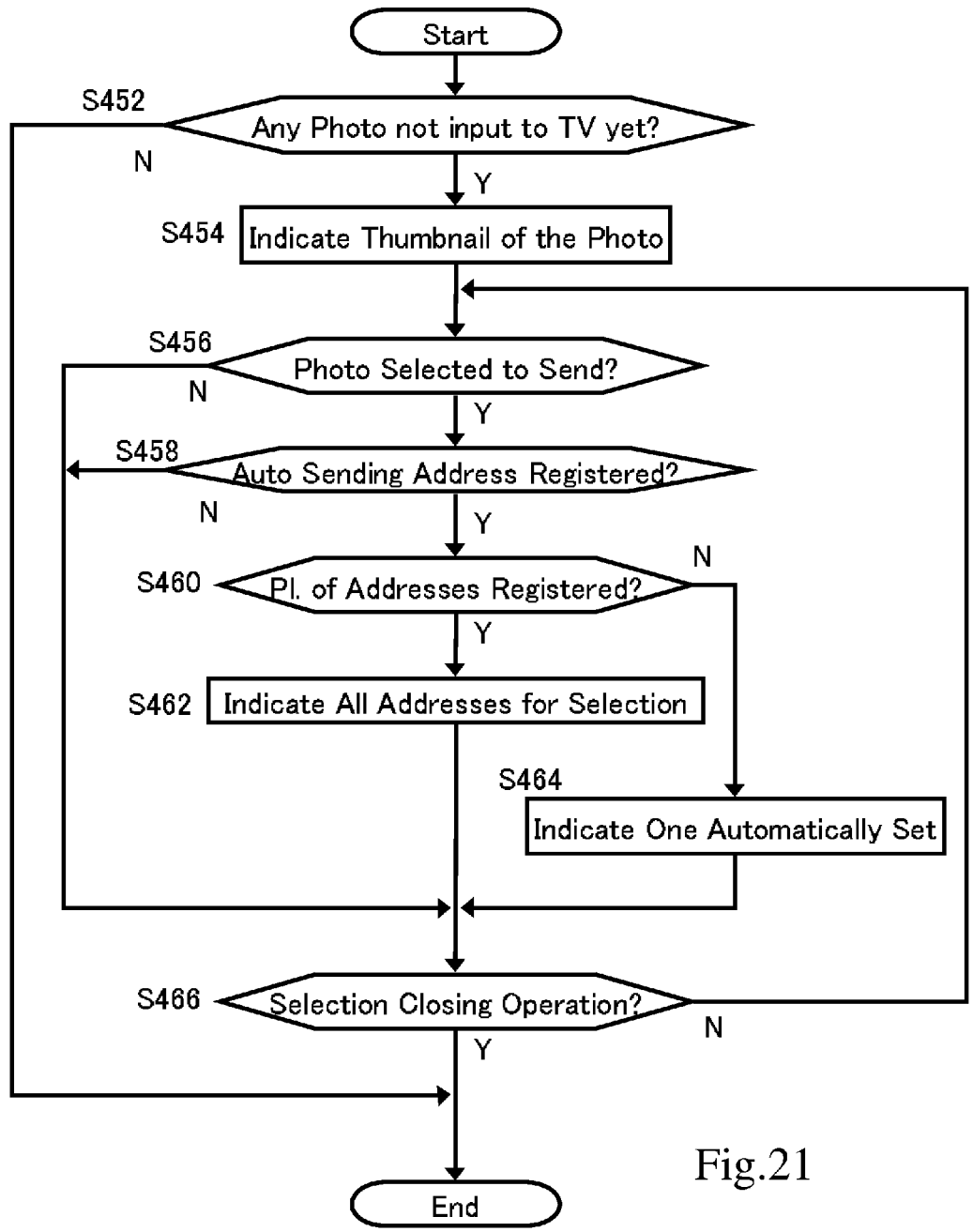
FIG. 21 is a flow chart showing the function in part carried out by the controller of digital camera in FIG. 19 relating to the selection of photograph to be input into the television set.

FIG. 21 is a flow chart showing the function in part carried out by camera controller 101 of digital camera 29 in FIG. 19 relating to the selection of photograph to be input into the first television set 2 by means of the combination of display 111 and camera operation portion 102.

The flow in FIG. 21 starts when the operation by camera operation portion 102 is initiated for inputting the photograph into the first television set. When the flow starts, it is checked in step S452 whether or not such a photograph exists that has not been input into the first television set 2. If any, the flow advances to step S454 to indicate the thumbnail 112 of the photograph on display 111 as shown in FIG. 19 with sending box 113 also indicated.

Next in step S456, it is checked whether or not a photograph is selected for sending to the other television set. In other words, it is checked in step 456 whether or any sending box 113 in FIG. 19 is put a tick. If any, the flow advances to step S458 to check whether or not any address for automatically sending e-mail is registered in digital camera 29. If any address is registered, the flow advances to step S460 to check whether or not a plurality addresses for automatically sending e-mail are registered in digital camera 29.

If it is determined in step S460 that a plurality of addresses for automatically sending e-mail are registered in digital camera 29, the flow advances to step S462, in which address boxes 114 for all registered addresses are indicated with respect to each thumbnail 112 with its sending box put a tick. Thus, the selection among addresses is possible for each thumbnail 112. Display 111 in FIG. 19 shows the status under these functions. For example, address boxes 114 are indicated for the two registered addresses "A1" and "A2" with respect to the first and third thumbnails. 112

If it is not determined in step S460 that a plurality of addresses for automatically sending e-mail are registered, the flow goes to step S464 to indicate a simple automatic sending indication is made since only one address is registered in this case. For example, only one column of address boxes 114 are indicated below mark "A1" on display 111 in FIG. 19. If it is not determined in step S458 that any address for automatically sending e-mail is registered in digital camera 29, the flow goes to step S466 without any indication of address box 114 in step S462 or S464.

Also, if it is not determined in step S456 that any photograph is selected for sending to the other television set, the flow goes to step S466 without any indication of address box 114 in step S462 or S464 even if some address is registered for automatically sending e-mail.

In step S466 reached by way of any of steps S456, S458, S462 and S464, it is checked whether or not a selection closing operation is done. If it is not detected in step S466 that such an operation is done, the flow returns to step S456 to repeat step S456 to S466 until it is determined in step S466 that a selection closing operation is done. On the other hand, the flow terminates if it is determined in step S466 that a selection closing operation is done. In response to the termination of the flow, the indication for the selection of photograph to be input into the first television set 2 is canceled out of display 111.

In step S452, if it is not determined that such a photograph exists that has not been input into the first television set 2, the flow instantly terminates with a message of no un input photograph indicated on display 111.

In the above explanation in conjugation with FIGS. 19 to 21, the embodiment of digital camera is explained. However, the origin of the information of photograph according to this invention is not limited to the digital camera, but this invention is also applicable to various types of other origins keeping the information of photograph to be inputted into the television set. For example, a mobile phone with digital camera or mobile digital photograph storage without picture taking ability by itself or any other electronics capable of keeping and displaying photograph can be combined with a television set to share photograph and address for sending e-mail with the photograph attached according to this invention.

Figure 22:
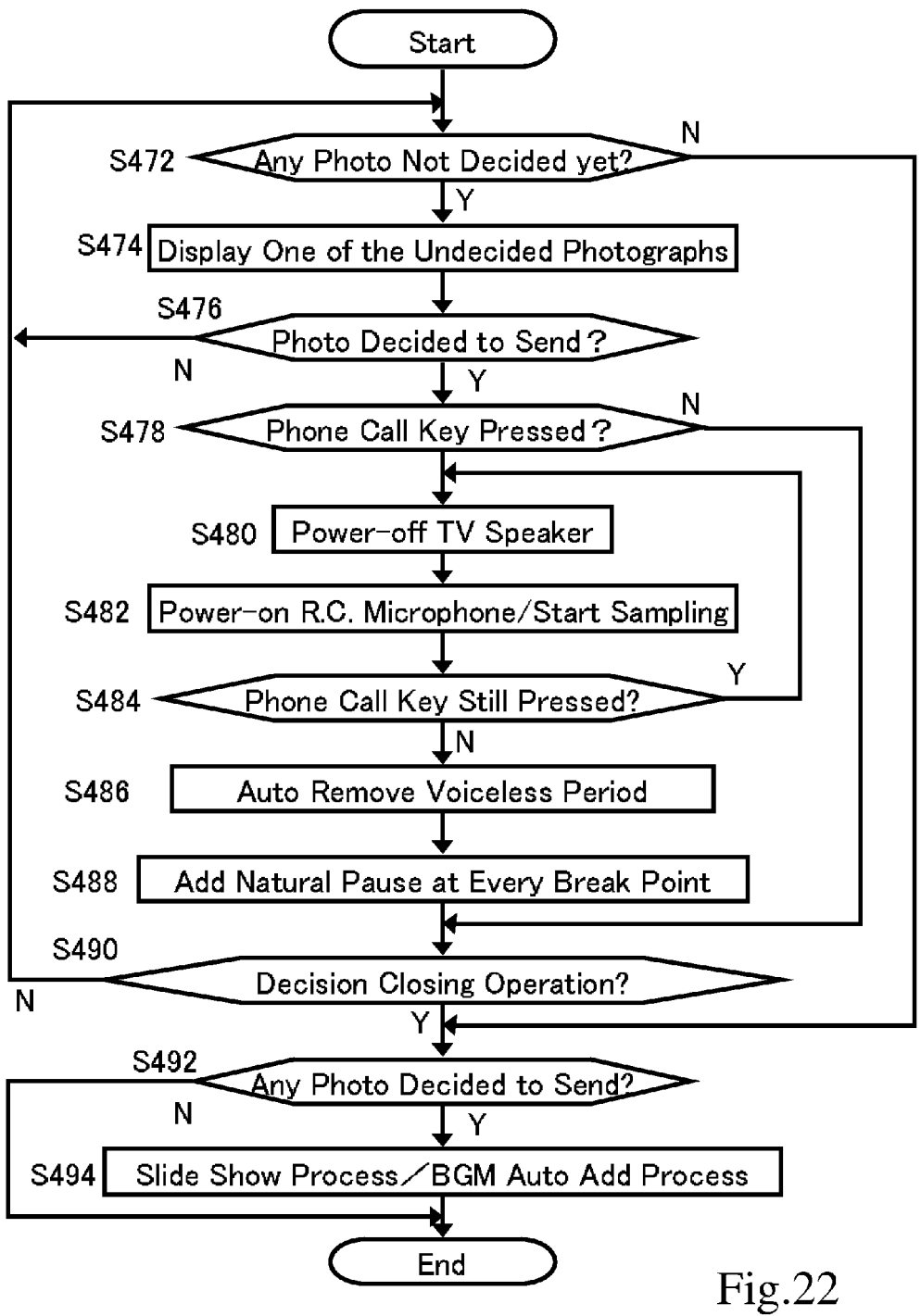
FIG. 22 is a flow chart showing the detail of step 350 in FIG. 15 that relates to the photograph display and manual selection process.

FIG. 22 is a flow chart showing the detail of step 350 in FIG. 15 that relates to the photograph display and manual selection process. If the flow starts, it is checked in step S472 whether or not such an undecided photograph is stored in first memory 6. The undecided photograph means a photograph input into the first television set 2 from the digital camera 29 or the like without the automatic sending mark and has not been decided to send to the second home by means of a manual operation. If any, the flow advances to step S474 to indicate one of such photographs on the first display 8 in accordance with a predetermined order. This makes it possible to preview the undecided photograph to decide whether or not to send the photograph. If the photograph is not satisfactory as the result of the preview, the photograph is left undecided or deleted.

Next, in step S476, it is checked whether or not the previewed photograph is decided to send. If the decision is made, the flow is advanced to step S478 to check whether or not phone call key 82 is pressed for inputting voice message to be added to the photograph in advance to the sending thereof.

If it is determined in step S478 that the phone call key 82 is pressed, the flow advances to step S480 to mute the voice from the first television set 2 for avoiding the acoustic feedback. Further, in step S482, microphone 75 of the first remote controller 7 is activated to start the sampling of voice to be added to the photograph on the first display 8. Next, in step S484, it is checked whether or not phone call key 82 is still pressed If it is determined in step S484 that phone call key 82 is still pressed, the flow returns to step S480 to continue muting the voice from the first television set 2. Thus, the steps S480 to S484 are repeated unless it is determined in step S484 that phone call key 82 is not pressed.

If it is determined in step S484 that phone call key 82 is not pressed any more, the flow ceases the repetition to stop the sampling of voice by microphone 57 and the muting of the voice from the first television set 2, and the flow advances to step S486.

In step S486, data in a voiceless period is automatically removed from all data sampled during phone call key 82 is kept in pressed state. In other words, even if such a defective voice message is sampled that a massage barely starts with an intolerable silence or a message chokes for an intolerable time, the message is improved to be played back in more listenable manner with the voiceless period automatically removed.

Next in step S488, a natural pause data is inserted at every break point of the voice. In more detail, the natural pose is inserted at a point where the voiceless data is removed by way of compensation to avoid such a message that the voice unnaturally continues at the removed voiceless data. The natural pose is also added in front of or the end of the voice message to avoid such a message that the voice suddenly starts or the massage ends without afterglow.

By means of the above steps S486 and S488 solely or in combination, a voice massage to be added to a photograph is automatically improved even if it is poorly sampled. Thus, the playback voice message starts with a natural pose after the appearance of new photograph in the automatic slide show, continues without intolerable silence or flustered tone, and ends with a natural afterglow before the photograph is replaced by new one in the automatic slideshow.

The flow advances to step S490 following to step S490. On the other hands, if it is not determined in step S478 that the phone call key 82 is pressed, the flow directly goes to step S490

In step S490, it is checked whether or not decision closing operation is done by means of the first remote controller 7. If it is not detected in step S490 that such an operation is done, the flow returns to step S472. If it is not detected in step S476 that the previewed photograph is decided to send, the flow also returns to step S472.

After the return to step S472 from step S490 or step S476, the steps S472 to S490 are repeated unless it is determined in step S490 that the decision closing operation is done, or it is determined in step S472 that an undecided photograph stored in first memory 6 does not exist any more. In step S474, the display of the former photograph is replaced by new one according to a predetermined order every time the flow comes form step S472 to step S474.

If it is determined in step S490 that the decision closing operation is done, or if it is determined in step S472 that an undecided photograph stored in first memory 6 does not exist any more, the flow goes to step S492 to check whether or not any photograph is decided to be sent. If any, the flow advances to step S494 for slide show process with background music, in which a control data for slideshow and background music data is added to the photographs if the decided photographs are plural, the flow then terminating. On the other hands, the flow instantly terminates if it is determined in step S492 that any photograph is not decided to be sent at all.

Figure 23:
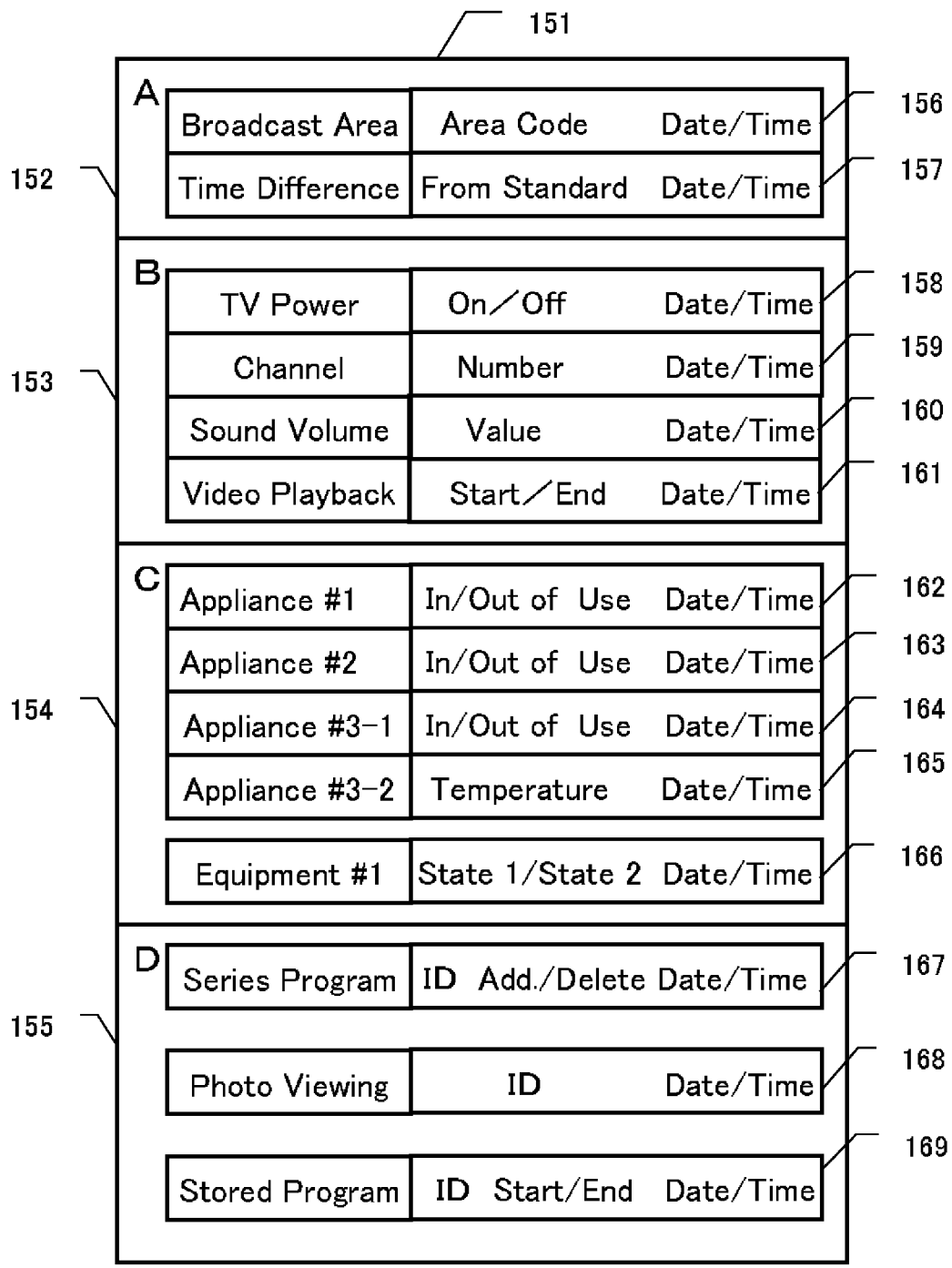
FIG. 23 is a table for showing a unique format of the information to be attached to e-mail exchanged between the television sets.

FIG. 23 is a table for showing a unique format of the information to be attached to e-mail exchanged between the first communicator 15 and the second communicator 16. The information according to the format is not only attached to e-mail, but also kept in the first memory 6 or the second memory 10 as the first storage information 23 or the second storage information 24, respectively. The unique format of information to be exchanged and stored makes it easy to process or analyze the such information.

In FIG. 23, information format 151 includes four groups consisting of the first group 152, the second group 153, the third group 154 and the fourth group 155. The first group 152 is for attribute relating to the area where the first home 1 or the second home 2 locates, such as broadcast area or time difference, which are unchanged unless the home moves to a different area. The second group 153 is for attribute relating to of the operation of the first television set 2 or the second television set 4, the third group 154 for attribute relating to the condition of the home electric appliance to be monitored in the first home 1 and the second home 3, and the fourth group 155 for attribute relating to other flexible items. Each group includes a plurality of independent items each uniformly consist of a set of item name part and item contents part, which are inseparable from each other.

The information format 151 of the above explained structure is not treated in one body, but individual groups 152 to 155 are separable to be independently treated, respectively. Further, the items in each group are also separable to be independently treated, respectively. Thus, the structure in information format 151 is only for grouping and for attribute allocation.

In the first group 152, item 156 consists of an item name part for "broadcast area" and a contents part including broadcast area code as well as date and time. If a change in the broadcast area is caused by a moving of the home, there are two information as to the "area" item, i.e., the former broadcast area with the old date and time and the new broadcast area with the new date and time when the change occurs. Similarly, the following items each include the information of date and time at the contents part. Thus, there may be caused a plurality of information with different date and time as to the same item. The date and time of each information is automatically recorded when each information is created.

The item 157 in the first group 152 consists of an item name part for "time difference" and a contents part including the difference from the standard time as well as date and time. In an area where summer time is adopted, a first information for winter time difference with date and time for the beginning of the winter time and a second information for summer time difference with date and time for the beginning of the summer time are created in every year.

The item 158 in the second group 153 consists of an item name part for "television set power" and a contents part including a code indicative of power-on state or power-off state as well as date and time. Similarly, the item 159 in the second group 153 consists of an item name part for "channel" and a contents part including channel number as well as date and time, the item 160 consisting of an item name part for "sound volume" and a contents part including numerical value for sound volume. As to items 158, 159 and 160, new information is created every time when any change is caused in one of the power, the channel and the sound volume, each being created with different date and time.

The item 161 in the second group 153 consists of an item name part for "video playback" and a contents part including a code indicative of the start or end of the playback as well as date and time. This information is created twice, i.e., at the start and at the end of one video playback.

Item 161 is not for any information of the contents of video program, but a mere indication that the television set is switched from broadcast program receiving mode to a video playback mode. This is the reason why item 161 is classified into the second group 153. In other words, item 161 has no ID information for identifying the played back program as in the items classified into the third group 154. As to the code indicative of the start or end of the playback in the contents part of item 161, it should be noted that the code indicative of the start of the playback is to be interpreted to indicate that the broadcast program data stored in the second memory 10 is viewed at that time. This is same as in the case of code indicative of the start or end of the playback in the contents part of 169 explained later.

Although not shown in FIG. 23, the second group 153 relating to the television operation also includes an item consists of an item name part for "timer setting" and a contents part including a code indicative of whether or not the timer is set, a set time for starting, and a set time for ending as well as date and time. Such an item is also automatically attached to e-mail which is automatically sent.

In response to the receipt of the information of "timer setting" item, the television set changes its judging condition for monitored information in carrying out the process of FIG. 13 and FIG. 16. For example, the interval between the timer setting operation time and the set time for starting something is excluded from the predetermined time period of step S298 in FIG. 13 since it may not abnormal even if no operation is done in such an interval.

Items 162 to 164 in the third group 154 relate to the condition of the home electric appliances #1 to #3 each independently consisting of an item name part for "appliance #1" or the like and a contents part including a code indicative of the in use or out of use of the home electric appliance as well as date and time. Among the three home electric appliances, appliance #3 relates to a second item 165 in addition to the first item 164 named "appliance #3-1", the second item 165 consisting of an item name part for "appliance #3-2" and a contents part including numeric information indicative of temperature set to appliance #3 as well as date and time. As in appliance #3, some home electric appliance causes a plurality of items if such an electric appliance includes a plurality of monitored information.

Items 166 in the third group 154 does not relate to a home electric appliances, but to home equipment or joinery to be monitored, item 166 consisting of an item name part for "equipment #1" or the like and a contents part including a code indicative of its state as well as date and time. For example, if a door is to be monitored, the contents codes are representative of open state and close state. Such contents codes include not only the two, but also more than three such as lock and unlock of the door lock turned at the outside or those at the inside. Information of the above items for appliance, equipment and joinery or the like in the home can be analyzed in combination since these are normally used in a regular order, such as shutting off home electric appliance followed by turning the lock of the door at the outside in the case of leaving home. The date and time in the contents part in each item is useful in such an analysis or historical analysis.

Further, in response to the decision of leaving or coming home on the received information of the item relating to door lock, for example, the television set changes its judging condition of time for monitored information in the process of FIG. 13 and FIG. 16.

Although not shown in FIG. 23, the third group 154 also includes an item consists of an item name part for "long vacation" and a contents part including a code indicative of long absence in vacation, the leaving date and time, and the returning date and time as well as date and time of creating the item. Such an item is also automatically attached to e-mail which is automatically sent for informing the other home of an irregular change in the life of own home. This item can be created by operating the first remote controller 7 or the second remote controller 11, the date and time of creating such an item being automatically added to the contents part as in all the other items.

In response to the receipt of the information of "long vacation" item, the television set changes its judging condition for monitored information in carrying out the process of FIG. 13 and FIG. 16. For example, the interval between the leaving date and time and the returning date and time is excluded from the predetermined time period of step S298 in FIG. 13 since it may not abnormal even if no operation is done in such an interval. In place of such exclusion, a step is added to detect an operation done in the interval between the leaving date and time and the returning date and time to judge an abnormality since any operation in the absence interval is suspiciously done by an invading stranger.

The number of items in the third group 154 can be increased in dependence on the increase in number of objects or of items in the same object.

Items 167 in the fourth group 155 relates to the registration of the regularly viewed series broadcast program and consists of an item name part for "series program" and a contents part including ID for identifying the series broadcast program, a code indicative of whether to add or delete the program to or from the registration as well as date and time. The ID may be the code unique to the program or a combination of channel, the day of the week, and the starting time.

Items 168 in the fourth group 155 relates to the photograph and consists of an item name part for "photograph viewing" and a contents part including ID for identifying the photograph as well as date and time when the photograph is viewed. The generated or received information of item 168 is to be compared with the ID for the photograph stored in the first memory 6 or the second memory 10. If both the ID's coincide with each other, icon 55 in FIG. 2, which indicates that a photograph is sent, or icon 63 in FIG. 3, which indicates that a photograph is received, disappears.

Items 169 in the fourth group 155 relates to the broadcast program recorded or downloaded to be stored into the first memory 6 or the second memory 10 and consists of an item name part for "stored program" and a contents part including ID for identifying the broadcast program stored, a code indicative of the start or end of the playback as well as date and time. This information is created twice, i.e., at the start and at the end of one video playback.

In the above explanation, the information exchange between the first television set 2 and the second television set 4 is carried out by an attachment to e-mail through server on the internet. However, this invention is not limited to the embodiment on e-mail and attachment, but is applicable to other types of information exchange between the first television set 2 and the second television set 4, such as bidirectional digital broadcast network or communication way other than e-mail through server on the internet.

However, the information exchange in the embodiment through a unique format of information automatically attached to e-mail which is automatically sent is advantageous in that the manner is simple for informing the other television set of the condition of the own television set and that the system can be realize on a currently existing hardware including television set combined with a personal computer having e-mail sending function.

This advantage is received not only by a group of private homes such as the first home 1 and the second home 2, but also widely received by various system including television set. For example, if the address of the other television set for automatically sending e-mail is replaced by an address of a rating company, an audience share survey can be easily carried out. Of course, the rating company makes an agreement with a great number of audience homes to automatically send e-mail every time when the channel of television set in each home is changed according to this invention. Thus, this invention presents a novel and easy audience rating survey system of higher reliability and efficiency than a conventional system on a sampling by a special apparatus and statistics method.

Further, the feature and advantage for sensing abnormality on the basis of actions of a person to the remote controller explained in steps S362 and S364 is related not only to the remote controller for the television set, but also widely relates to various handy appliances, such as a land phone or a mobile phone. In other words, the feature of steps S362 and S364 can be applicable to a land phone or a mobile phone to improve them. In other words, in response to the sensing of the abnormality in steps S362 and S364, the improved land phone or mobile phone automatically puts a call in to a predetermined phone number and automatically transmits a prepared voice message when connection is made.

Thus, a person even in panic or off his or her truck can report the emergency on the land phone or mobile phone by means of a simple action not to be taken by a normal person, but is apt to be taken by a person in panic or off the truck. Further, a possibility of erroneous emergency report is relatively low because the assumed action in steps S362 and S364 would not be taken by a normal person. Further the improvement does not require any regular exercise and maintenance to keep the reliability of emergency report since the land phone or the mobile phone is in daily use.

In the embodiment above, it is explained that photograph taken by a digital camera is exchanged between the first home 1 and the second home 3. However, image information to be exchanged between television sets in accordance with this invention is not limited to the still image such as photograph, but information of moving image taken by digital camera or a movie camera can be attached to e-mail exchanged between the homes.

What is claimed is:

1. A remote controller for an appliance comprising:
   an operating part including a plurality of keys, each of which is assigned to predetermined normal functions;
   a first controller arranged to determine a first control signal indicative of one of the predetermined normal functions to be transmitted to the appliance in response to an operation of at least one of the keys in the operating part in compliance with a predetermined manner;
   a second controller arranged to determine a second control signal indicative of an abnormality to be transmitted to the appliance in response to an operation of at least one of the keys in the operating part which does not comply with the predetermined manner, but corresponds to a predetermined abnormal manner; and
   a signal transmitter arranged to transmit one of the first and second control signals to the appliance in response to the key operation in the operating part.

2. The remote controller according to claim 1, wherein the appliance is a television set including a communicator arranged to communicate with an outside counterpart by means of designating an address of the counterpart.

3. The remote controller according to claim 1, wherein the predetermined abnormal manner is that three keys or more are pushed at once.

4. The remote controller according to claim 1, wherein the predetermined abnormal manner is that the same key is pushed more than a predetermined times in a limited period.

5. The remote controller according to claim 1, wherein the predetermined abnormal manner is that at least one of a group of closely arranged keys is pushed one after another more than a predetermined times in total in a limited period.

6. The remote controller according to claim 1, wherein the predetermined abnormal manner is that the operation part including the plurality of keys is entirely grasped.

7. The remote controller according to claim 1, wherein the operating part including a surface on which the plurality of keys are arranged, ant wherein the predetermined abnormal manner is that the surface is entirely pushed with a palm.

8. The remote controller according to claim 1, wherein the predetermined abnormal manner is that the remote controller is left for a long time without any key operation of the operating part after the latest operation thereof.

9. The remote controller according to claim 1, wherein the predetermined abnormal manner is that the appliance is left in power-on state due to a key operation in the operating part with the appliance out of service.

10. The remote controller according to claim 1, wherein the predetermined abnormal manner is that abnormal content is set by the key operation which is normal as a matter of form.

11. A handy appliance comprising:
    an operating part including a plurality of keys, each of which is assigned to predetermined normal functions;
    a first controller arranged to determine a first control signal indicative of one of the predetermined normal functions for the appliance in response to an operation of at least one of the keys in the operating part in compliance with a predetermined manner;
    a second controller arranged to determine a second control signal indicative of an abnormality to be transmitted outside in response to an operation of at least one of the keys in the operating part which does not comply with the predetermined manner, but corresponds to a predetermined abnormal manner; and
    a signal transmitter arranged to transmit the second control signals to outside in response to the key operation in the operating part.

12. The handy appliance according to claim 11, wherein the handy appliance is a mobile phone.

13. The handy appliance according to claim 11, wherein the predetermined abnormal manner is that three keys or more are pushed at once.

14. The handy appliance according to claim 11, wherein the predetermined abnormal manner is that the same key is pushed more than a predetermined times in a limited period.

15. The handy appliance according to claim 11, wherein the predetermined abnormal manner is that at least one of a group of closely arranged keys is pushed one after another more than a predetermined times in total in a limited period.

16. The handy appliance according to claim 11, wherein the predetermined abnormal manner is that the operation part including the plurality of keys is entirely grasped.

17. The handy appliance according to claim 11, wherein the operating part including a surface on which the plurality of keys are arranged, ant wherein the predetermined abnormal manner is that the surface is entirely pushed with a palm.

* * * * *